May 30, 1939.  W. F. KELLEY  2,160,152
TAPE TRANSLATOR FOR CARD PUNCHING MECHANISM
Filed July 3, 1937  28 Sheets-Sheet 1
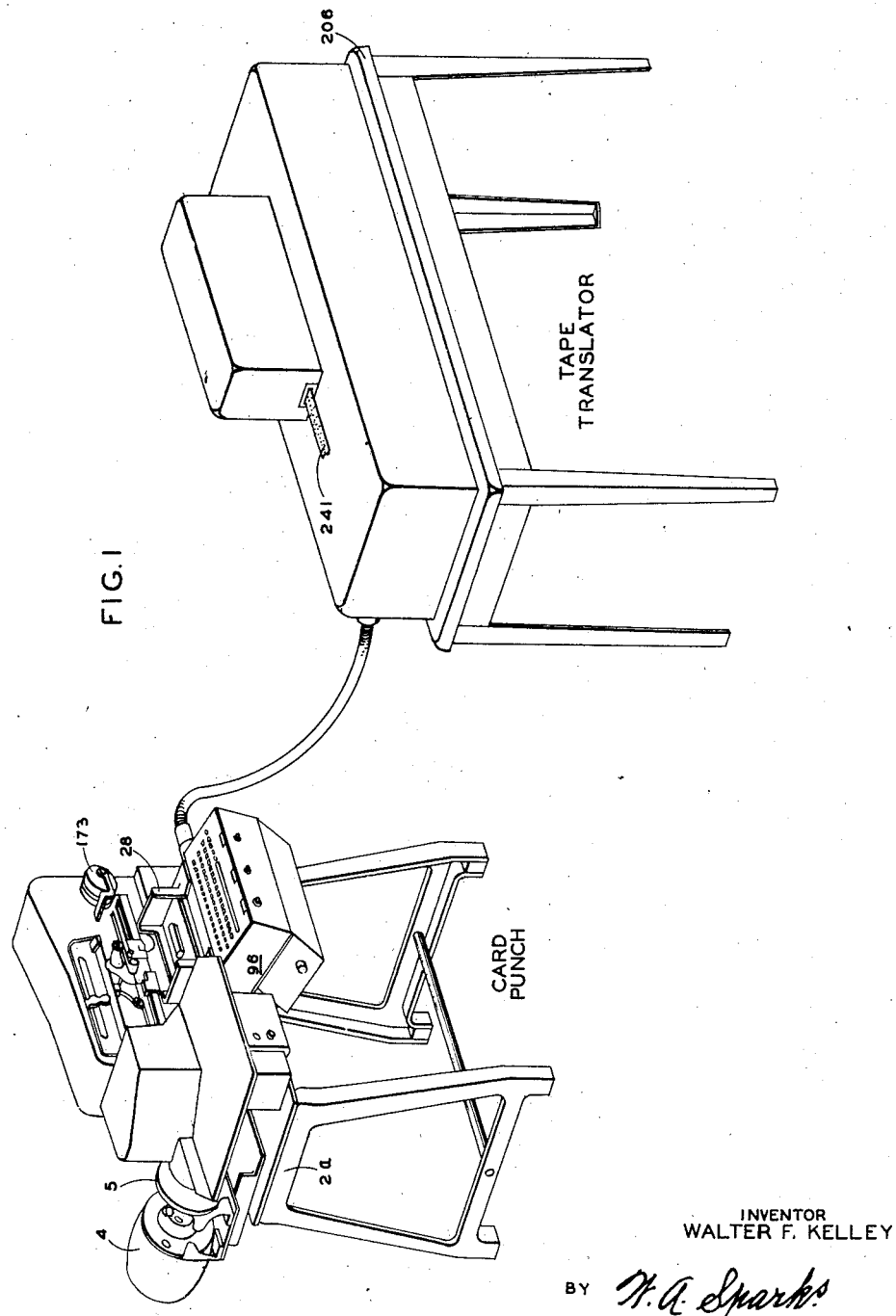
INVENTOR
WALTER F. KELLEY
BY *W. A. Sparks*
ATTORNEY

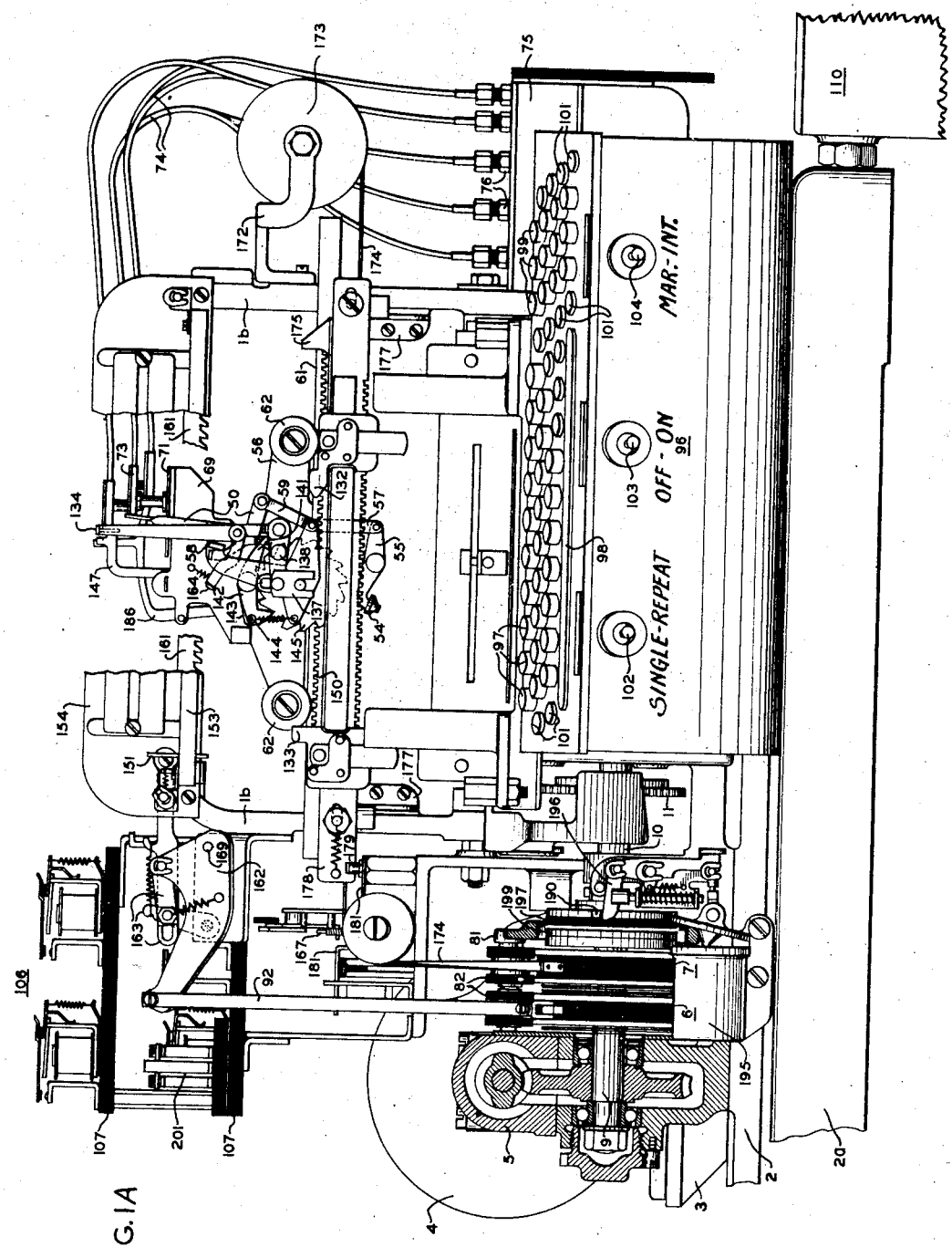
FIG. IA
INVENTOR
WALTER F. KELLEY
BY W. A. Sparks
ATTORNEY

May 30, 1939. W. F. KELLEY 2,160,152
TAPE TRANSLATOR FOR CARD PUNCHING MECHANISM
Filed July 3, 1937 28 Sheets-Sheet 4
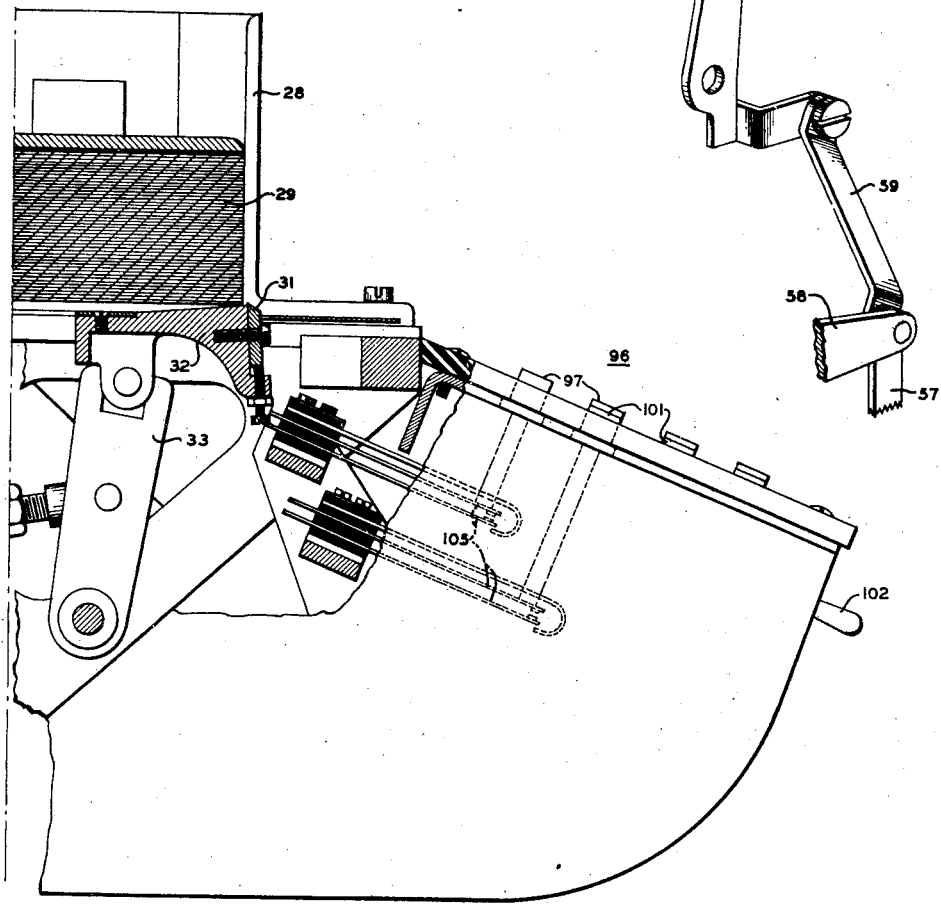
INVENTOR
WALTER F. KELLEY
BY *W. A. Sparks*
ATTORNEY May 30, 1939.　　W. F. KELLEY　　2,160,152
TAPE TRANSLATOR FOR CARD PUNCHING MECHANISM
Filed July 3, 1937　　28 Sheets-Sheet 5

INVENTOR
WALTER F. KELLEY
BY *W. A. Sparks*
ATTORNEY

May 30, 1939. W. F. KELLEY 2,160,152
TAPE TRANSLATOR FOR CARD PUNCHING MECHANISM
Filed July 3, 1937 28 Sheets-Sheet 6

INVENTOR
WALTER F. KELLEY
BY *W. A. Sparks*
ATTORNEY

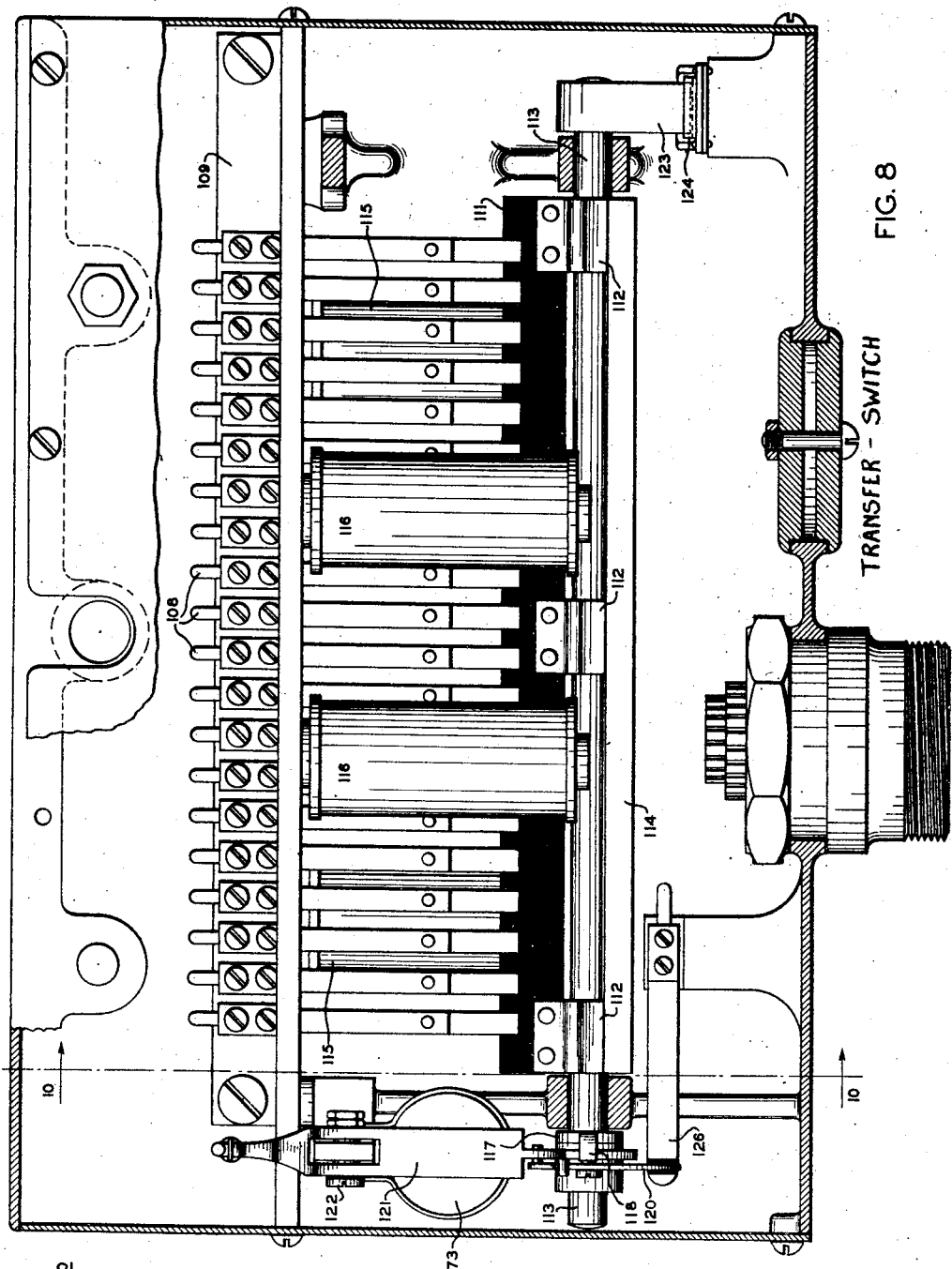

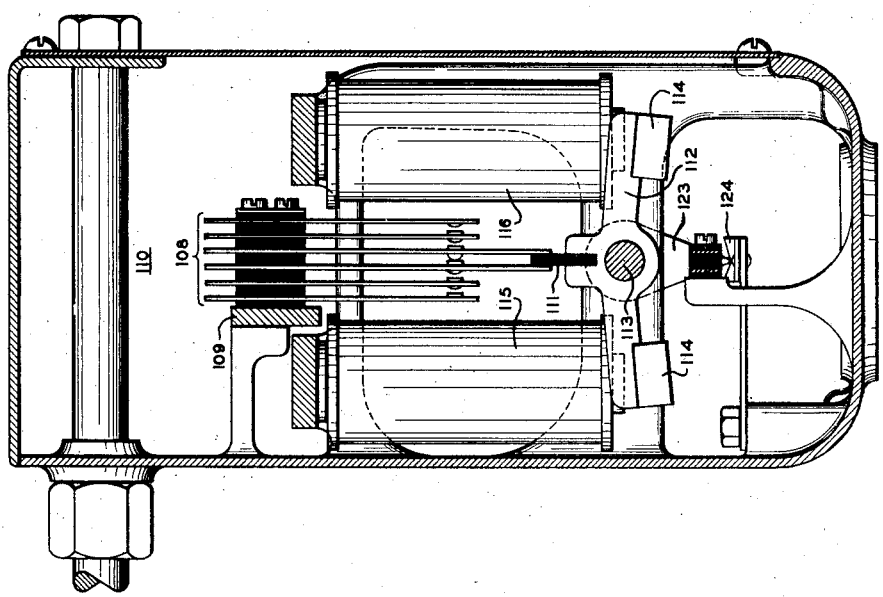
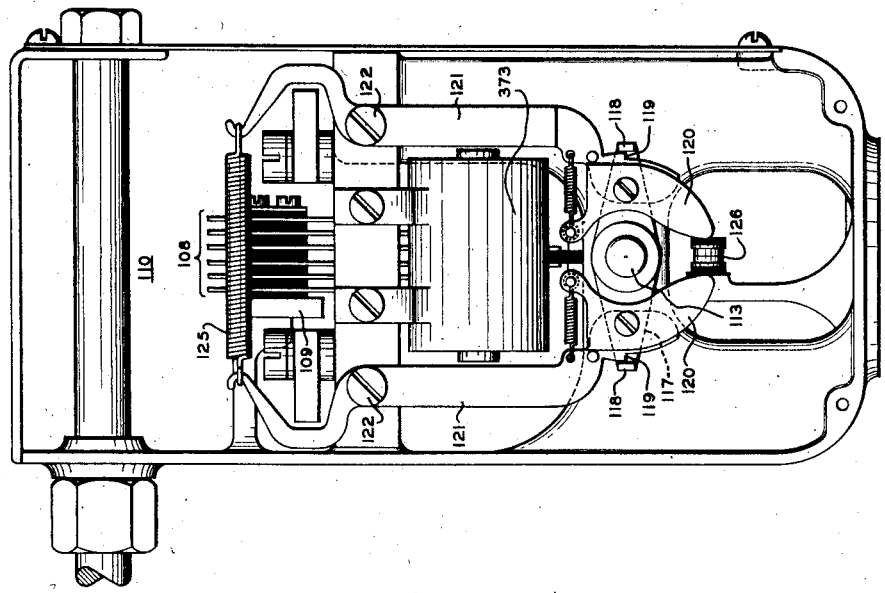

May 30, 1939. W. F. KELLEY 2,160,152
TAPE TRANSLATOR FOR CARD PUNCHING MECHANISM
Filed July 3, 1937 28 Sheets-Sheet 10
FIG.11
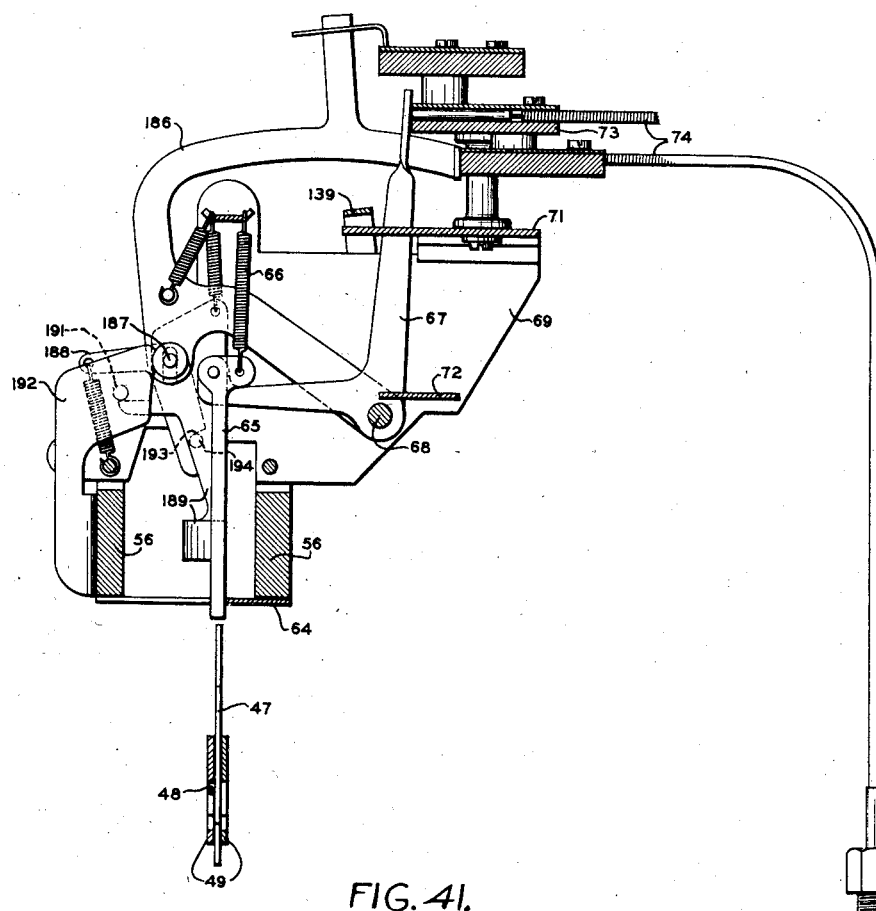
FIG.41.
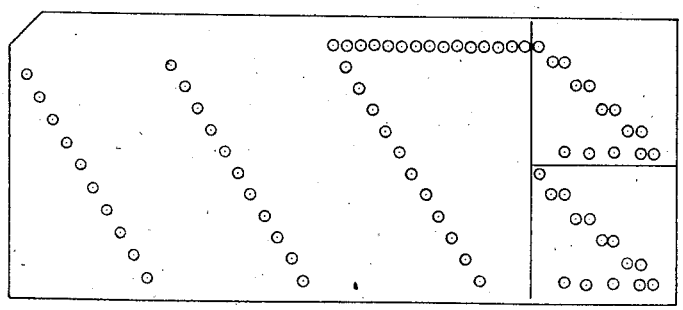
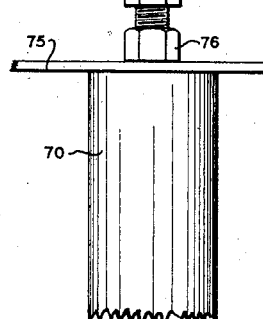
INVENTOR
WALTER F. KELLEY
BY *W. A. Sparks*
ATTORNEY May 30, 1939. W. F. KELLEY 2,160,152
TAPE TRANSLATOR FOR CARD PUNCHING MECHANISM
Filed July 3, 1937 28 Sheets-Sheet 11
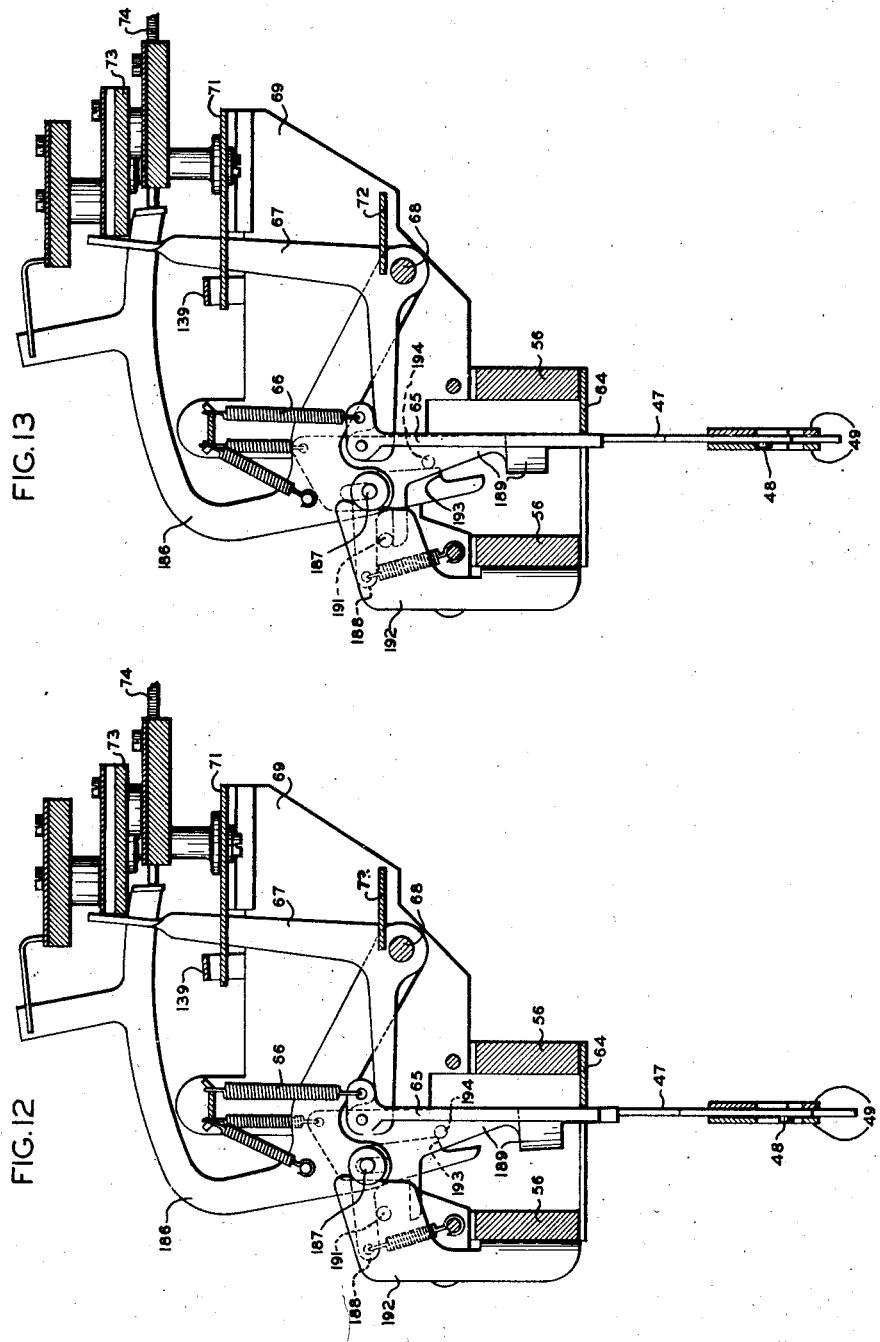
INVENTOR
WALTER F. KELLEY
BY *W. A. Sparks*
ATTORNEY May 30, 1939.  W. F. KELLEY  2,160,152
TAPE TRANSLATOR FOR CARD PUNCHING MECHANISM
Filed July 3, 1937   28 Sheets-Sheet 12

INVENTOR
WALTER F. KELLEY
BY *H. A. Sparks*
ATTORNEY

May 30, 1939.  W. F. KELLEY  2,160,152
TAPE TRANSLATOR FOR CARD PUNCHING MECHANISM
Filed July 3, 1937   28 Sheets-Sheet 13

INVENTOR
WALTER F. KELLEY
BY
ATTORNEY

May 30, 1939.  W. F. KELLEY  2,160,152
TAPE TRANSLATOR FOR CARD PUNCHING MECHANISM
Filed July 3, 1937  28 Sheets-Sheet 14

INVENTOR
WALTER F. KELLEY
BY *W. A. Sparks*
ATTORNEY

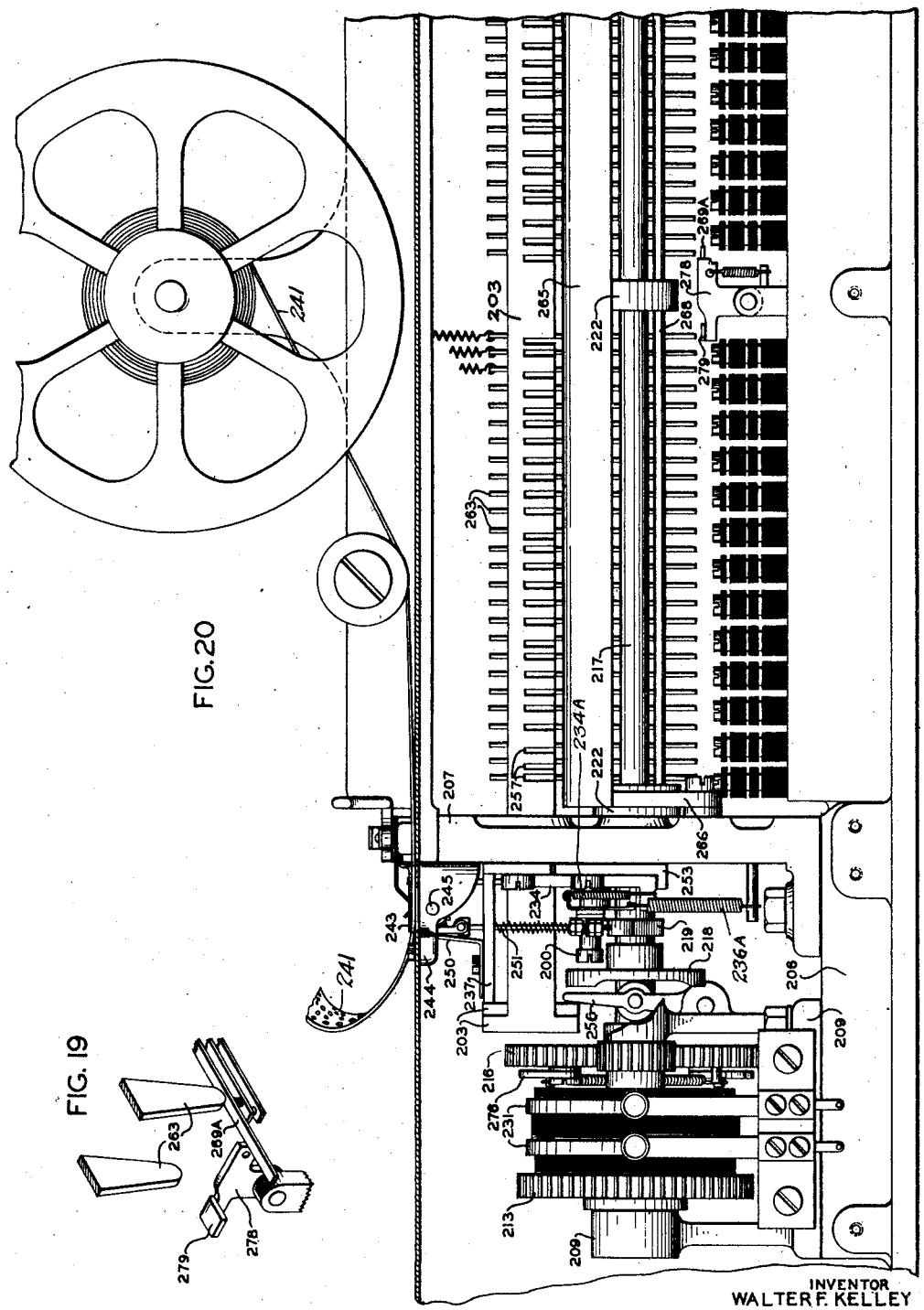

May 30, 1939.    W. F. KELLEY    2,160,152
TAPE TRANSLATOR FOR CARD PUNCHING MECHANISM
Filed July 3, 1937    28 Sheets-Sheet 16
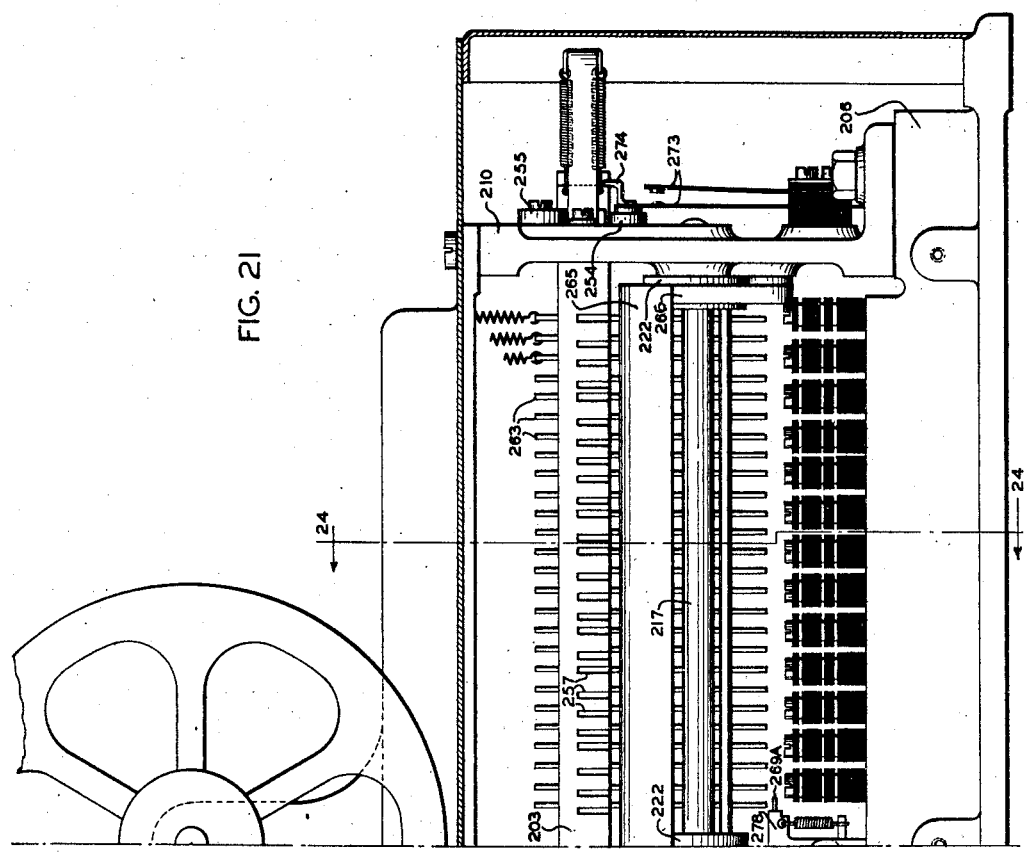
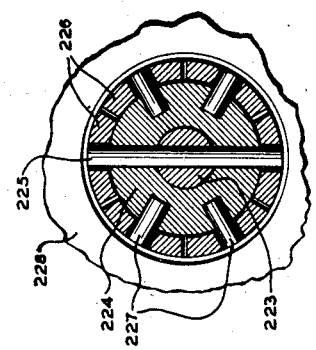
INVENTOR
WALTER F. KELLEY
BY
ATTORNEY May 30, 1939. W. F. KELLEY 2,160,152
TAPE TRANSLATOR FOR CARD PUNCHING MECHANISM
Filed July 3, 1937 28 Sheets-Sheet 17

INVENTOR
WALTER F. KELLEY
BY *W. A. Sparks*
ATTORNEY

May 30, 1939.　　　W. F. KELLEY　　　2,160,152
TAPE TRANSLATOR FOR CARD PUNCHING MECHANISM
Filed July 3, 1937　　　28 Sheets-Sheet 18

INVENTOR
WALTER F. KELLEY
BY *H. A. Sparks*
ATTORNEY

May 30, 1939.　　　W. F. KELLEY　　　2,160,152
TAPE TRANSLATOR FOR CARD PUNCHING MECHANISM
Filed July 3, 1937　　　28 Sheets-Sheet 19

INVENTOR
WALTER F. KELLEY
BY *W. A. Sparks*
ATTORNEY

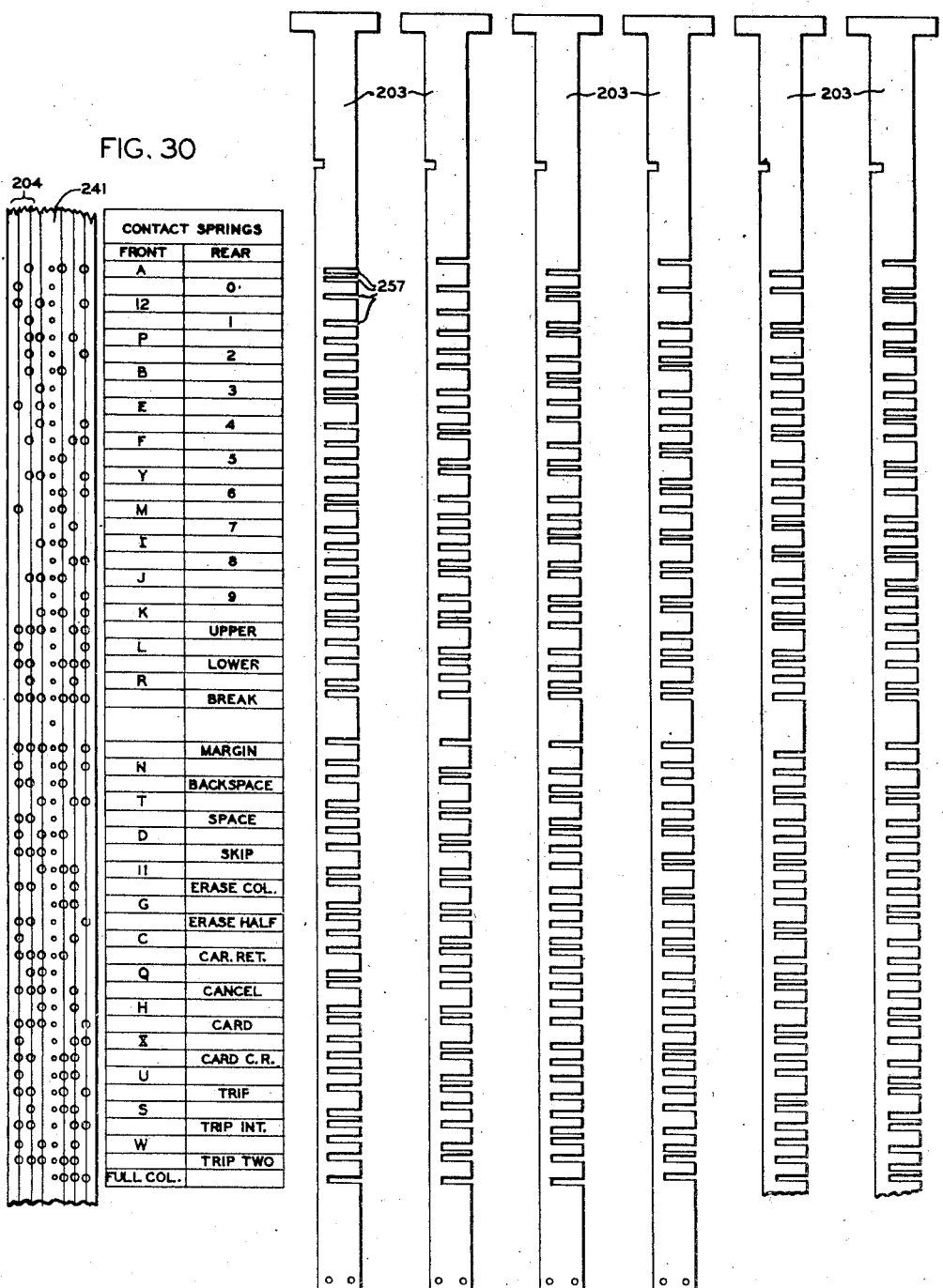

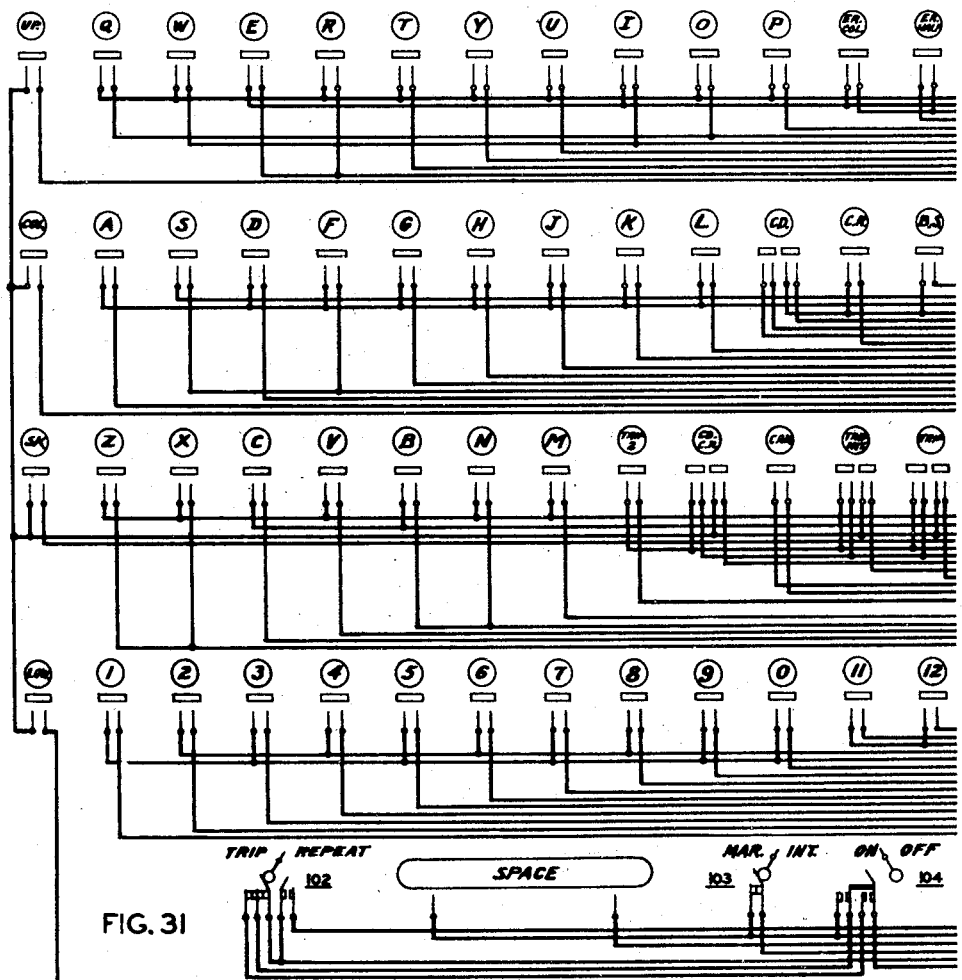
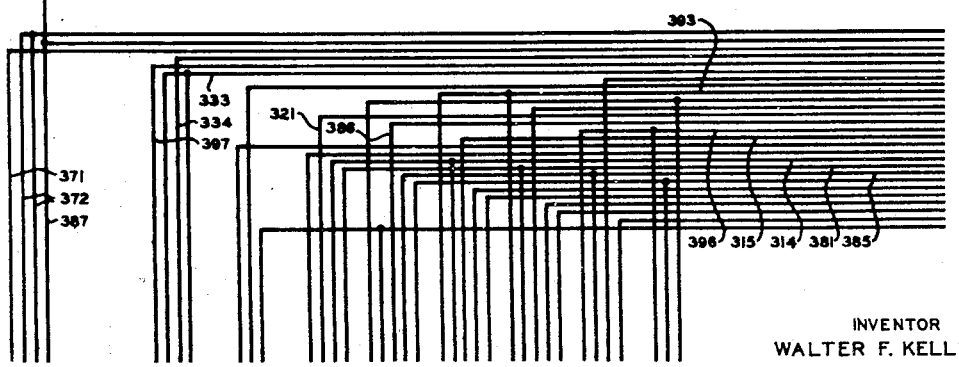
FIG. 31

May 30, 1939.   W. F. KELLEY   2,160,152
TAPE TRANSLATOR FOR CARD PUNCHING MECHANISM
Filed July 3, 1937   28 Sheets-Sheet 23

INVENTOR
WALTER F. KELLEY
ATTORNEY

May 30, 1939.  W. F. KELLEY  2,160,152
TAPE TRANSLATOR FOR CARD PUNCHING MECHANISM
Filed July 3, 1937  28 Sheets-Sheet 24

INVENTOR
WALTER F. KELLEY
BY
ATTORNEY

May 30, 1939.   W. F. KELLEY   2,160,152
TAPE TRANSLATOR FOR CARD PUNCHING MECHANISM
Filed July 3, 1937   28 Sheets-Sheet 28

INVENTOR
WALTER F. KELLEY
BY W. A. Sparks
ATTORNEY

Patented May 30, 1939

2,160,152

UNITED STATES PATENT OFFICE 2,160,152

TAPE TRANSLATOR FOR CARD PUNCHING MECHANISM

Walter F. Kelley, Whitestone, N. Y., assignor to Remington Rand Inc., Buffalo, N. Y., a corporation of Delaware Application July 3, 1937, Serial No. 151,870

25 Claims. (Cl. 164—115)

This invention relates to the punched card type of tabulating machinery and particularly to a device adapted to translate a pre-punched tape to operate, automatically, a gang punch adapted to prepare punched cards for statistical purposes.

There is a very large field of possible use for this invention, particularly in conjunction with the well known Powers system. A great saving in cost and overhead may be had with the use of this device because it will no longer be necessary that every user of punched card tabulating machinery have a punch on the premises.

In the case of insurance companies and other large corporations it will only be necessary that branch offices have typewriters, such as Remington Bookkeepers, with attachments adapted to punch a tape while ledger sheets are being prepared. A device for tape punching in conjunction with a typewriter is disclosed in U. S. Patent No. 2,059,253, issued to W. W. Lasker. Another is shown in copending application of Lasker and Kelley, Serial No. 737,348. The mechanism disclosed in this application and patent could be used to prepare a punched tape for the present invention by using the present six hole code and including all the operation keys in the keyboard.

If the distance to a main card punching station be short enough, the punched tapes could be sent by messenger or mail; or, if greater distances are involved, the punched tape could be fed through a telegraph transmitter where it is sensed and the resulting impulses sent over a telegraph wire to a distant point, where a perforator punches a duplicate tape, this duplicate being then fed through the tape translator of the present invention which is used to operate one or more card punches.

A punch which is particularly adapted for use with the present invention is disclosed in U. S. Patent No. 2,124,178, issued July 19, 1938 to W. W. Lasker. However, a brief description of a punch to be used in conjunction with the present invention will be given hereinafter to facilitate the understanding of the present invention.

The gang punch to be used with the present device records the data upon the card in a manner comparable to the manner in which a typewriter records it, that is, the operation of keys controls the impressing into the card of insignia, in the form of perforations, according to the data items to be recorded. This insignia can then be read by other mechanism, such as the tabulator, for the production of a printed record or transcription, and for obtaining a summary of the data indicated on the cards.

In the just cited patent, it may be seen that the characteristic method of operation of the gang punch involves the utilization of a single die which is movable by power and cooperates with a group of individual punches, there being customarily 540 punches and 540 holes in the die to cooperate with the punches, these being arranged in 45 columns of twelve each. Above the individual punches there is positioned a set bar field containing a similar number of set bars, which, when latched down, will prevent upward movement of the punches when the die is raised and thereby drive the card, which is positioned upon the upper surface of the die against the held punches. Above the set bars is a key operated setting carriage which, when actuated, will depress the desired set bars, column by column, in succession, as the successive items of the data to be recorded are indicated on the keyboard. The punching of all the holes is accomplished by a single movement of the die as distinguished from the so-called hand-punch by which the data to be recorded is punched in the card column-by-column, according to the desired data record. The very substantial advantage is obtained by this characteristic that much more accurate relative spacing of the data perforations is obtainable than is possible by a hand punch.

This invention further relates to a novel code to be used in punching the tape to be used for operating the mechanism of this invention.

This particular code includes representations for twelve digital characters, a twenty-three letter alphabet, wherein certain similar and little used letters are represented by a common interpretation, and certain necessary mechanical punch operations, such as space, skip, back space, etc.

Part of the novelty of this code lies in the fact that, while six hole positions are used, combinations of one to a maximum of three of said hole positions are used to represent the digital and alphabetic characters, a pair of holes are arbitrarily chosen to be termed a pre-selected pair of hole positions and none of the said combinations includes more than one hole of the preselected pair of hole-positions.

A further feature of novelty in this code is the fact that whenever combinations which include both holes of the pre-selected pair of hole-positions mentioned above, relative to digital and alphabetic characters, appear, a punch-control operation, other than a digit or letter-setting operation, will be effected.

The translating machine of the present invention includes a tape feeding mechanism which may be of any conventional design for intermittent feeding of a punched telegraph-type tape; a sensing mechanism adapted to control a set-up selector mechanism which includes a group of laterally reciprocable notched code bars; and a control selector mechanism adapted to supply the necessary control over various parts of the invention, such as the clutch and various circuits. The moving parts of these mechanisms may be actuated individually, or in groups, by electro-magnets, or may be driven by a series of cams on a motor driven shaft. The latter is the preferred form and will be described hereinafter.

The significance of the hereinabove mentioned pair of pre-selected hole positions lies in their relation to the control mechanism which, in the present embodiment, comprises a pair of adjacent code bars so arranged in relation to a pair of flat spring electrical contacts that, if either one of said code bars is actuated, it will slip by the spring contacts without causing them to close; but, if both code bars are actuated simultaneously, they will cause the pair of contacts to close and thereby complete a circuit to actuate a special control magnet.

This application is a continuation of the general idea and mechanism of the above mentioned Patent No. 2,124,178. This patent shows many of the details of the punch mechanism hereinafter called for. The said patent of Lasker further shows mechanism and circuits for operating a multiplicity of punches from a typewriter.

One object of the present invention is to provide mechanism and circuit connections adapted to sense the punchings in a pre-punched tape to operate, fully automatically, a punch which is adapted to prepare punched cards for use with punched card tabulating machinery.

Another object of the present invention is to provide a novel six-hole position code to be used in punching a tape, which code includes the use of a pre-selected pair of hole-positions to control, through a translating mechanism, various operations of a punch which operations may call for a pause in the intermittent sensing of punched tape.

Another object of the present invention is to provide a mechanism to control the feeding of a punched tape.

A feature of the present invention is to provide a set of notched selection bars under control of a set of perforated tape sensing pins.

Another feature of the present invention is to provide a group of actuator arms under control of a set of notched code bars, which are in turn under control of a set of tape sensing pins.

Another feature of the present invention is to provide a plurality of electrical contacts under control of a plurality of actuator arms and which contacts, when closed in various pairs or groups by any of the actuator arms, are adapted to complete electrical connections to operate a punch.

Another object of the present invention is to provide positive means for automatically controlling the timing of said invention.

Other objects, features, and structural details will be apparent from the following descriptions when read in connection with accompanying drawings, wherein:

Fig. 1 is an isometric view of the tape translator and a card punch;

Fig. 1A is a front elevational view of a punch with parts broken away and other parts in section;

Figure 2:
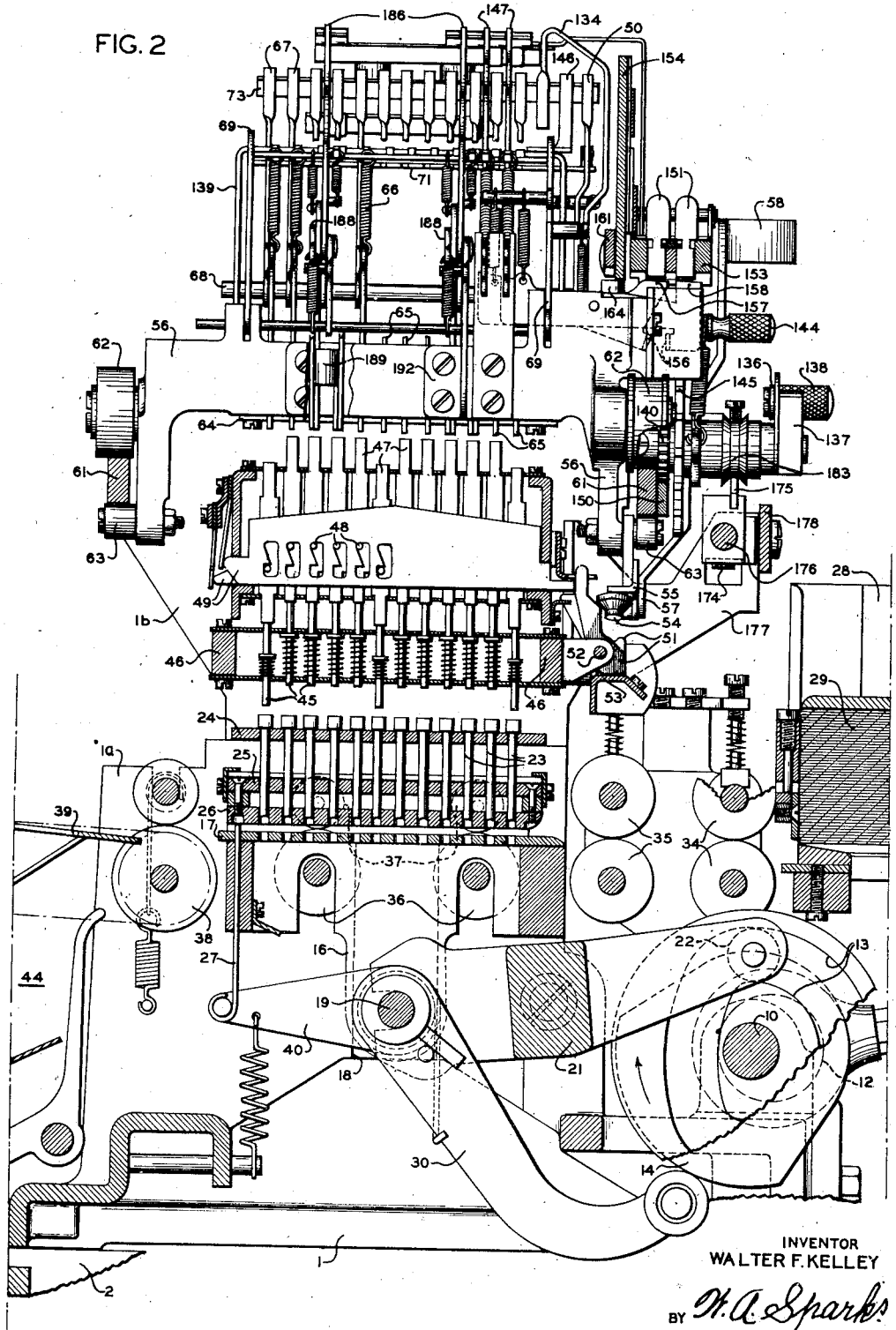
Figure 5:
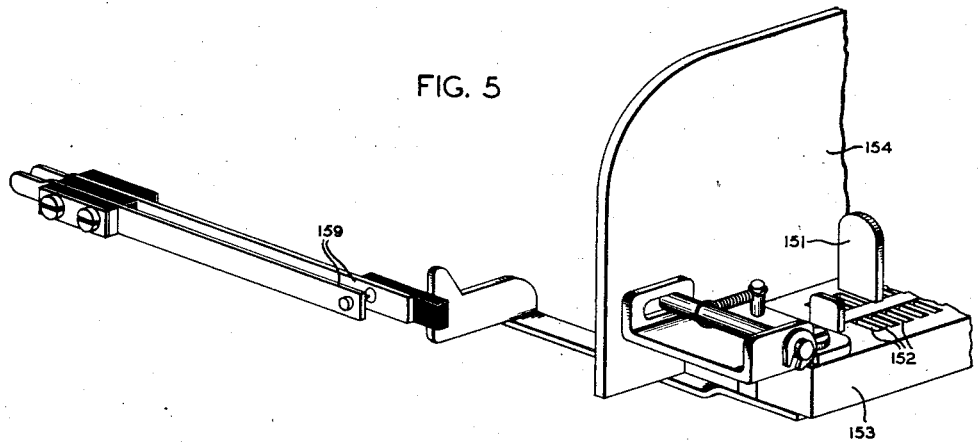
Figure 4:
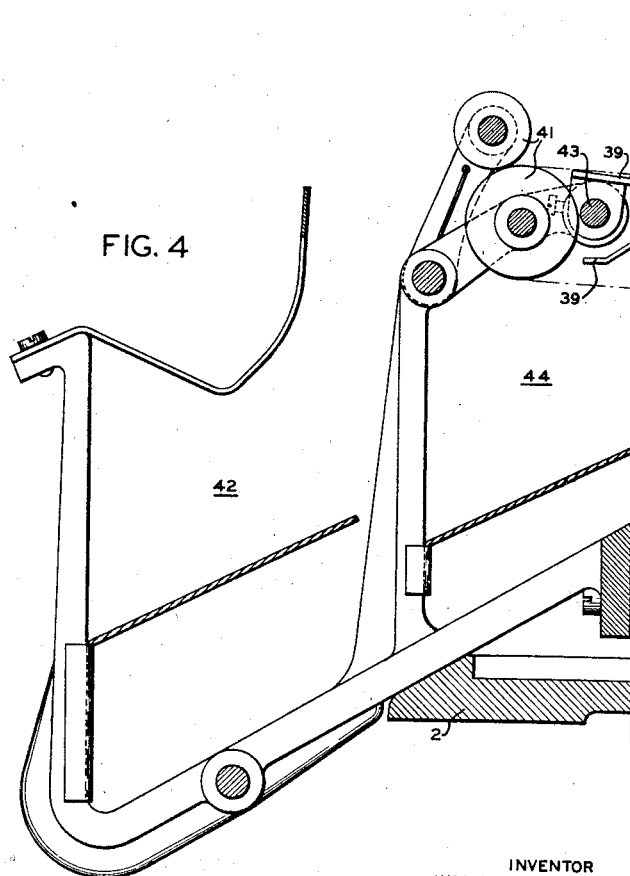
Figure 6:
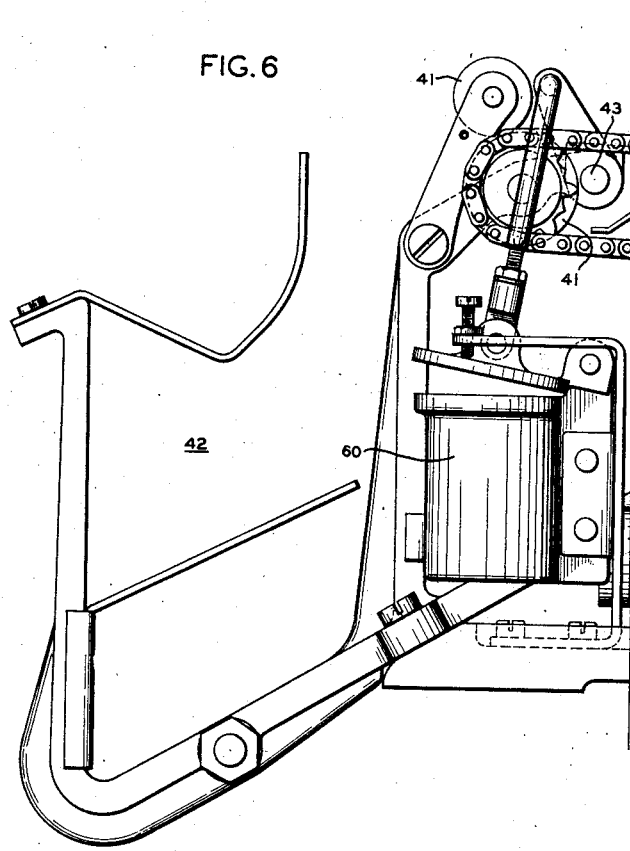
Figure 7:
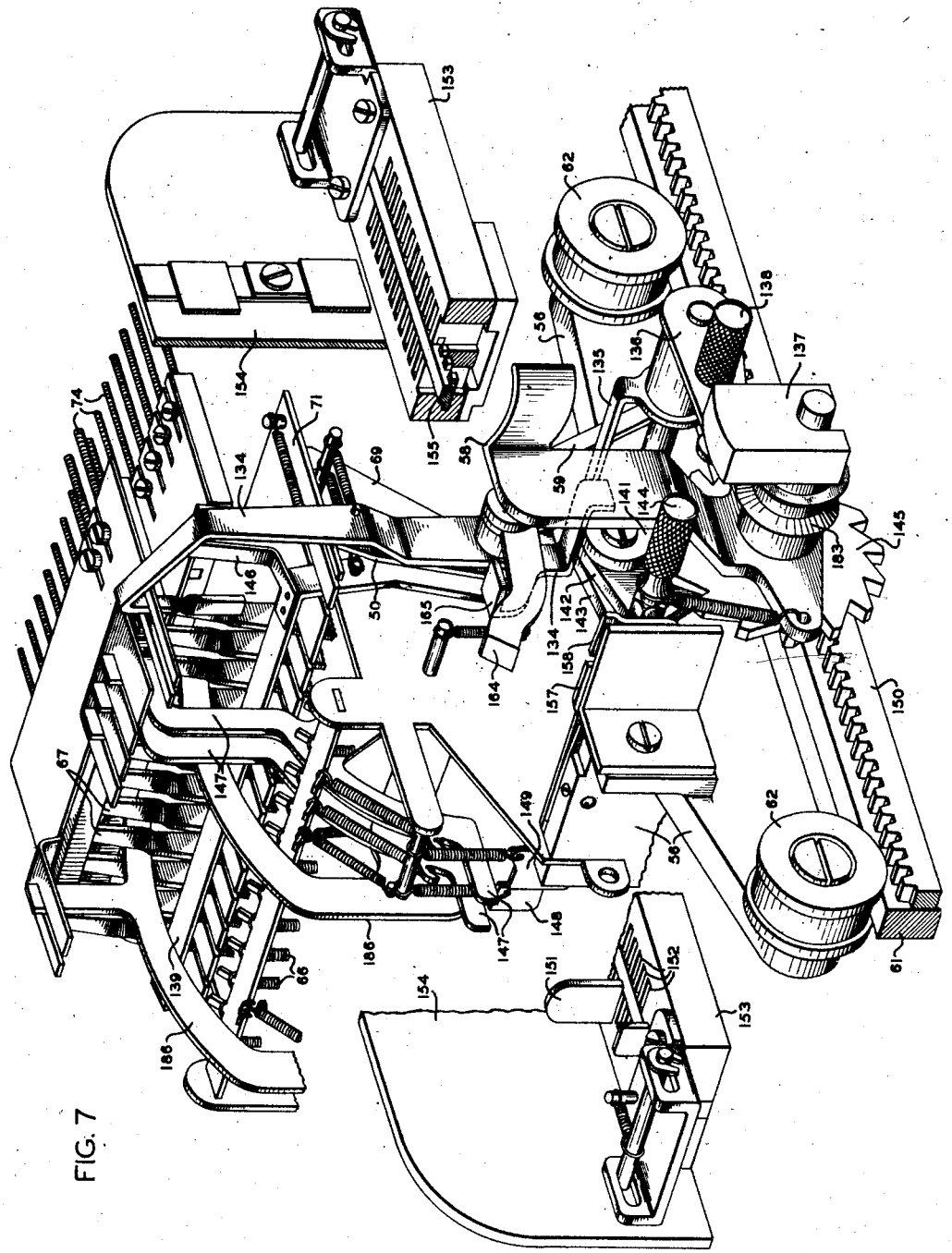

Figs. 2, 3 and 4 when placed with Fig. 3 to the left of Fig. 2 and Fig. 4 on the right form a vertical cross section of the punch;

Fig. 5 is a fragmentary isometric view of the skip breaker contacts;

Fig. 6 is a view corresponding to Fig. 4, but in elevation and illustrates the "trip 2" pocket and selection magnet;

Fig. 7 is a fragmentary isometric view of a punch carriage showing its relation to the skip bar;

Fig. 8 is a right-hand fragmentary sectional view of the transfer switch;

Fig. 9 is a front elevational view of the transfer switch with the cover removed.

Figure 14:
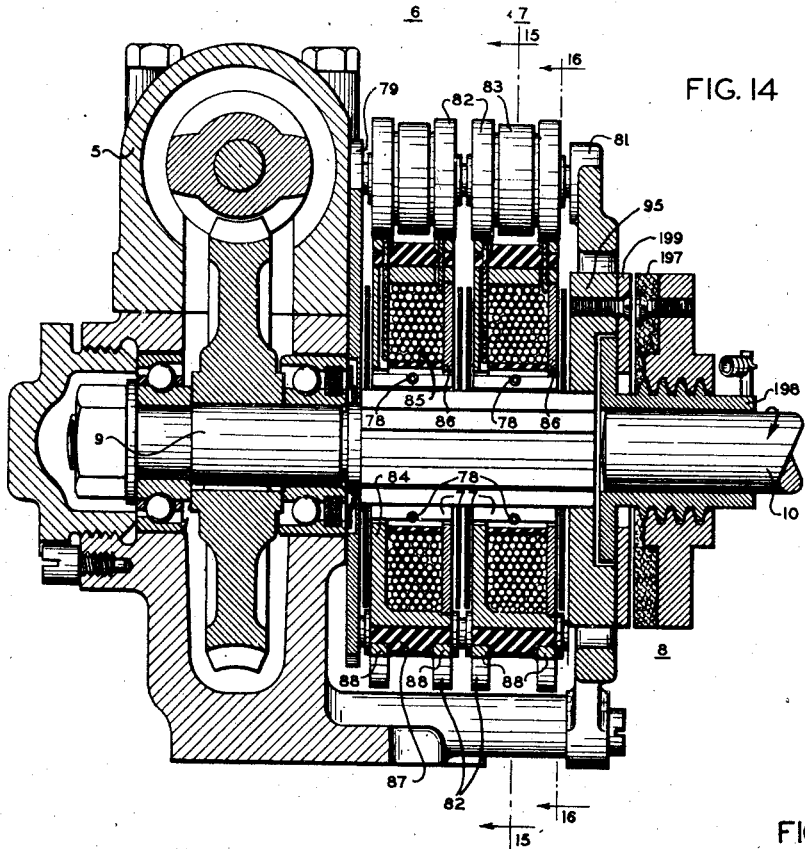
Figure 15:
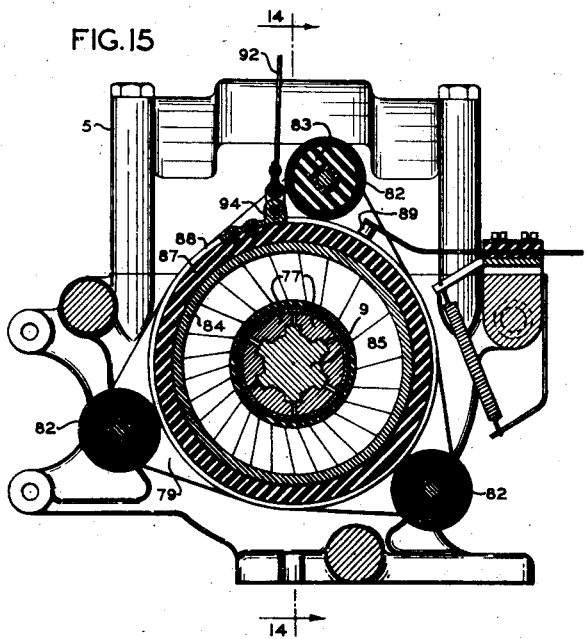
Figure 16:
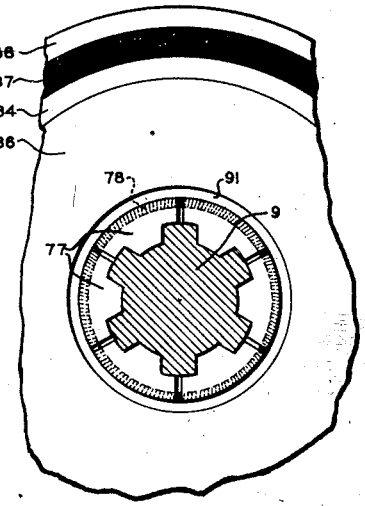
Figure 17:
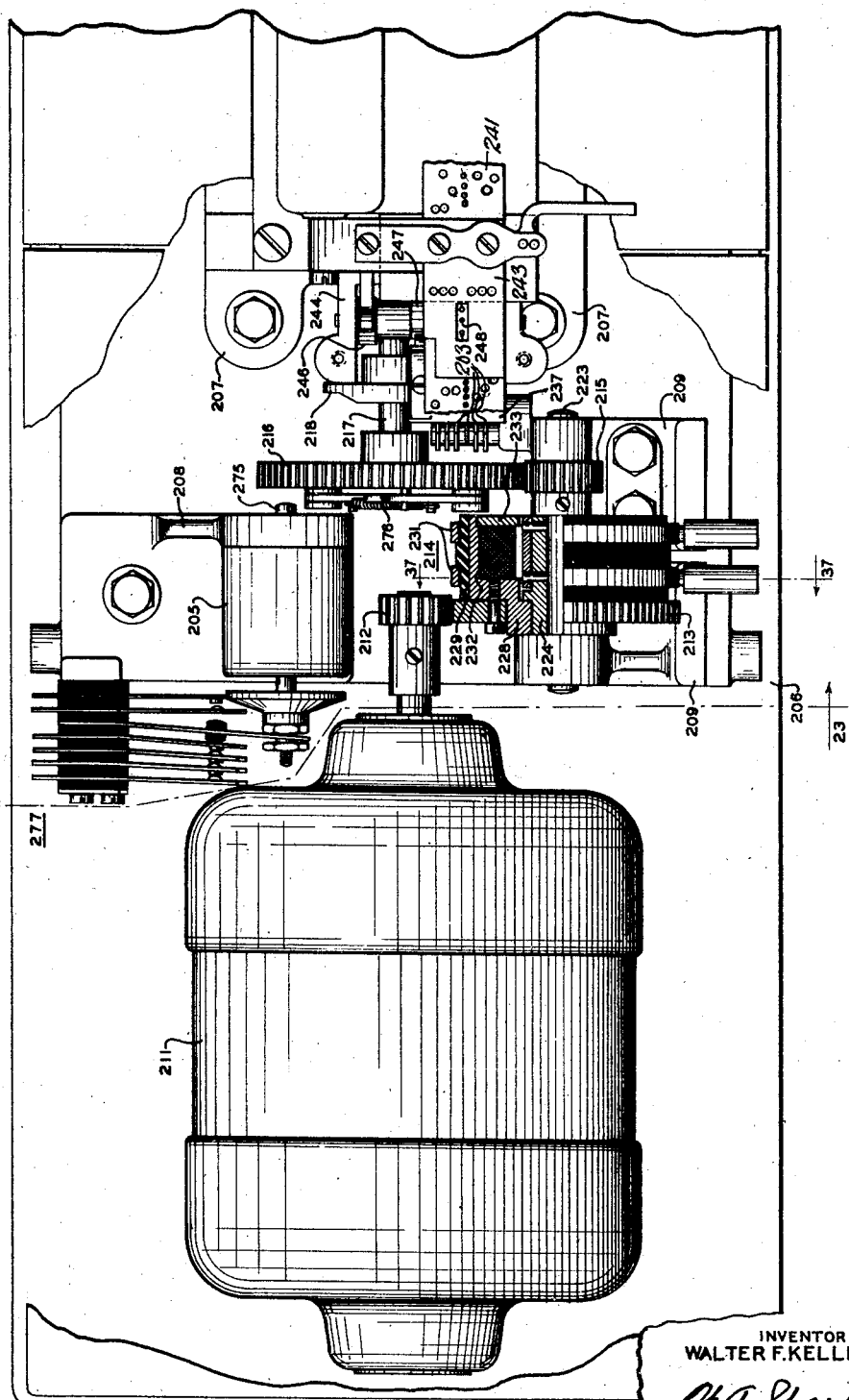
Figure 18:
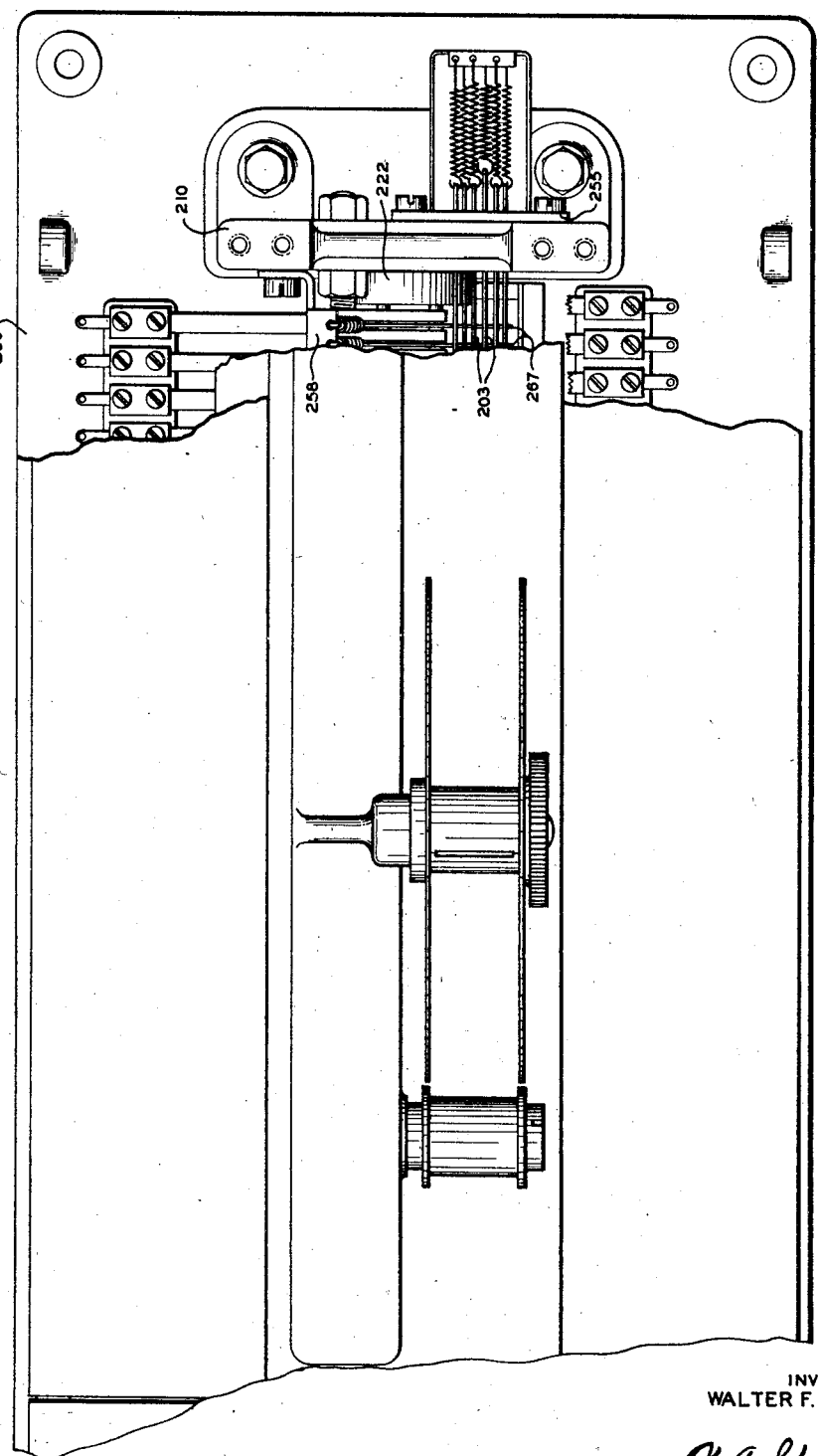
Figure 22:
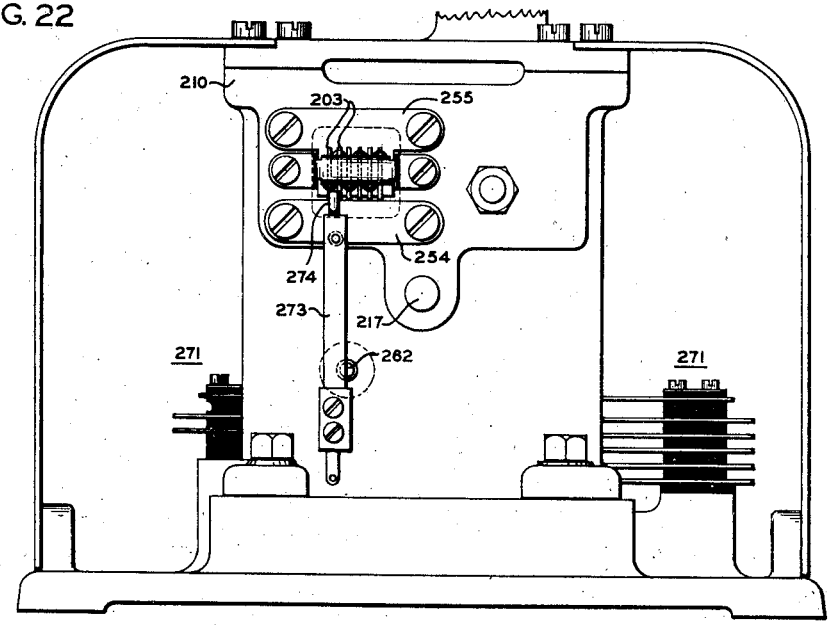
Figure 23:
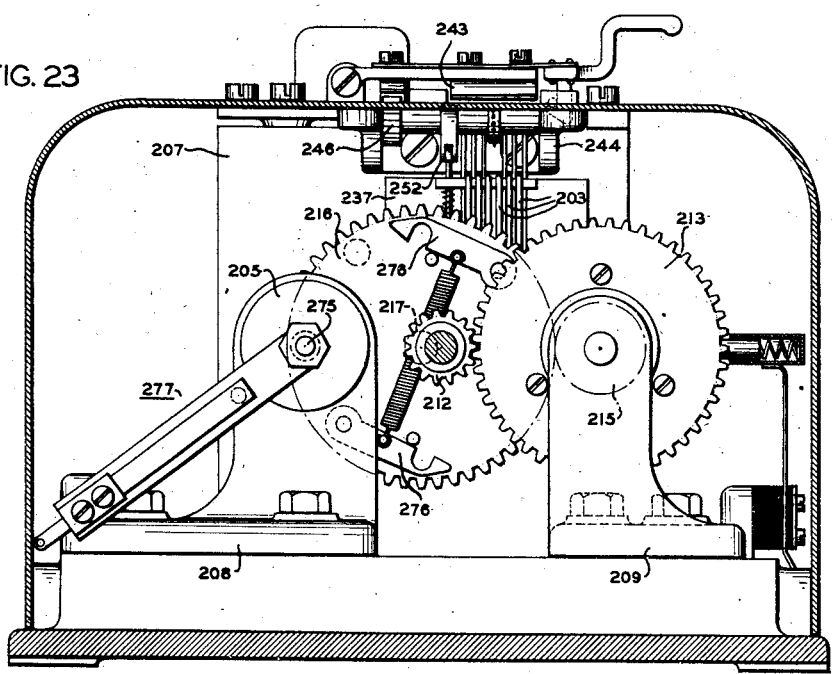
Figure 24:
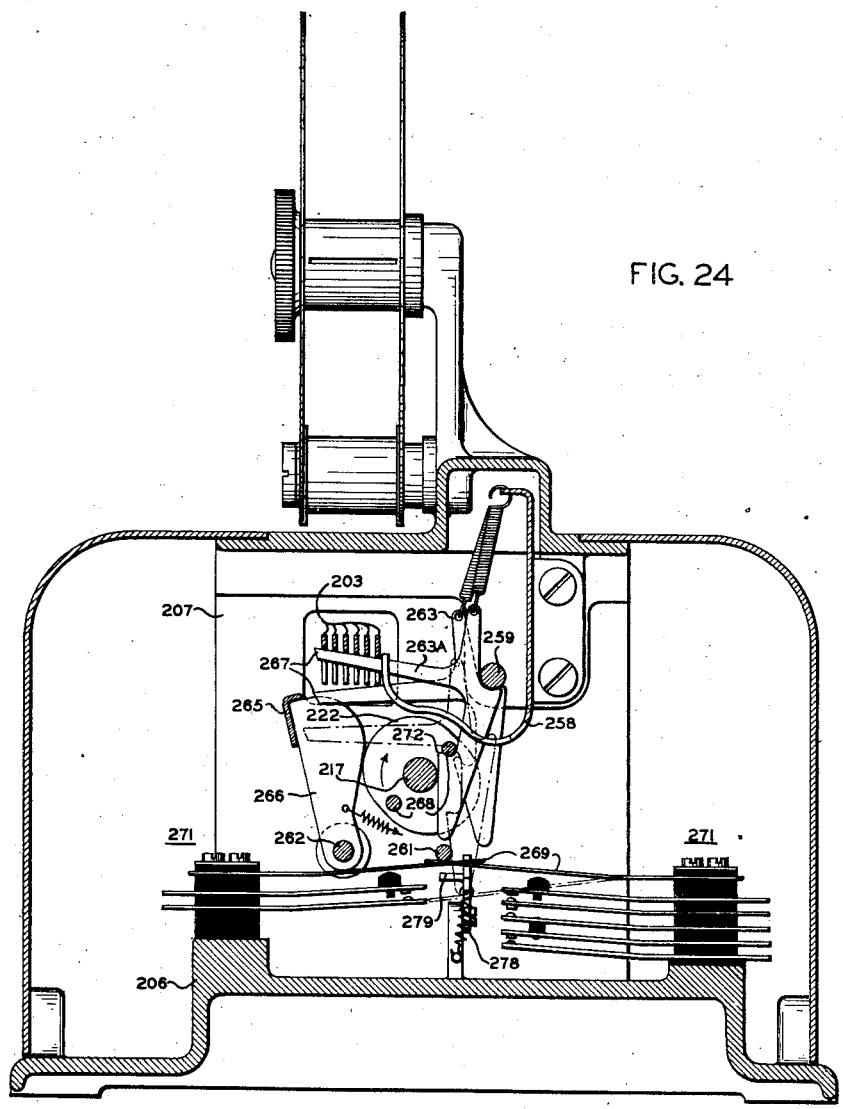
Figure 27:
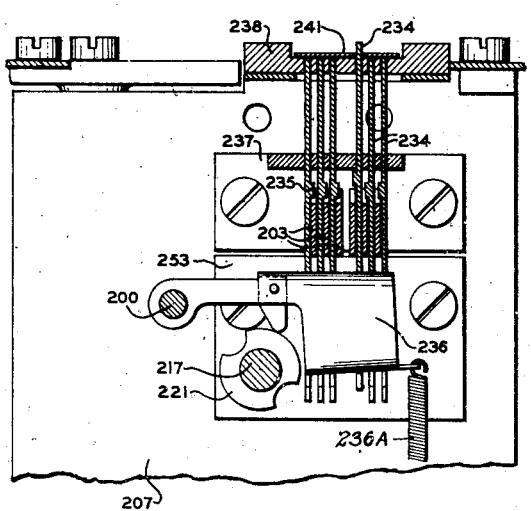
Figure 28:
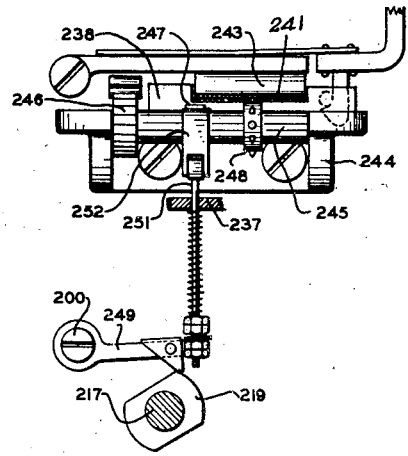
Figure 26:
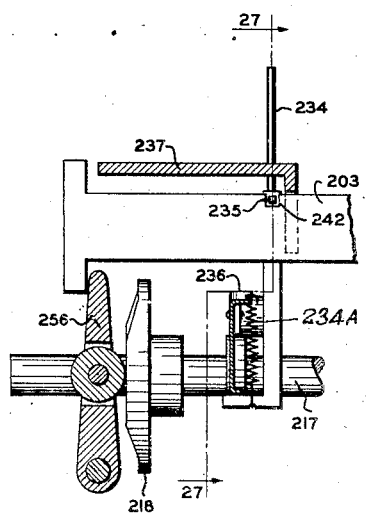
Figure 25:
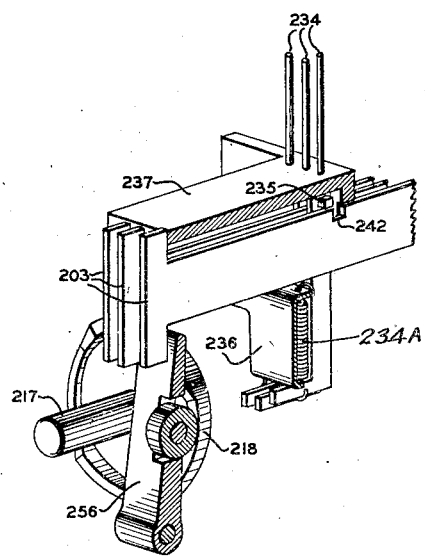
Figure 38:
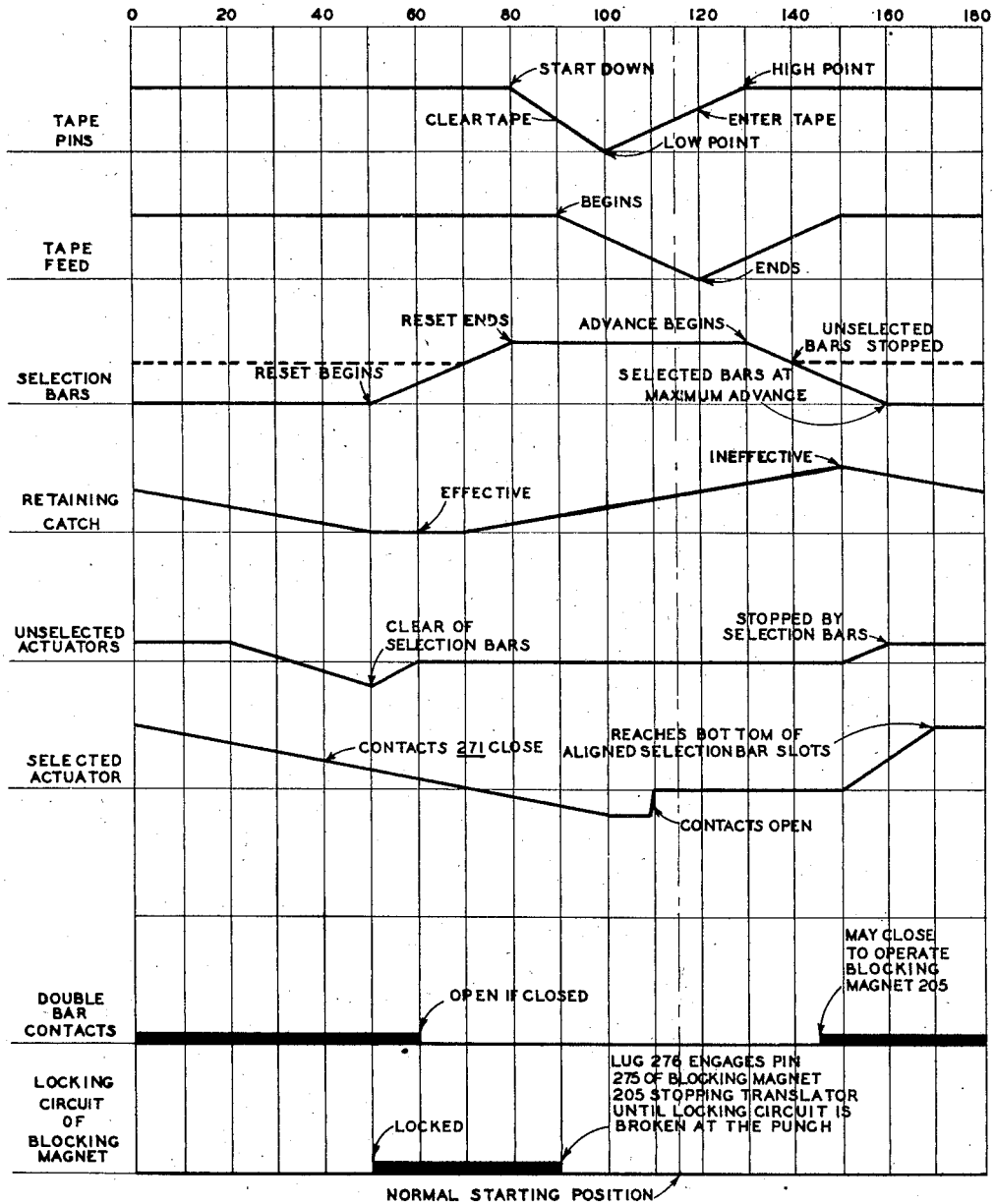
Figure 38A:
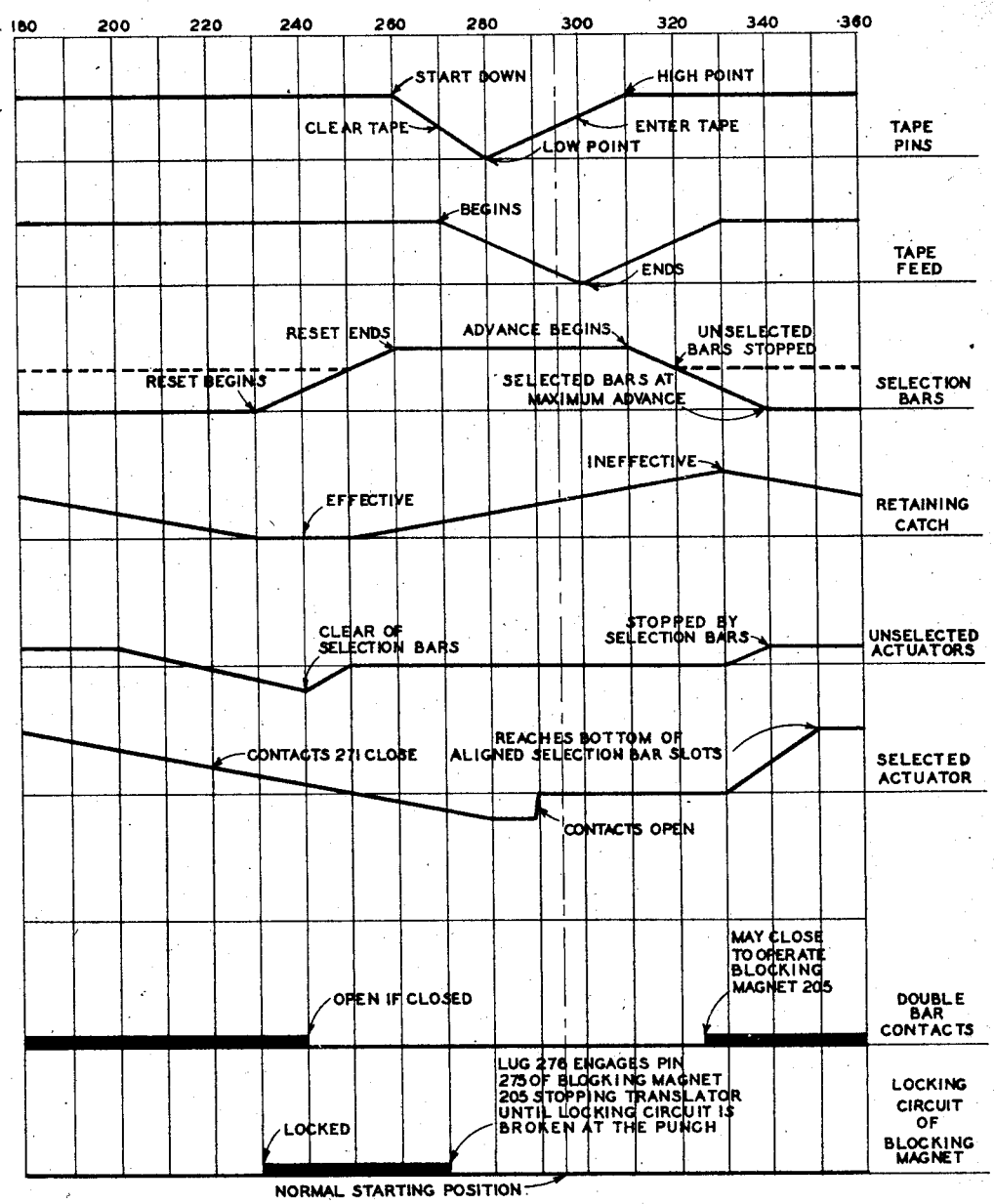
Figure 40:
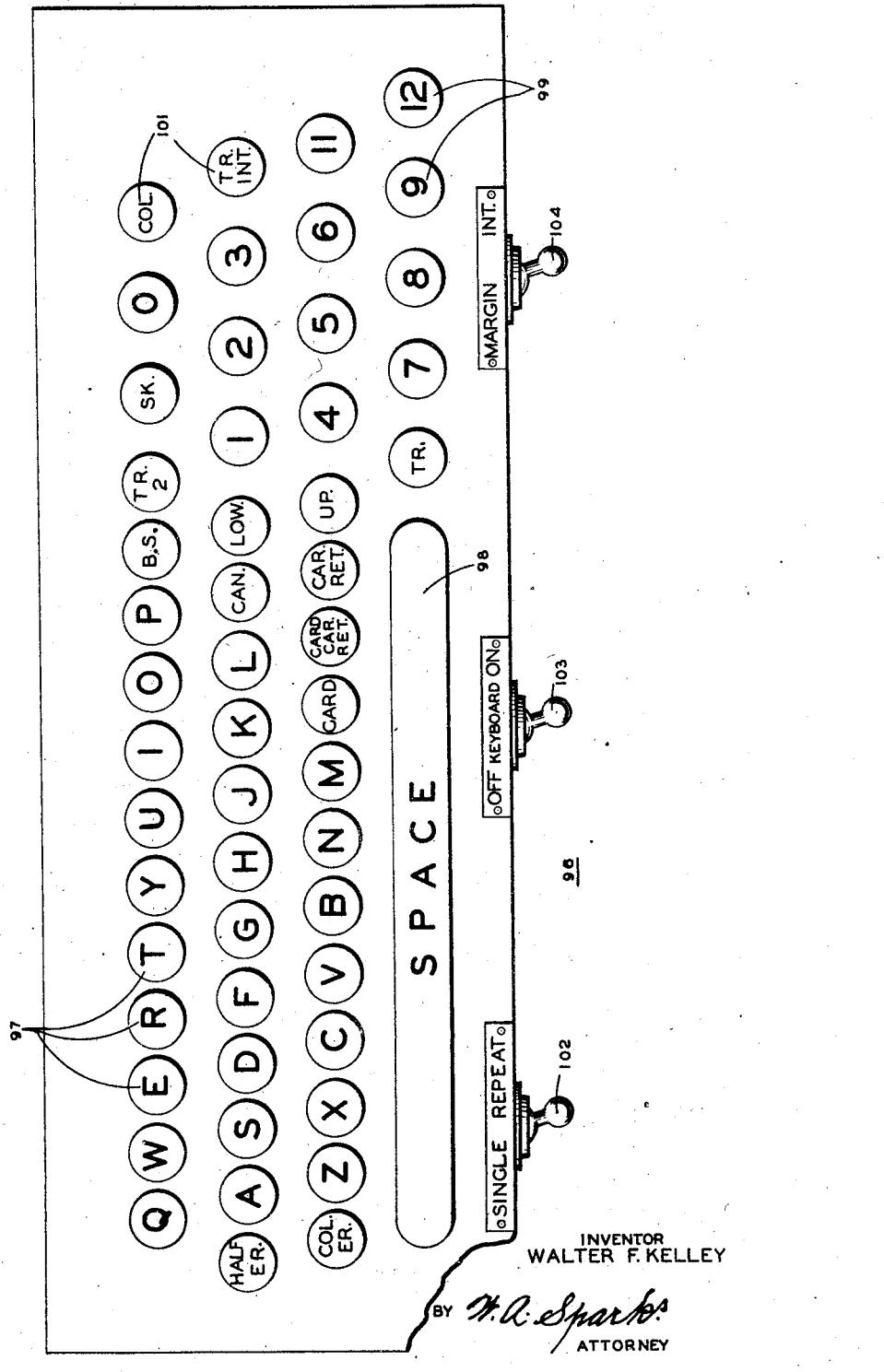

Fig. 10 is a sectional view of the transfer switch taken on line 10—10 of Fig. 8;

Fig. 11 is a front sectional view of a part of the punch carriage showing the erase mechanism in normal position;

Fig. 12 is a view similar to Fig. 11, showing the erase mechanism in actual erase position;

Fig. 13 is a view similar to Figs. 11 and 12, showing an erase bell-crank actuated to the full extent of its travel with the erasing set bar actuator snapped back to its normal position;

Fig. 14 is a sectional view of the punch clutch, taken on line 14—14 of Fig. 15;

Fig. 15 is a sectional view of the punch clutch taken on line 15—15 of Fig. 14;

Fig. 16 is a fragmentary sectional view taken on line 16—16 of Fig. 14;

Fig. 17 is a fragmentary plan view of the translator and is to be viewed in conjunction with Fig. 18, and illustrates the driving motor, clutch, tape feeding mechanism, sensing mechanism, and the control solenoid of the translator;

Fig. 18 is a continuation of Fig. 17 and illustrates the selector arms, code bars, contact springs and tape carrying mechanism;

Fig. 19 is a fragmentary isometric view of the "margin" locking and releasing mechanism;

Fig. 20 is a fragmentary front elevational view of the translator and illustrates parts disclosed in Figs. 17 and 18 and also the "margin" locking and releasing mechanism. This figure is to be viewed in conjunction with Fig. 21;

Fig. 21 is a continuation of Fig. 20 and illustrates the mechanism disclosed in Fig. 18 together with a pair of contacts for the actuation of the control solenoid disclosed in Fig. 17;

Fig. 22 is a right end elevational view with cover removed of the translator;

Fig. 23 is an end sectional view taken on line 23—23 of Fig. 17;

Fig. 24 is a right end sectional view of the present device taken on line 24—24 of Fig. 21;

Fig. 25 is a fragmentary, sectional isometric view of the present device, illustrating the code bars, their operating cam, and the relation between the code bars and the sensing pins;

Fig. 26 is a fragmentary front sectional view corresponding to Fig. 25;

Fig. 27 is a fragmentary sectional view from the left of the present device, taken on line 27—27 of Fig. 26;

Fig. 28 is a fragmentary view illustrating the punched-tape feed mechanism of the present device;

Fig. 29 is an exploded view of the code bars of the present device;

Fig. 30 is a view illustrating a fragment of tape with the code of the present invention punched therein and the corresponding interpretations for each character and operation;

Figs. 31 to 35, inclusive, are the several sheets of wiring diagrams which together make up the complete wiring diagram of the present invention;

Fig. 36 is a view illustrating how the five sheets of wiring diagram of the present invention are related;

Fig. 37 is a fragmentary, sectional view of the translator clutch taken on line 37—37 of Fig. 17;

Figs. 38 and 38a together form a timing diagram for the present invention;

Fig. 39 is a fragmentary view illustrating the retract lever of the punch;

Fig. 40 is a plan view of the keyboard used on the card punch; and

Fig. 41 discloses a card punched in the 45 column and 90 column codes.

Since the present invention involves the use of a card punch, a suitable punch will be described first. The following list of punch operations with brief definitions of each may aid materially in understanding this disclosure.

Margin—renders the intermediate stop ineffective until Break.

Break—releases Margin setting.

Space—carriage of punch advances one space of column.

Skip—carriage advances to a settable stop.

Back space—carriage returns one space.

Carriage return—carriage returns without cancellation to intermediate or marginal stop, as per setting.

Erase half—eliminates any set-up in either upper or lower zone and initiates a space operation.

Erase column—eliminates any previous set-up in both upper and lower zone and initiates a space operation.

Cancel—carriage returns with cancellation of any set-ups in both upper and lower zones to intermediate or marginal stop as per setting.

Card—operates punch to give sample card without carriage movement or any cancellations.

Card, carriage return—same as Card except that carriage returns to intermediate or marginal stop, as per setting.

Trip—gives one card followed by carriage return with cancellation of both upper and lower zones to marginal stop.

Trip to intermediate—same as Trip except to intermediate stop.

Trip 2—gives two duplicate cards followed by Cancel and Carriage return to intermediate or marginal stop as per setting.

Full column—sets transfer switch to set-up in 45-column field.

Upper—sets transfer switch for set-up in upper 90-column zone.

Lower—sets transfer switch for set-up in lower 90-column zone.

GENERAL PUNCH ASSEMBLY (Figs. 1, 2, 3, 4, 5, 6)

The complete structure of this punch mechanism may be regarded as made up of several cooperating groups of members. These groups of members are the frame, the driving mechanism, the die with its 540 openings, the gang of 540 punches cooperating with the die, the die operating mechanism, the punch guides, the card handling mechanism, the group of set bars for locking the punches so that the card may be punched by pushing the card against the locked punches and the die together with the latch slides for the set bars and the retract or clearing mechanism also for the set bars, the setting carriage, the magnet or solenoid system, the Bowden wire connection to the carriage, the carriage backspace and return mechanism including the backspace rack and operating magnet and the carriage return stop bar and operating magnet and the actuating clutches for said backspace and carriage return mechanisms, the keyboard, the relay group, the transfer switch, and the circuit connections.

FRAMEWORK AND DRIVING MECHANISM (Figs. 1, 2, 3, 4, 6, and 14)

The various punch members are mounted upon a main frame 1, which is mounted upon castings 2 and 2a, 2a being mounted upon legs (not shown) to bring the keyboard to a proper operable height from the floor. Mounted upon the main frame 1, (Fig. 1) is another frame 3 upon which is mounted a motor-generator set 4. Driven from speed reduction mechanism 5 and mounted upon short shaft 9, are three clutches 6, 7 and 8; clutch 6 being for backspace, clutch 7 for carriage return, and clutch 8 for driving shaft 10, the axis of which is directly in line with that of shaft 9, and upon which there are mounted the several driving members for the various punch operating mechanisms. These driving members include the gear 11 which drives the card handling mechanism, the cam 12 (Fig. 2), which drives the card picker knife mechanism, the box cam 13 which operates the die for the actual punching operation, the cam 14 which operates the card stop, and the commutator 127 (Fig. 33) which controls certain of the punch actuating functions.

DIE AND PUNCHES (Figs. 1 and 2)

On the main frame 1 there is formed a pair of upright frame members 1a to which are mounted a pair of extension frame members 1b, between and upon which are mounted various members of the punch mechanism. As shown in Fig. 2 die assembly 16 which includes a die plate 17, is carried between and guided by vertical grooves 18 in upright frame members 1a. A cross rod 19 is rotatably journalled between a pair of downwardly extending portions of die assembly 16. Rockably supported by frames 1a is yoke member 21, two arms of which extend rearwardly and have slotted ends which embrace cross rod 19 and a third arm of which extends towards the front of the punch and carries a roller 22 which operates in box cam 13 which, when rotated by shaft 10, will cause a positive vertical reciprocation of die assembly 16 to effect the punching of cards.

Above die plate 17 there are mounted the punches 23, there being one for each of the holes in die plate 17, usually 540 in number. Punches 23 consist of rods having a diameter which will fit the holes in the die plate and also having shouldered heads which are flattened on opposite sides to permit the use of relatively larger heads than the spacing of the punches in each column would otherwise allow. This feature also prevents undesired rotation of the punches. Punches 23 are carried in three guide plates 24, 25 and 26, plate 24 being attached to frame members 1a and plates 25 and 26 being attached to reciprocal die assembly 16. The lower plate 26 acts as a stripper plate and together with die plate 17 and card stop 27 forms a punching chamber for the reception of the cards.

As shown in Fig. 2 when the machine is in normal stopped position, with the die at the bottom of its travel, the punches are withdrawn into the body of stripper plate 26, thereby leaving the punch chamber free and unobstructed for the reception of a card to be punched.

CARD FEEDING AND HANDLING MECHANISM

*(Figs. 1, 2, 3, 4, 6)*

In order to supply cards to the punching chamber and then remove them to one or the other of the receivers 42 and 44, a card feeding and handling mechanism is provided. This consists of a magazine 28 for the reception and storage of a supply of unpunched cards 29 which are placed therein before the punching procedure is begun. A weight is usually placed on the top of a stack of cards 29.

The bottom card of a stack is caught and fed into the punch by a picker knife 31 which is adjustably mounted to a picker plate 32. Plate 32 is operated by lever 33, as shown in Figs. 2 and 3, which is connected to cam 12 which, in turn, is driven by shaft 10, rotation of which causes actuation of lever 33 which oscillates plate 32 and knife 31 to advance the bottom card of stack 29 to the first pair of feed rolls 34 which are driven, through a suitable train of gears (not shown), by gear 11 (Fig. 1), on shaft 10. Rolls 34 receive the card and advance it to a second pair of rolls 35, which, in turn, advance the card into the punching chamber over plate 17 where it is caught by skid rolls 36 and carried up against card stop 27. The skid rolls 36 are positioned at the extreme opposite ends of die plate 17 and operate in conjunction with corresponding upper presser rolls 37 which are resiliently held against them.

The various card feeding rolls are operated only during a punching cycle, since punch clutch 8 is ordinarily engaged, only during one revolution of shaft 9, for a single punching cycle to punch a card, discharge it, and feed in a fresh card. Card stop 27 is controlled by stop lever 40 which, in turn, is controlled by arm 30 having a follower roller riding on cam 14. When card stop 27 is lowered the card is advanced by skid rolls 36 to discharge rolls 38 from which it is conveyed over gate 39 to a set of chain and sprocket driven rolls 41 and thence to rear card receiver pocket 42 (Figs. 4 and 6). Gate 39 is fixedly mounted upon shaft 43 and, in the event of a "trip 2" operation, a magnet 60 (Fig. 6) will cause shaft 43 to rock and thereby tilt the forward end of gate 39 upwardly to guide the first card of a similarly punched pair of cards into the first pocket 44.

SET BARS

*(Figs 2, 11, 12, 13)*

Above the field of punches 23 there is provided a field of corresponding spring raised interponents 45, these being carried between plates which are secured to cross bars 46 which bars are, in turn, mounted to upright frame extensions 1b.

Above the field of interponents 45 there is provided a field of set bars 47 which are raised by the spring interponents 45. Each set bar 47 is equipped with a latching pin 48 and in each row of set bars, half of the pins 48 are directed towards the left and the other half are directed towards the right and since each column of set bars 47 is provided with a pair of latching plates 49, one on each side of the column (Figs. 11, 12 and 13), each half of each column of set bars 47 is subject to control by its own individual latching plate 49. The columns of set bars 47 are split into halves which are designated as upper and lower, the upper half of all the columns forming the upper zone and the lower halves of all the columns forming the lower zone, for the recording of separate data items (see Fig. 41).

For each latch plate 49, there is provided a retract lever 51 (Fig. 2) which is rockably mounted upon rod 52 and held in effective position by a resiliently held bar 53 which may be moved by an operator so that the desired retract levers 51 may be swung forwardly away from the corresponding latching plate 49 to prevent a clearing or unlatching movement of the latching plate 49 from retract lever 51 and thus retain upon the corresponding set bars 47 a given set-up of data until it is otherwise cleared or changed.

Cooperating with retract levers 51 is a retract roll 54 which is carried upon a retract lever 55, which is pivoted, near its mid-point, to an extension piece from frame 56 of a movable setting carriage. The lever 55 is actuated by a retract link 57 which is in turn attached to a manually operable carriage return lever 58 and the auxiliary retract link 59 which is, in turn, connected to lever 50 (Fig. 39). These several members are mounted on the setting carriage 56.

SETTING CARRIAGE

*(Figs. 1, 2, 7, 11, 12, 13)*

Above the field of set bars 47 there is positioned a movable setting-carriage (Fig. 7) having a frame 56. This setting-carriage is provided with three rolls 62 which ride upon rails 61, which are mounted between upright frame extensions 1b. There is also provided a pair of guard rolls 63 which are mounted upon frame 56 and are located beneath rails 61, to prevent undesirable raising of the carriage.

Underneath the carriage frame 56 there is provided a bottom plate 64 in the form of a comb. In the notches of the comb there is provided a column or row of set-bar setting-rods 65, as particularly shown in Figs. 11, 12 and 13. Setting-rods 65 are drawn upwardly by springs 66 and are pivotally connected to the horizontal arms of bell-crank levers 67. It will be observed that springs 66 are attached to set-rods 65, at a point to one side of the pivot by which they are attached to levers 67, thereby drawing the set-rods 65 both upward and against the base of the slots in comb plate 64. This feature is provided to permit movement of the carriage without damage to either the set-bars 47 or the set-rods 65 in case the set rods are not raised before the carriage is spaced forward to the next column. The levers 67 are carried upon a cross shaft 68 which is mounted between end plates 69 which, in turn, are mounted to carriage frame 56. Comb plates 71 and 72 are mounted between end plates 69, to space the setting levers 67 uniformly, there being twelve set-levers 67 and twelve set-rods 65 to cooperate with the twelve setbars 47 in any column. The upper ends of levers 67 are positioned adjacent the edge of support member 73 to which Bowden wires 74 are attached. These several lever and rod members thus serve for the depression of set-bars 47 to a position where they may be latched by latch plates 49.

SET SOLENOIDS

*(Figs 1, 11, 12, 13)*

A mechanism cooperating with the carriage is the set solenoid assembly. This assembly consists of a case 75 within which nineteen set and control solenoids 76 are positioned. These solenoids 70, as is well known in the art, consist of a non-magnetic spool on which a wire coil is positioned. The coil is then surrounded with a split iron cylinder and iron ends to form a solenoid. Within the tubular case of the spool there is positioned a freely movable iron core which cooperates with the lower end of a Bowden wire 74 to push the core of the Bowden wire upwardly, this motion being transmitted thereby to a corresponding member in the punch carriage. The upper end of each solenoid 70 has a tubular threaded end which passes through the top of case 75 and is held in place by nuts 76.

CLUTCHES (Figs. 1, 14, 15, 16)

Clutches 6, 7 and 8 may vary considerably in type of construction. While the clutches shown in the above cited Patent No. 2,124,178 may be used, a more improved type is utilized in the mechanism of the present disclosure. As shown in Fig. 14, a short shaft 9 is supported at one end by bearings in the housing of speed reduction mechanism 5. The other end of shaft 9, as may be seen in Fig. 15, is splined, to engage armature blocks 77 which are resiliently held in engagement with said splines by springs 78 which are positioned by grooves in armature blocks 77. Mounted to the side of the speed reduction housing is a mounting plate 79 and also mounted in spaced relation to said housing is a mounting frame member 81. Mounted concentrically to the axis of shaft 9 and between mounting plate members 79 and 81 are hard, grooved, insulating material rollers 82.

As may be seen in Fig. 14, back space clutch 6 and carriage return clutch 7 are identical in construction and operation. The electromagnetic units of these two clutches are rotatably supported by rollers 82 and include an iron cup member 84 having a hole through its base and in which is mounted a form wound coil 85. Fitted into the open end of cup member 84 to retain coil 85 therein, is an iron disc 86 which has a hole, through its center, the same diameter as the hole through cup member 84. Tightly fitted around cup member 84 is an insulating material ring 87 around the edges of which is mounted a pair of spaced collector rings 88. The leads of coil 85 extend through holes in the rim of cup 84, ring 87, and one each through relative rings 88 to which they are electrically connected. Riding upon each of the rings 88 is one of a pair of resiliently held wipe contacts 89 through which the clutches 6 and 7 may be actuated.

Referring to Fig. 15 it will be seen that commutator rings 88 further serve as circular tracks and engage rolls 82 which maintain the electromagnetic units in concentric alignment with shaft 9. Lateral alignment on shaft 9 is maintained through the use of spacers as shown in Fig. 14.

The holes in members 84 and 86 are of such size as to provide an air-gap 91 between them and the assembly of armatures 77 (Fig. 16). It will be seen from the above clutch description in conjunction with Fig. 14 that cup member 84, retaining disc 86, and coil 85, together, form a horse-shoe type magnet which is adapted, when energized, to attract armature members 77 to the edges of the holes in members 84 and 86 thereby causing the clutch to become effective and rotate with shaft 9 which is continually driven through speed reduction mechanism 5.

The means for releasing the current from these clutches will be described hereinafter.

Backspace pull link 92 (Figs. 1 and 15) is attached by a hinge member 94 to an insulating ring 87 of clutch 6 and carriage-return strap 174 is likewise connected by a hinge member 94 to ring 87 of clutch 7. As may be seen in Fig. 15, a resilient rubber ring 83 is provided on the upper roll 82 of carriage-return clutch 7, to act as a bumper for hinge member 94, to check the recoil of clutch member 7.

The drive clutch 7, functionally, is exactly similar and physically only slightly different from the one disclosed in the above cited Patent No. 2,124,178 (Figs. 4 and 5). The physical differentiation is well illustrated in Fig. 14 of the present drawings where it may be seen that the drive shaft 16 of the above cited patent has been replaced by two shafts 9 and 10 and that shaft 9 now carries driving member 95 upon its splined end.

The various electrical controls for these clutches will be described hereinafter under a chapter Circuits.

KEYBOARD (Figs. 1 and 3)

While the present invention is adaptable for use with any Powers punch built, up to the present time, and for that matter does not require a keyboard, a keyboard generally indicated by reference character 96, is illustrated in Fig. 1. This keyboard includes a group of long alphabetic keys 97 and a space bar 98 arranged relatively the same as the keys on a typewriter on the left side of the keyboard, another group of twelve long digital keys 99 which are located on the right side of the keyboard, and several short keys 101 for control of various punch operations such as skip, carriage return, etc., which keys 101 are located at strategic positions on the keyboard. Also, on the front of the keyboard 96 there are mounted three manual switches to be set by an operator to control various functions. These switches are trip-repeat switch 102, margin-intermediate stop switch 103, and on-off switch 104.

The operation of this keyboard is similar to that described in the above cited Patent No. 2,124,178 and since the present invention, as hereinabove stated, includes a device for automatically operating a card punch from a punched tape it is merely stated here, that all electrical connections operable from the keyboard are paralleled to the translator except the on-off switch. Throwing this switch to the "off" position disables the keyboard but allows the translator to function. Furthermore, the circuits hereinafter described apply from the translator to the various punch mechanisms.

RELAYS (Figs. 1, 3, and 11)

Some of the punch functions are controlled directly by circuits extending from the key contacts 105 to the actuating magnets 70, but other of the operations require the intervention of relays 106 for proper operation and for the prevention of improper operation, the relays in some instances serving to control two functions from a single key, or to prevent the occurrence of a function when some other function is desired alone. These relays 106 are an integral part of the punch mechanisms and are mounted upon insulating material shelves 107 at the left end of the punch, above the clutches 6, 7 and 8.

The precise arrangement of these relays on the shelves is more or less arbitrary and the functions of the several relays is shown and described hereinafter in connection with the wiring diagrams.

TRANSFER SWITCH
(Figs. 1, 8, 9, 10, 32)

In addition to the relays, there is provided a transfer switch 110 which is adapted to be controlled either from the punch keyboard or automatically from the translator of the present invention to control whether set-up in the punch will be made in the upper zone, the lower zone, or both zones for full column code work (see Fig. 41).

Since all control to the transfer switch are electrical it may be located at any convenient point and in the present disclosure is mounted underneath magnet case 75, to base casting 2a (Fig. 1).

The switch proper includes a bank of contact springs 108 which are mounted upon bar 109 and insulated from each other. The center pair of contact springs 108 (Fig. 10) straddle a nonconducting operating bar 111 which is mounted in rockable brackets 112. The brackets 112 are mounted on and extend from both sides of rock shaft 113 and carry at their extremities, armature bars 114. Cooperating with bars 114 are two pairs of magnets 115 and 116.

At the front end of switch 110 there is provided a lock mechanism as shown in Figs. 9 and 10. This mechanism includes a cross arm 117 fixed to shaft 113 and which has projections 118 which extend forwardly and are adapted to cooperate with locking steps 119 of armature members 121 which are pivoted upon screws 122. In Figs. 9 and 10 the transfer switch is shown in full column position whereat the tooth of pawl 123 fixed to the rearward end of shaft 113 is in detent 124, cross arm 117 is in a horizontal position, locking steps 119 are being pressed outwardly by spring 125 against projections 118 of cross arm 117, and contacts 126 are held closed by members 120 which are resiliently pivoted to armature members 121.

To shift the setting of the transfer switch from full column to either upper or lower positions it is merely necessary that the desired pair of magnets 115 or 116 be energized which will rock cross arm 117 thereby enabling one of locking steps 119 to engage its respective projection 118. Shifting from either the upper or the lower setting requires a more complex operation and will be described under Circuits.

The transfer switch is further provided with outlet holes in the bottom thereof, which are adapted to receive plug connectors by which the punch may be hooked up with a typewriter or the translator of the present invention or both.

Figure 33:
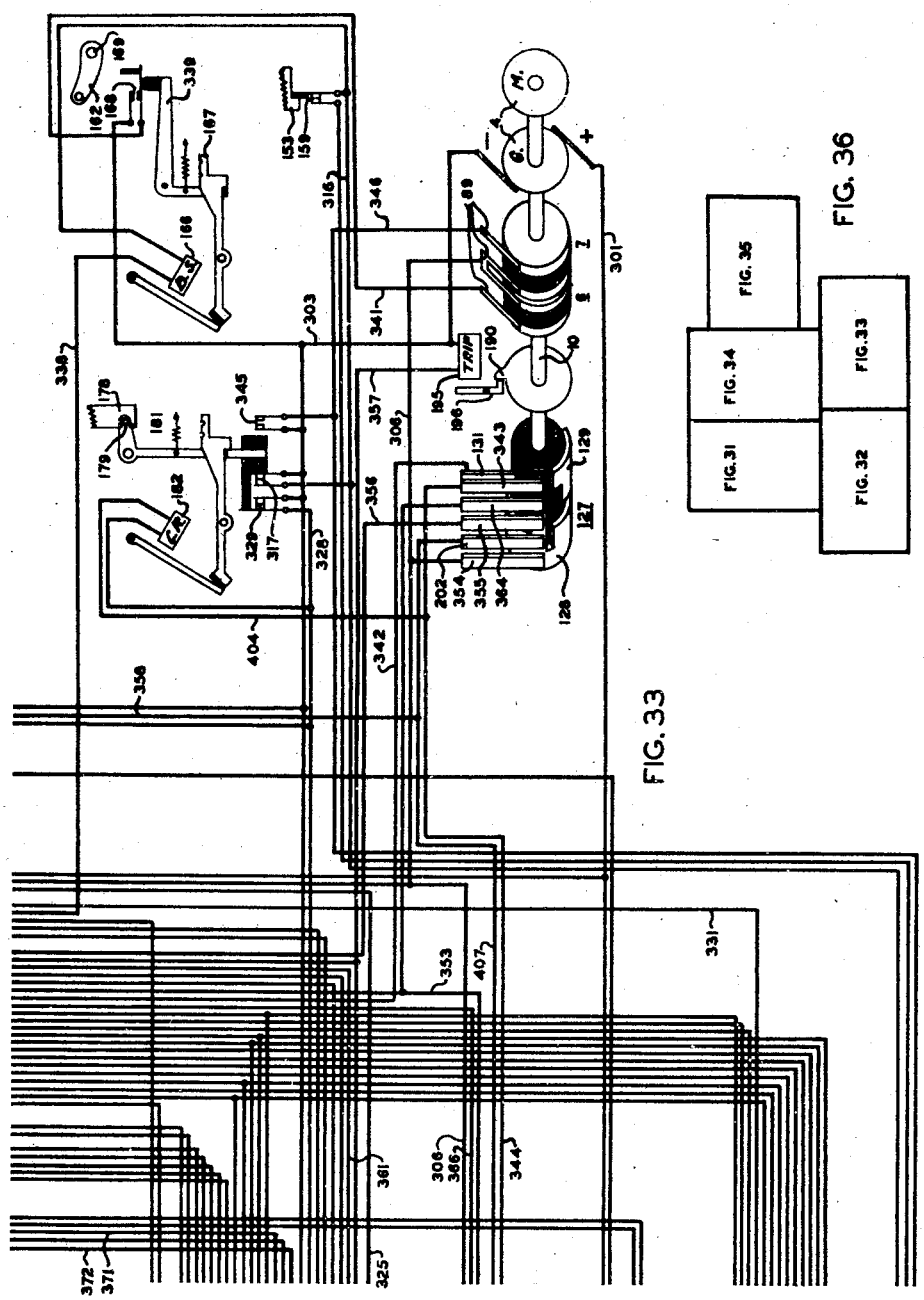
Figure 34:
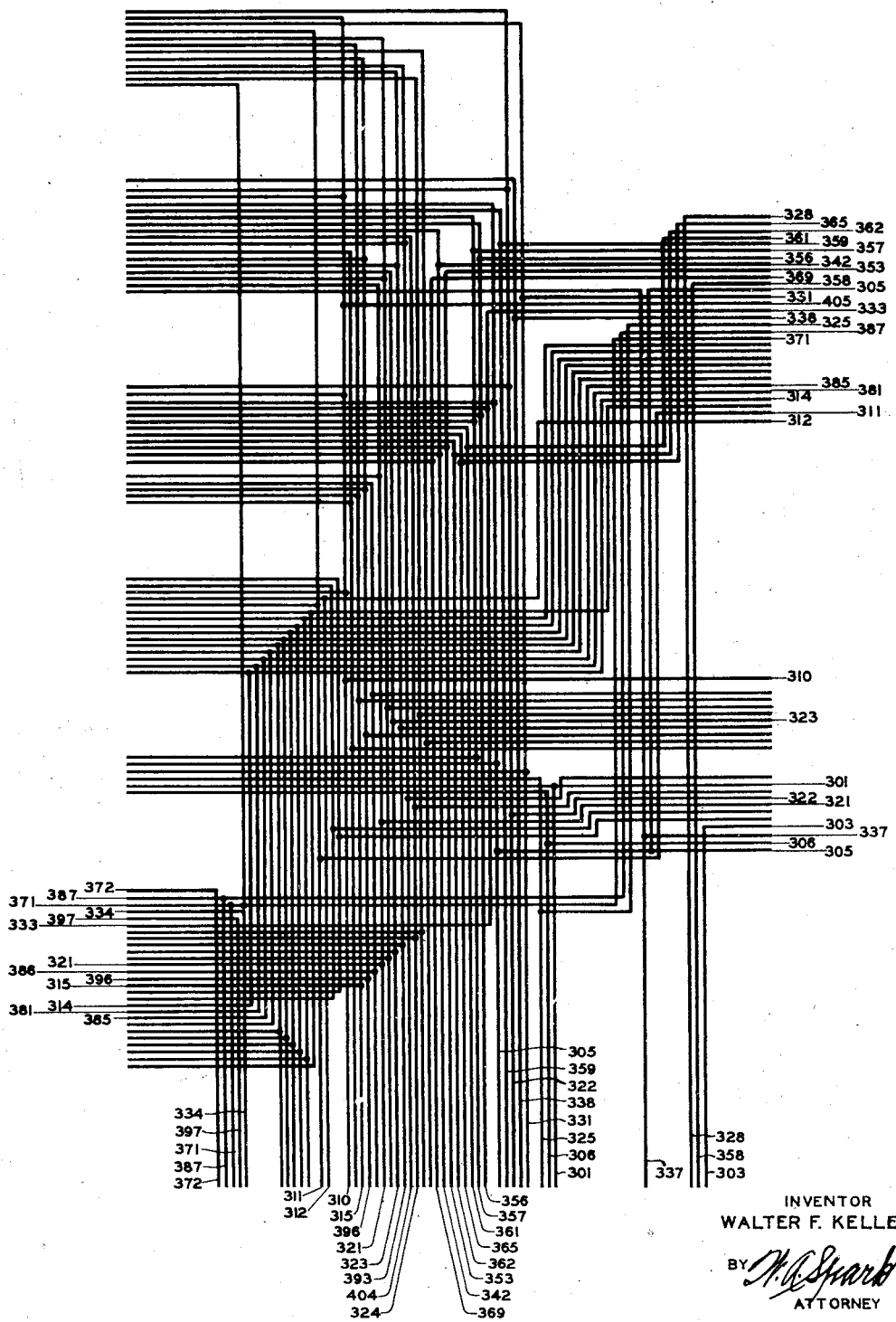

COMMUTATOR
(Fig. 33)

Another member which serves as a connection between the keyboard, the set magnets and the relays, is the commutator 127 as shown diagrammatically in Fig. 33. This commutator 127 is mounted upon punch drive shaft 10 and has an insulating material body. It has, fixed on its surface, a main segment 128 and an auxiliary segment 129. As shown in Fig. 33 there are five brushes which are adapted to bear upon the commutator. The segments 128 and 129 are of a substantial thickness and, when they engage the brushes, the brushes are lifted from the insulating material by a substantial amount. Use is made of this brush movement to open and close the contacts leading from the right hand brush (carriage return) to a contact spring 131.

The normal position of commutator 127 is illustrated in Fig. 33 wherein the "supply," the "relay breaker," and the "trip breaker" brushes are all in contact with segment 128, the "cancel" brush is upon the insulating material as is the "carriage return" brush which consequently makes contact with contact spring 131.

The relationship between commutator 127 and its supporting and driving mechanism is illustrated in Fig. 4 of the above cited Patent No. 2,124,178.

MARGIN
(Figs. 1, 2, 7)

On the punch keyboard there is provided a "margin-intermediate" switch 103 which may be set by an operator to limit any retrograde travel of the movable setting carriage to either the settable intermediate stop member 132 or the settable marginal stop member 133. When switch 103 is set for "margin," an express magnet 70 will be energized, thereby causing its relative Bowden wire 74 to actuate lever 134 which is pivotally mounted upon shaft 66 of the movable setting carriage. When lever 134 is actuated, a step portion thereof engages a lever 135 connected by a sleeve to an arm 136 which, in turn, raises block member 137 out of line with settable intermediate stop member 132. Also, a handle 138 is provided on arm 136 for the manual operation of block member 137.

When the punch is being operated from the translator of the present invention it is, of course, necessary that the functions of switch 103 be executed automatically. A suitable mechanism for this automatic operation is illustrated in Figs. 19, 20, 21 and 24, and will be described hereinafter.

SPACE
(Figs. 1A, 2, 7)

Adjacent to the upper end of the bank of set levers 67 there is provided an inverted U-shaped space bail 139 which is pivoted upon the same shaft 68 as set levers 67. The lower end of one arm of space bail 139 carries a follower roller which cooperates with a cam surface in a space lever (not shown) to rock the space lever which is connected by a sleeve with an escapement pawl 141 (Figs. 1A and 7). An auxiliary pawl 142 and a lever 143 are journalled upon the sleeve of pawl 141. Lever 143 is U-shaped at one end, which U embraces a pin extending from handle 144. Lever 143 also has an arm (not shown) which extends to the right of its pivot, beneath an eccentric stud mounted upon escapement pawl 141.

When bail 139 is actuated by movement of any of the set levers 67, escapement pawl 141 will be rocked clockwise, as viewed in Fig. 1A, thereby placing its latching end in an effective position to engage the next adjacent tooth of escapement wheel 145, and also, by means of its eccentric stud, will cause lever 143 to be rocked clockwise. As shown in Fig. 2, escapement wheel 145 is connected to a pinion gear 146 which engages a rack gear 150 which is mounted upon front carriage supporting rail 61. Since the U-shaped end of lever 143 engages the pin of handle 144, the rocking of pawl 141 will cause auxiliary pawl 142 to be withdrawn from engagement with escapement wheel 145 and thereby allow the setting carriage to advance until the hook portion of lever 141 engages the next adjacent tooth of wheel 145. Upon release of space bail 139, pawl 141 will be withdrawn, thereby releasing wheel 145 which will allow the setting carriage to travel until stopped by auxiliary pawl 142, thus completing a single space operation.

To enable space movement without actuation of levers 67 an extension 146 from bail 139 is provided and is adapted to be actuated by a magnet 70 from a key in the keyboard.

Several mechanisms described above are not shown in the present drawings but may be seen in the above cited Patent No. 2,124,178 (Figs. 1, 2, 3, 7, 8, and 18).

SKIP (Figs. 1, 2, 5, 7)

In addition to the single column spacing mechanism there is also provided a skip mechanism to permit movement of the carriage over several columns to a predetermined position. Since different skip destinations may be required for fields in the upper zone and in the lower zone, two sets of the skip mechanism are provided respectively, for the upper and lower zones; the upper zone skip mechanism being also utilized for skip operations for full column numeric or alphabetic settings, thus requiring only two skip mechanisms for the three characters of punch setting operation.

As best shown in Figs. 2 and 7, the skip mechanism includes a pair of levers 147 which are journalled upon shaft 68 and may be actuated by Bowden wires 74, and, when actuated, respectively serve to operate the skip stop levers 148 and 149, the blocking noses 157 and 158 of which, in turn, are adaptable to engage stop tabs 151. A plurality of stop tabs 151 may be placed in any of the slots 152 of bar 153, which is resiliently mounted to index plate 154 which, in turn, is mounted to extension frames 1b. As may be seen in Figs. 2 and 7, two rows of slots are provided, into which stop tabs 151 may be set as desired, to cooperate respectively with the upper and lower zone skip stop lever noses 157 and 158. Tabs 151 are slotted and are retained in slots 152 by locking comb bar 155. As shown in Fig. 2 a pair of arms 156 extend from levers 148 and 149 to the right and underlie a pin extending from handle 144 which is mounted in pawl 142.

When either lever 148 or 149 is actuated by its respective Bowden wire 74, its respective blocking nose 157 or 158 will rise into the path of tabs 151 and its extension arm 156 will lift the pin in handle 144, thereby lifting pawl 142 out of engagement with escapement wheel 145 and allow the setting carriage to travel until the respective nose 157 or 158 engages a tab 151.

As shown in Fig. 5, the resilient mounting of bar 153 is provided to operate a pair of contacts 159, to be called "skip breaker", whenever a skip operation is performed and will be described hereinafter under Circuits.

BACKSPACE (Figs. 1, 2, 7)

Situations frequently occur during the operation of a punch in which a single space retrograde movement of the setting carriage is desired, as for the correction of a wrongly made set up, or when the space key is operated by mistake, etc. For this purpose the backspace rack, pawl, and operating mechanism are provided as is particularly shown in Fig. 1. The rack member 161 has slots in its ends by which it is mounted to index plate 154 and which slots guide rack 161 downwardly and to the left, when the rack is actuated by backspace clutch 6 through pull link 92, plate 162 and links 163. Pivotally mounted upon the setting carriage is a spring urged hook member 164 which normally rides along the lower edge of index plate 154 and when rack 161 is actuated, by clutch 6, a tooth thereon will cooperate with hook member 164 to cause a single space retrograde movement of the setting carriage.

When rack 161 is actuated, it depresses a step portion 165 of lever 134 which is thereby caused to rock and consequently raise block member 137 out of line with intermediate stop member 132, as was explained hereinabove under Margin. This operation is necessary in the instance where the setting carriage has been stepped ahead to a space whereat block member 137 has just passed intermediate stop member 132, and a backspace operation is desired.

The operation of this backspace mechanism is, of course, controlled by a key in the keyboard which when depressed will cause a magnet 166 (Fig. 33) to be tripped, thereby releasing a latching member 167 to allow a pair of contacts 168 to be closed and thereby complete a circuit to clutch 6 which will pull link 92 downwardly. As link 92 nears its downward limit of travel, the lower edge of plate 162, pivoted at 169, will engage latch member 171 and force this member to rock against its spring tension and also cause contacts 168 to break the clutch circuit and still further will cause latching member 167 to be re-set. The mechanical elements of this mechanism are well illustrated in Fig. 16 of the above cited Patent No. 2,124,178.

CARRIAGE RETURN (Figs. 1, 2, 33)

Mounted upon the right hand extension frame 1b is a bracket 172 which supports a pair of spiral springs, one of which (not shown) is connected to the setting carriage and supplies motive power thereto and the other, 173, of which is connected, by tape 174 to carriage return clutch 7. A hook member 175 is fastened to tape 174 and is slidably mounted upon rod 176 which is mounted to control bar brackets 177 and engages control bar 178 for vertical alignment.

As shown in Fig. 1 control bar 178 is resiliently mounted to brackets 177 for lateral movement. A notch in the lower left edge of control bar 177 is adapted to engage an eccentric pin 179 mounted in one arm of bell-crank lever 181. Several of the mechanical elements of this mechanism are only schematically illustrated in Fig. 33 of the present drawings but will be found in Fig. 16 of the above cited Patent No. 2,124,178.

When a retrograde movement of the setting carriage to either of the stop members 132 and 133 is desired the proper key of keyboard 96 is depressed, thereby actuating magnet 182 which causes a latching member to release bellcrank lever 181 which is then caused to be rocked by spring pulled control bar 178 to simultaneously make and break certain electrical circuits which will be described hereinafter. The carriage return clutch circuit is one which will be completed by the actuations of bell-crank lever 181 as carriage return clutch 7 becomes effective, tape 174 will draw hook member 175 to the left which will engage grooved member 183 mounted upon the setting carriage which will thereby be drawn to the left until block member 137 thereon engages block member 132 or 133. When block member 137 strikes either of members 132 and 133, control bar 178 will be shifted against its resilient connections, to the left, thereby rocking lever 181 back to its normal latched position and, consequently, the circuits under control of this lever will be restored to normal. Since engagement of block member 137 with either the margin stop 133 or the intermediate stop 132 will cause the circuit of clutch 7 to be restored to its normal broken condition, the retrograde travel of the setting carriage will cease upon contact of block 137 with either stop 132 or 133 and spring 173 will draw hook member 175 to the right to its normal position. This carriage return operation is accomplished without any retraction of previously set up data.

Erase Half
(Figs. 1, 2, 7, 11, 12, 13)

Under certain operating conditions, such, for instance, as in the preparation of cards for less than carload lots of freight in freight accounting, or cards for a sale of a number of items under a single order number, or to a single customer, it is desirable that the card number, or order number, or customer's name should be set up at the time the set-up for the first card is prepared and should remain unchanged through the successive set-ups for items in that car, or in that sale, or to that customer. In order to obtain this effect, the retract levers 51 for the field in which the car number, the order number or the customer's name is set are turned down to their ineffective position away from the latching plates 49 and out of the path of retract roll 54.

As may be seen in Fig. 2, when a new set bar 47 is depressed downward, its latching pin 48 will cam against the latching nose of its respective latching plate 49, thereby forcing that latching plate to the left and releasing any previously set set-bars 47. This operation will, however, only clear single hole set-ups. In the event that the previous set-up was one including two holes, and the new set-up is a single hole set-up which single hole is the same as one of the previously set pair, there would be no release because the newly required hole would already be set up together with the other previously set-up hole and consequently the previous set-up would be the one to be punched.

To overcome this difficulty, duplicate sets of erase mechanism are provided; one for upper zone work and the other for lower zone work, and for full column work both sets are used simultaneously.

This mechanism is best shown in Figs. 11, 12 and 13, wherein three successive positions are illustrated. Each set of erase mechanism includes a key controlled solenoid 70, a Bowden wire 74, and an actuating member 186 which is pivotally mounted upon cross shaft 68 between end plates 69 and is spring-pulled against a Bowden wire support block. Mounted in an extremity of member 186 is a headed stud 187 which acts as an aligning bearing and also pivotally supports a bell-crank tripping lever 188. Still further, this stud 187 engages a slot in erasing set-member 189 which is spring-pulled upwardly and is positioned by pin 191 mounted upon guide member 192 which, in turn, is mounted upon frame 56 of the setting carriage. The lower end of set member 189 is U-shaped to form two ends which are normally aligned with setting rods 65. The sets of erase mechanism are so positioned that the lower ends of set member 189 overlie two adjacent rows of hole positions of a card, which rows are never used simultaneously, in this particular disclosure, the three and four holes of each zone.

As may be seen in Fig. 11, wherein the mechanism is shown in normal position, when the proper solenoid 70 is energized, actuating member 186 will be rocked to the left, thereby carrying stud 187 downwardly. Since tripping lever 188 is pivotally mounted to actuating member 186 and notch 193 of member 188 is spring held in engagement with pin 194 mounted upon erasing set member 189, downward movement of stud 187 will cause erasing member 189 to descend and consequently force a pair of adjacent set bars 47 downwardly.

Referring to Fig. 12 it will be seen that as members 187, 188 and 189 proceed downwardly, the horizontal arm of tripping lever 188 will engage pin 191, thereby causing notch 193 to be drawn out of engagement with pin 194 of erasing member 189 which will then be allowed, by its pin and slot connection to member 186, to snap back to its normal position (Fig. 13). The disengagement of notch 193 and pin 194 occurs at the point where latching pins 48 are in engagement with the high point of their respective latching noses on latch plate 49 whereat the latching plate will release any previous set-up.

This erase mechanism is adapted to operate automatically, whenever any one of the single-hole-set-up-initiating keys is depressed and also, in conjunction with the space mechanism, when an erase operation is initiated from the keyboard. In the instance where the transfer switch is set for "full column", both sets of erase mechanism will become effective simultaneously.

Cancel
(Figs. 1, 2)

At times it is desirable to eliminate a group of set-ups which may have been taken from an incorrect source of information, etc. For this operation a key 101 is provided which, when depressed, will effect a "carriage return" operation and will also energize a solenoid 70 which, through a Bowden wire 74, will rock retract actuating lever 50 which will cause roller 54 to assume its effective position with levers 51, as described hereinabove under Set bars, to cause the release of any latching plates 49 which roller 54 passed during its retrograde travel to whichever one of the blocks 132 and 133 is effective.

Card
(Figs. 1, 14, 33)

A "card" key is provided which, when depressed, will cause slow releasing trip magnet 195 to withdraw resiliently supported trigger member 196 from engagement with lug 190 of clutch 8. This withdrawal will permit friction disc 197 to be spring turned upon threaded sleeve member 198 and thereby enter into engagement with the constantly rotating driving disc 199, consequently rendering driving clutch 8 effective for one revolution of drive shaft 10 after which lug 190 will reengage trigger member 196 and thereby cause the connection between discs 197 and 199 to be broken. The single revolution of drive shaft 19 when initiated by the "card" key will result in the punching and delivery of a sample card but because of certain electrical connections no carriage return cancellation or any other punch operation will occur.

CARD, CARRIAGE RETURN (Figs. 1, 14, 33)

Frequently it is desirous to set up and punch data in one zone of a card, punch that card, and then produce another card containing all the previous punchings plus some new ones in the other zone. To achieve this result a "card, carriage return" key is provided which, when depressed, will produce the same result as when the "card" key is depressed. Simultaneously, the carriage will return, without cancellation, to the margin or the intermediate stop, 132 or 133, depending upon which one is in effective position.

TRIP AND TRIP TO INTERMEDIATE (Figs. 1, 14, 33)

A "trip" is provided, which when depressed will cause a punched card to be produced in a manner similar to that described hereinabove under "Card". In addition to the results produced by the "card" key, the setting carriage will be caused to return, with retract roll 54 in its effective position, to the marginal stop 133; consequently, all set-ups will be eliminated.

In addition to the "trip" key a "trip to intermediate" key is provided which, when depressed, will cause the same operation of the punch as the "trip" key, except that the carriage return will be to the intermediate stop 132.

TRIP TWO (Figs. 1, 2, 4, 6, 14, 33)

At times it is desirable to produce two identical cards such as for a cross-index record. For this purpose a key is provided which, when depressed, will cause a trip two relay 201 to be energized and locked to break the cancel circuit, lock trip magnet 195 in its effective tripping position, and energize the receiver shift magnet 60 (Fig. 6) which, through a link, an arm, and shaft 43, will set card gate 39 (Figs. 2, 4 and 6) to guide the first card punched into card receiver pocket 44. Since current for this mechanism is obtained through relay breaker brush 202, relay 201 will remain locked, as will its dependent circuits, until a break in segment 128 of armature 127 is reached. This break is timed to occur just after lug 190 has passed trigger member 196 and consequently a second card will be punched and ejected into receiver pocket 42 after which a "cancel" and a "carriage return" operation to the marginal or intermediate stop according to setting of their controlling circuit will occur.

THE TAPE CODE (Fig. 30)

Also, included in this invention is a code, to be punched in a tape to represent various indicia denoting alphabetic letters, numerals, and operations, all of which are utilized in the operations of a card punch. This code is particularly adapted for use with the translating mechanism of the present invention to operate a punch and is illustrated in Fig. 30 of the drawings. Fig. 29 is an exploded view of the selection bars 203, the notches of which have been shown in their normal relative alignment with their code interpretations.

In Fig. 30, it may be seen that no one of the alphabetic and numeric interpretations utilizes more than three of the six hole positions used and that furthermore in no instance are the first two hole positions 204 used simultaneously. It may further be observed that by using the familiar Powers card (Fig. 41) set-up of a twenty-three letter alphabet wherein certain similar letters are combined and twelve digital characters, all but one of the possible combinations including a maximum of three out of six hole positions, no one combination including more than one hole of a pre-selected pair of hole positions, have been utilized.

From further examination of Fig. 30, it may be seen that with but one exception, all of the operation indicia includes the above mentioned pair of pre-selected hole positions and that all of the possible combinations of six-hole positions which combinations include this preselected pair of hole positions, have been utilized. The one operation, "full column", which does not contain the preselected pair of hole positions is represented by the one excess combination, of the alphabetic and numeric representations.

Most of the punch "operations" require a delayed action of the punch mechanism and it is for this delay that the two preselected hole positions are used to control a timing controlling magnet 205, as will be described hereinafter. The reason that the excess combination from the alphabetic and numeric indicia may be used for the "full column" representation is that this operation is an instantaneous one which does not require any delay; and for that matter, any other operation, not requiring a delayed action, could be represented by this excess indicia.

While the first two hole positions have been used for controlling purposes in the present disclosure, any two hole positions may be used. These two positions were chosen mainly for mechanical convenience as illustrated in Fig. 22 of the drawings.

Without departing from the spirit of the present invention, this code can readily be adapted for use with a punched card system utilizing a full twenty-six letter, maximum three out of six, hole alphabetic code set-up in conjunction with a ten digit numeric set-up for use with a straight 90-column card system. To convert the present code for this use merely requires that the indicia for "12", "11", and "full column" be used to represent "V", "Q", and "Z", respectively. The "full column" representation is no longer needed because a straight ninety-column card system would only utilize an upper and a lower zone.

GENERAL TRANSLATOR ASSEMBLY (Figs. 17-29, inclusive)

The complete structure of this translator mechanism may be regarded as made up of several cooperating groups of members. These groups of members are the frame, the driving mechanism, the punched tape sensing mechanism, the selecting mechanism for determining the punch operation to be initiated, a battery of punch operation controlling spring contacts, together with actuating mechanism therefor, a circuit controlling magnet, and various circuit connections.

TRANSLATOR FRAMEWORK AND DRIVING MECHANISM
(Figs. 17, 18, 20, 21)

As shown in Figs. 17, 18, 20 and 21 the translator includes a main base frame 206 upon which is mounted a pair of upright frame members 207 and 210, which support the tape feeding mechanism, the sensing mechanism and the selection mechanism. Also mounted upon main frame 206 is a bracket 208 upon which are mounted the timing control magnet and its relative contacts. A pair of brackets 209 is mounted upon frame 206 and support the clutch 214 which is driven through gearing from motor 211 (Fig. 17) which is also mounted upon base frame 206 and operates independently from the circuits of the present invention.

As may best be seen in Fig. 17 a small gear 212 is mounted upon the shaft of motor 211 and drives a large gear 213 which, through clutch 214 and spur gear 215, drives a large gear 216 mounted upon shaft 217 upon which is also fixed selection bar actuating cam 218 (Figs. 25 and 26), tape feed cam 219 (Fig. 28), tape sensing pin cam 221 (Fig. 27) and snatch-bail carrying cams 222 (Fig. 24).

TRANSLATOR CLUTCH
(Figs. 17 and 37)

As may best be seen in Fig. 17 the translator clutch 214 is very similar, both mechanically and functionally to clutches 6 and 7 of the punch. Journalled between brackets 209 is a short shaft 223 upon which are mounted gear 215 and shouldered sleeve 224. Sleeve 224 is fixed to shaft 223 by a pair of pins 225, the ends of which extend beyond the smaller periphery thereof (Fig. 37) and serve as guiding supports for a pair of armature members 226. Additional armature members 226 are positioned by pairs of stud pins 227 which are coplanar with pins 225. Journalled upon one end of sleeve 224 and its shoulder portion is a cup member 228 made of iron or any suitable magnetic material which is further positioned by one of brackets 209 and has mounted thereto gear 213. Surrounding cup member 228 is an insulating ring 229 which, in turn, is surrounded by a pair of spaced collector rings 231 which are respectively connected to the free ends of form wound coil 232 which is positioned in cup member 228 and held therein by retainer ring 233 which may be made of any suitable magnetic material. Cup member 228, retainer ring 233 and coil 232, together form a circular horseshoe type magnet which, when energized through collector rings 231, will draw armatures 226 into engagement with internal circumferential surfaces of members 228 and 233 and thereby through shaft 223, pins 225. and 227, gears 215 and 216, and shaft 217, cause the various driving cams and elements to be driven by motor 211. A frictional type clutch is used throughout the punch to insure against breakage of parts and also because of the magnetic field cushioning effect on the mechanism.

TRANSLATOR SENSING PINS
(Figs. 17, 20, 25, 26, 27, 38 and 38a)

As may be seen in Figs. 38 and 38a), a complete cycle of operation of the translator requires but 180° of rotation of shaft 217, therefore, various controlling mechanisms are provided in duplicate. While according to this timing diagram all of the translator drawings illustrate the mechanism at the 0° or the 180° position, the actual stop-start position is at about the 115° or the 295° position of shaft 217.

The tape sensing mechanism of the present invention is best shown in Figs. 25, 26, and 27, wherein it may be seen that there are provided six sensing pins 234, having cylindrical feeling portions which are developed from a rectangular body portion from which an extrusion 235 extends and from which also extends a step portion which is held by spring 234a against the lower turned over edge of sensing pin actuating and restoring bail 236. As shown in Fig. 27, bail 236, which is pivotally mounted by a screw 200 to frame 207, is held by spring 236a in engagement with the periphery of sensng cam 221 which, when rotated by shaft 217, will cause a resilient vertical reciprocal movement of sensing pins 234 which are held in vertical alignment by brackets 237 and 238 mounted upon frame 207, and are prevented from rotating by the engagement of their flat body portions with a relative group of six horizontal selection bars 203.

As may readily be seen in Figs. 26 and 27, when pins 234 are pulled upwardly by springs 234a, those which do not find holes in tape 241 will be stopped thereby and only those which do find holes in tape 241 will continue upwardly to the limit of travel whereat lugs 235 are no longer in notches 242 in the upper edges of selection bars 203.

TRANSLATOR TAPE FEED
(Figs. 17, 18, 20, 21, 23, 27, 28)

Mounted upon the top of the translator is a short shaft which is adapted to support a reel of punched tape 241, to be fed through the translator. The tape 241 is placed in a slot in bracket 238 after which a retaining strip 243 is latched into place (Figs. 27 and 28).

As best shown in Figs. 20 and 28, mounted upon frame 207 is a bracket 244 which, in turn, rotatably supports a shaft and sleeve 245 upon which are mounted detent wheel 246, feed ratchet wheel 247, and tape feed sprocket 248. Also, pivotally mounted upon frame 207 by screw 200 is a lever 249 (Fig. 28) the free extremity of which is pivotally connected by adjustable link 251 to a hook member 252 which is held against a ratchet feed wheel 247 by a flat spring 250 mounted upon bracket 237. The link 251 is fitted through a hole in bracket 237 and is surrounded by a compression spring which extends between the lower side of the horizontal portion of bracket 237 and lever 249 and causes the camming member of lever 249 to engage the peripheral surface of the tape feed cam 219 and consequently, as cam 219 is rotated by shaft 217, hook member 252 will be caused to reciprocate vertically, thereby causing ratchet feed wheel 247, tape feed sprocket wheel 248, and detent wheel 246 to be rotated, intermittently, one punched space at a time.

TRANSLATOR SELECTING BARS
(Figs. 17 to 30, inclusive)

To cooperate with sensing pins 234 a group of six selection bars 203 is provided each one of which is adapted to slide horizontally upon supporting plates 253 and 254 which are mounted upon upright frames 207 and 210, respectively (Figs. 22, 27). To maintain bars 203 in vertical alignment and spaced relationship, bracket 237 and guide plate 255 are provided with slots in which bars 203 ride. Selection bars 203 are spring urged to the right, as viewed in Figs. 17, 18, 19 and 20, and are normally held at their extremity of travel to the left, by engagement of a downwardly extending projection therefrom, with a wide lever 256 having a roller mounted therein which engages cam 218 (Figs. 25 and 26). As stated above, only 180° of rotation of shaft 217 is necessary for a complete operation of the translator, therefore, cam surfaces are provided on cam 218 which will allow two reciprocal travels of bars 203, for every full revolution of shaft 217.

When selection bars 203 are in normal position sensing pins 234 are down and their extrusions 235 are consequently in notches 242 of bars 203, but are not touching the edges thereof (Fig. 26); thus sensing pins 234 are free to rise when released by sensing cam 221. Obviously, only those extrusions 235, of pins 234 which find holes in tape 241, will rise out of line with notches 242 of their respective bars 203 (Figs. 26 and 27) which will consequently be the only ones to travel to the right, under spring tension, when released by cam 218. As best shown in Figs. 25 and 26 bars 203 have upwardly extending projections which, when bars 203 travel to the right, are adapted to engage the horizontal arm of bracket 237, thereby accurately positioning the notches 257 in the lower edge of bars 203 (Figs. 20 and 21).

In Fig. 29 selection bars 203 are shown with slots 257 therein, in their normal relative position and in line with the tape punchings and letters which they represent, as shown in Fig. 30.

TRANSLATOR CONTACT ACTUATORS (Figs. 20, 21 and 24)

As shown in Fig. 24, mounted between upright frames 207 and 210 is a comb member 258, a positioning rod 259, a stripping bail 261, and a shaft 262. Each actuator 263 is connected from its vertically extending arm, by a spring, to comb member 258 which also maintains them in spaced vertical relationship.

When the translator mechanism is at normal rest position cams 222, mounted upon shaft 217, are so positioned as to render contact-actuator locking bail 265, mounted between cam arms 266 which are in turn mounted upon shaft 262, effective to prevent upward movement of the horizontal arms of any of the contact actuators 263. Also, when the translator mechanism is in normal position, actuators 263 are spring-held upwardly and are positioned by the engagement of their noses 267 with locking bail 265 and further by engagement of their hook-shaped bearing portions with positioning rod 259.

Mounted between cams 222 is a pair of snatch bails 268, either one of which can execute a complete operation of a contact actuator 263. After a tape sensing operation has been completed and selection bars 203 have moved accordingly, cams 222 will cause locking bail 265 to release noses 267 of actuators 263 which will then snap upwardly and rock about rod 259. As may be seen in Fig. 29, regardless of the set-up of bars 203, according to the code illustrated in Fig. 30, there will be only one row of aligned notches 257 and consequently only one actuator 263A will be allowed to rock, in a clockwise direction, far enough as viewed in Fig. 24, for a notch near nose 272 in its downwardly extending portion to become engaged with one of snatch bails 268 as it is caused to rotate by shaft 217, also in a clockwise direction. As shaft 217 continues to rotate, the engaged contact actuator 263A will be drawn downwardly and its lower extremity will depress a relative lever 269 which will, in turn, cause a relative set of contacts 271, of which there is one set for each operation and character represented in Fig. 30, to become effective to complete an electrical connection which parallels a corresponding key connection in the punch described hereinabove.

As may be seen in Figs. 18, 20, 21 and 24, the contacts 271 are arranged in two rows or banks and are interspersed from opposite sides (Fig. 18), to conserve space.

As shown in Fig. 24, after an actuator 263 has been selected the horizontal arms of the remaining unselected actuators 263 are positioned against the lower edges of selection bars 203 and consequently the noses 272 of their snatch-bail engaging hooks are in the path of bails 268. As the selected actuator 263 is drawn downwardly, cams 222 will allow locking-bail 265 to resiliently engage the ends of the horizontal arms of the unselected hooks 263 and as the active bail 268 continues to travel in a clockwise direction, it will bump the noses 272 of the unselected actuators 263 thereby causing them to rock in a counter-clockwise direction and thereby become re-engaged by locking bail 265.

As may further be seen in Fig. 24, when the selected actuator has effected an electrical connection and reached the position indicated by a phantom actuator, its lower extremity will engage stripping bail 261 which, as snatch bail 268 continues to travel, will cause the engaged actuator to be disconnected from bail 268 and subsequently snap back to its normal position against locking-bail 265 and positioning rod 259.

TRANSLATOR SPECIAL TIMING CONTROL (Figs. 17 to 23, inclusive)

As set forth hereinabove, various punch operations require more time than others to be completed, therefore, it is necessary that means be provided to effect this desired delayed action of the mechanism. As shown in Figs. 21 and 22 a pair of contacts 273, normally open, is mounted upon upright frame 21. The contact spring nearest frame 210 has fastened to its free end, an offset pin 274 which is centered between two selection bars 203 and is slightly thicker than the space between these two bars, consequently, contacts 273 may only be closed by the simultaneous movement of these two bars. If either of these two bars is moved alone, pin 274 will be brushed aside thereby merely twisting its flexible supporting spring and consequently contacts 273 will not close. It is to be understood that these two bars represent the above mentioned pair of preselected control holes and that, as also stated above, any two rows can be used to operate contacts 273.

When contacts 273 are made, magnet 205 will be energized thereby causing a blocking pin 275 (Fig. 17) to be thrust into the path of resiliently held lugs 276 mounted upon gear 216. Also, when magnet 205 is energized, a group of contacts 277 will be shifted, thereby making the "operaton" circuit and breaking the "common", the "supply", and the "clutch" circuits of the translator; but, because of residual magnetism and friction, clutch 214 will remain effective until one of the latching lugs 276 engages pin 275 of magnet 205. Since the actuating circuit for magnet 205 is completed through contacts 273 and these contacts are released before an operation is completed, a locking winding is also provided in magnet 205, the circuit of which winding is completed through the making of a set of operation contacts 271 and will be described hereinafter under Circuits.

MARGINAL-INTERMEDIATE CONTROL
(Figs. 19, 20, 24)

As set forth hereinabove, the manual switch 103, for control of the intermediate stop block 137, must be supplemented, in the translator, by automatic means operative from a punched tape. As shown in Fig. 20, pivoted upon a boss of base 206 is T-shaped lever 278 which is spring pulled to the right against a lever 269A. When it is desired that the marginal function of switch 103 be effected from the translator, lever 269A is depressed, by a regular translator operation, and is mechanically held depressed by its engagement with a notch in the side of the right hand arm of T-shaped lever 278, until mechanically released by the engagement of the "break" actuator with a step 279 of the left hand arm of T-lever 278. The depression and locking down of lever 269a will cause the completion and maintenance of the circuit which operates the intermediate stop operating solenoid, until released by a "break" operation of the translator.

OPERATION

First of all, the driving motors of both the punch and the translator are started and, since the translator clutch circuit is normally made, the intermittent tape feed mechanism will function to draw the tape 241, which has been prepunched according to the code set forth in Fig. 30, through the sensing zone of the translator until spring urged sensing pins 234 thereof find a set-up of holes in the tape. As viewed in Figs. 38 and 38a the normal starting position, of a cycle of translator operations, is about 115° whereat sensing pins 234 are just about to penetrate the tape 241. At about 120° the pins penetrate the tape, the tape feed ends, and all actuators 263 are at the locking bail 265. At about 130°, pins 234 reach their highest position and the spring urged selection bars 203 are allowed, by cam 218, to advance. At about 140°, extrusions 235, of pins 234 which did not find holes in tape 241, engage notches 242 in selection bars 203 and consequently only those bars 203 whose sensing pins have found holes in the tape will continue to travel upwardly. At about 150° the locking bail 265 is withdrawn by cams 222 and at about 160° all of the active selection bars 203 are at their maximum advance position and all actuators 263 are against the bottoms of selection bars and, furthermore, the selected actuator 263a is in its relative slots 257 whereat a hook portion of this selected actuator is effectively positioned to engage one of the snatch bails 268 carried by cams 222. At about 180° the selected actuator is engaged by one of snatch bails 268 and is drawn downwardly and at about 220° will cause its relative set of contacts 271 to close, thereby causing the completion of a circuit parallel to a corresponding key on the punch keyboard, which circuit will cause a punch operation to be initiated just as though that key had been depressed manually.

At about 230°, all of the actuators 263 have been rocked clear of selection bars 203 by snatch bail 268 and cam 218 commences to reset selection bars 203. At about 240° the locking bail 265 is again in its effective locking position. At about 260° the reset of selection bars 203 is completed and sensing pins 234 start down and clear the tape at about 270°, at which point the tape feed begins. At about 280°, pins 234 reach their lowest position and the selected actuator 263 is at its maximum stroke and at about 290° this selected actuator is stripped from bail 268 by engagement with stripping bail 261. The translator will again be at normal at about 295°. As set forth hereinabove and as may be seen from the timing chart, only 180° of a revolution of drive shaft 217 is necessary for a complete translator operation, therefore each full revolution of this shaft will result in two complete operations.

In the event that the initiating punching in the tape included the pair of preselected positions which result in the full travel of the first two selection bars 203, the contacts 273 will be made at about 145°. The making of these contacts will cause magnet 205 to be energized, thereby positioning blocking pin 275 where it can be engaged by one of resiliently held lugs 276 mounted upon gear 216, and, furthermore, causing the "operation" circuit to be made and the "clutch", the "common", and the "supply" circuits to be broken; however, the clutch 214, through residual magnetism and friction, will remain effective until one of the lugs 276 engage pin 275 of magnet 205. Since the operating circuit for magnet 205 is completed through contacts 273 at about 145° and, since these contacts 273 are re-opened at about 240°, a locking winding is provided in magnet 205, which is energized at about 230° by the closing of a set of operation contacts 271. Also, at 230° all of the actuators 263 are clear of the selection bars 203 which then begin to reset. At 240° the locking bail 265 is again in effective position to retain actuators 263 and the double bar contacts 273 are opened, thereby releasing the operating current from magnet 205 the armature of which, however, will not move because of its locking winding which was effected at about 230°. At about 260°, the selection bars 203 are completely reset and sensing pins 234 start downwardly. At about 270°, pins 234 are clear of the tape, the tape feed begins, and a lug 276 on gear 216 engages pin 275 of magnet 205 thereby positively rendering clutch 214 ineffective.

When the locking circuit of magnet 205 is broken at the punch, contacts 277 and pin 275 will be restored to normal and consequently clutch 214 will re-start the translator mechanism. At about 280°, the sensing pins 234 are at their lowest position and the selected actuator 263 is at its maximum stroke. At about 290° the selected actuator 263 engages stripping bail 261 and is disconnected from its cooperating bail 268, thereby releasing its relative contacts 271 which reassume their normal open position whereat a cycle of operations of the translator of the present invention is completed.

When tape 241 has run out, all six pins 234 will rise, thereby effecting a break operation followed by a tape feed operation. This action will continue until the motor 211 is shut off. To control this motor, and for that matter the punch motor also, by the presence or absence of tape going through the translator, is such a simple and variable mechanical problem that it has been omitted from the present disclosure.

CIRCUIT

Figs. 31, 32, 33, 34, and 35, when assembled, as shown in Fig. 36, illustrate the complete operating circuit of the present disclosure. In this circuit the various mechanisms and wiring are shown as set for forty-five or full column work.

Figure 32:
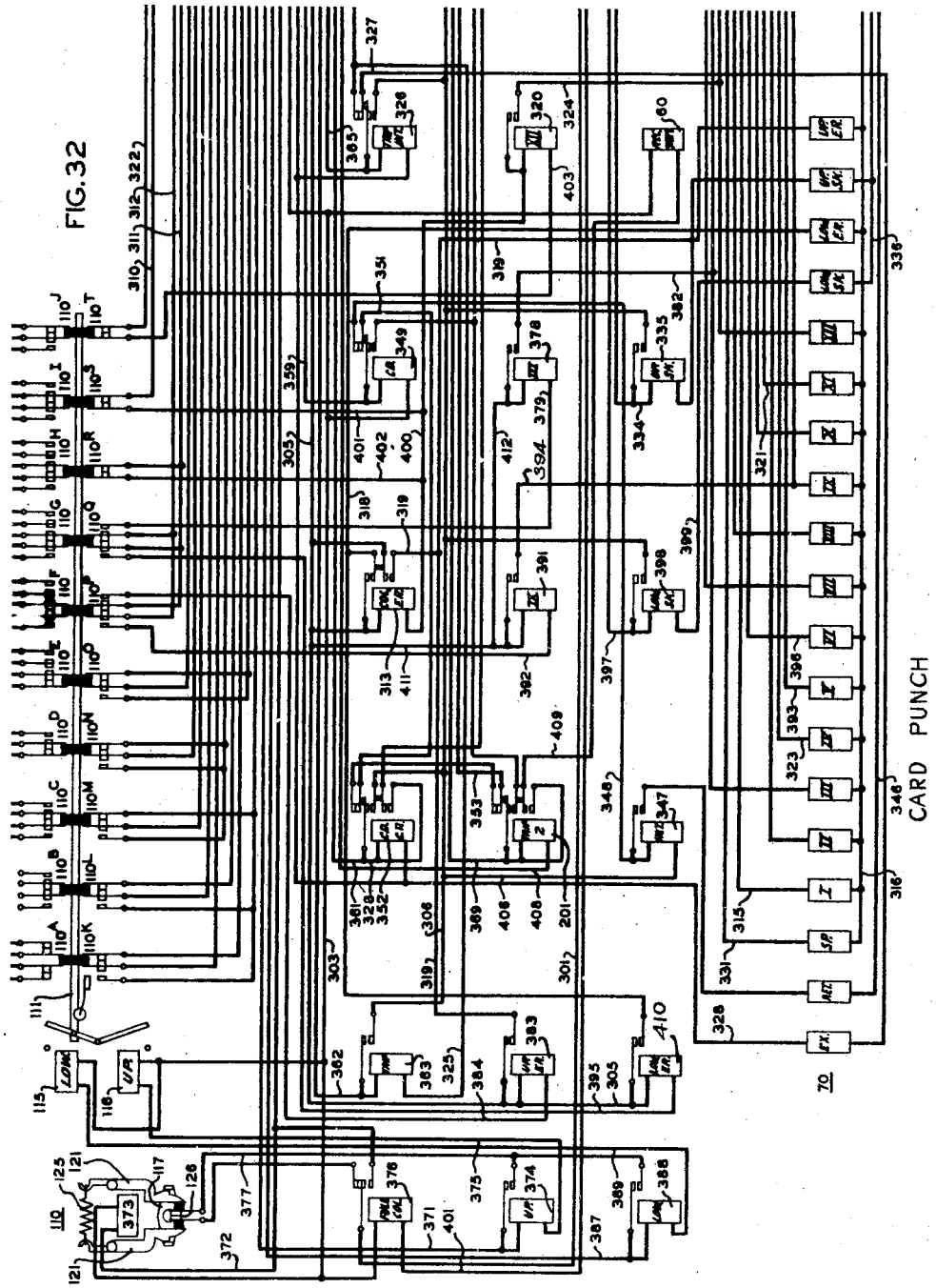
Figure 35:
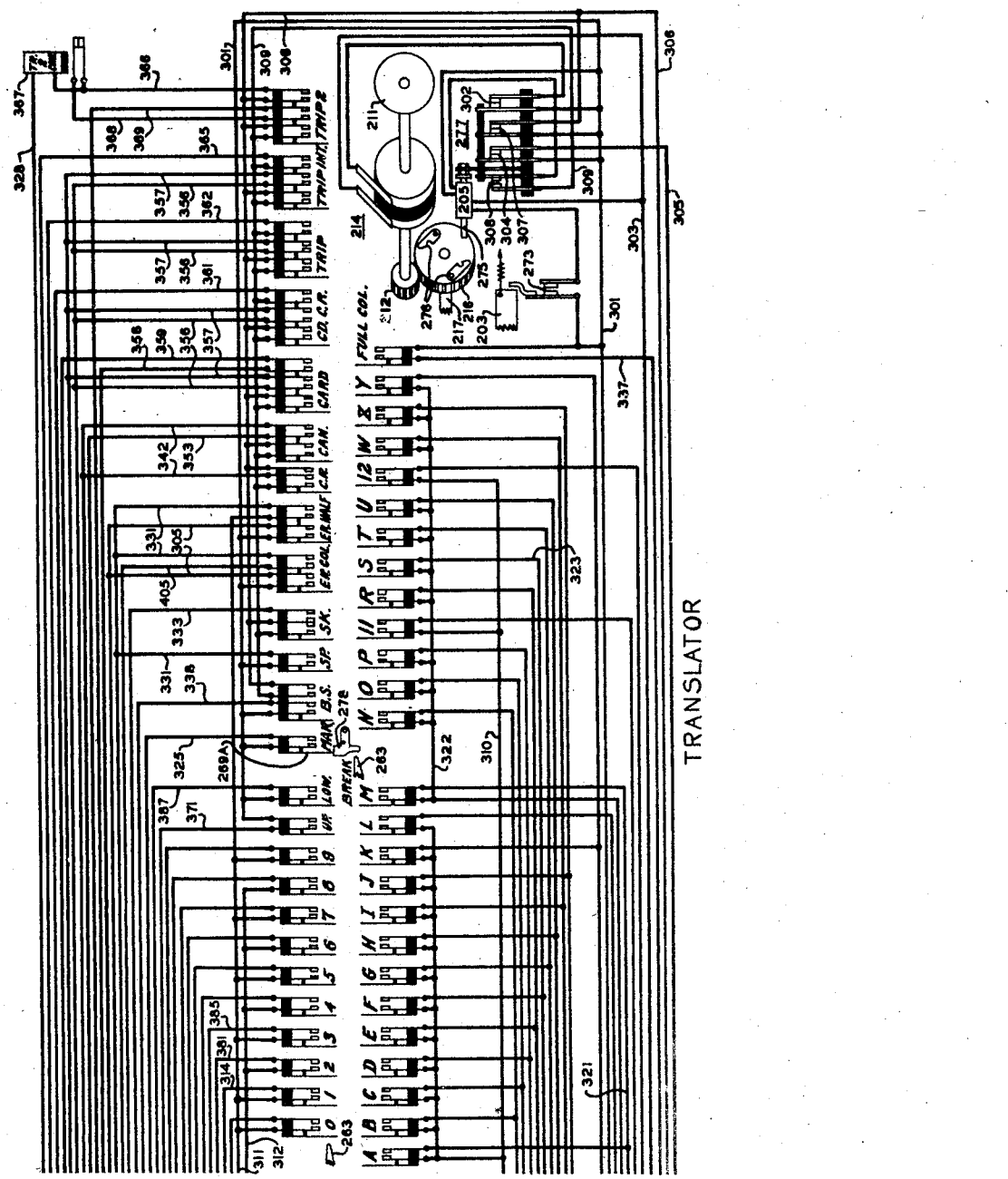

The general content of these figures is as follows: Fig. 31 illustrates a punch keyboard, Fig. 32 illustrates the punch relay group, punch solenoids and transfer switch, Fig. 33 illustrates the carriage return, backspace, and driving mechanisms of the punch, Fig. 35 illustrates all circuit connections to the translator and its driving mechanism, and Fig. 34 contains the cross wiring between the various circuit sheets.

As stated hereinabove, each set of actuation contacts 271 of the translator is electrically connected in parallel to the keyboard of the punch, therefore, all circuits will be described as being initiated from the translator. The translator motor 211 and motor generator set 4 of the punch may be operated from any available source of current or power supply, and it is to be understood that the direct current for the operation of the various elements of the present invention is derived from the generator of motor generator set 4. When set 4 and translator motor 211 are running, current is supplied from positive generator over conductor 301, translator clutch contacts 302 of set 277, through translator clutch 214, to negative conductor 303; thus, clutch 214 will be energized and, consequently, the translator will be caused to operate in the manner described hereinabove.

45-COLUMN SET-UP

As stated hereinabove the circuit as disclosed illustrates the mechanism and wiring as set for forty-five or full column work. Therefore, examples of punch sets-ups by the translator for this type of work will first be traced through the circuit diagrams. As shown in Fig. 35, one of a pair of contacts 304 is connected to positive generator over conductor 301 and the other of this pair of contacts 304 is connected to "common" conductor 305. This "common" conductor 305 is used to carry current to various elements of the present invention and, obviously, whenever magnet 205 is energized for any of the reasons set forth hereinabove, any circuits which are completed through this conductor 305 will be broken; thus, when an operation, i. e., back space, space, etc., is initiated by the translator, the various punch keyboard controls which utilize this conductor 305 will be rendered ineffective.

As set forth hereinabove, it is proposed that the translator of the present invention be a complete unit (Fig. 35), which may be electrically connected to a punch through a plug connector of the type disclosed in the above cited Patent No. 2,124,178 and shown in Fig. 8 of the present drawings. As shown in Fig. 31, a switch 104 is provided so that, when a translator, or any other mechanism adapted to operate with the punch, is disconnected by withdrawing its plug, positive current may be applied to both the conductor 305 and the "supply" conductor 306.

For a typewriter hook-up similar to that shown in the above cited Patent No. 2,124,178 it would be necessary that switch 104 be so set as to disconnect positive current from both conductor 305 and conductor 306 in order to disable the operation circuits of the punch keyboard. In the present translator-punch hook-up the setting of switch 104 is immaterial inasmuch as that conductor 305 receives positive current from conductor 301 through contacts 304 and conductor 306 likewise receives positive current from conductor 301 through contacts 307; and, furthermore, the sensing of any "operation" set-up will cause magnet 205 to be actuated, thereby shifting the group of contacts 277 and disconnecting positive current from conductors 305 and 306, consequently disabling any keyboard control circuits fed therefrom. From this it may be seen that, in the case of a permanent translator-punch hook-up, the switch 104 could be entirely eliminated.

As may be seen in Fig. 35, when magnet 205 is energized, positive current is carried from positive conductor 301 through the low wound locking winding of magnet 205, through contacts 308 of set 277 to the "operation" conductor 309. It may also be seen in Fig. 35 that the "odd" conductor 311 is common to the "0, 1, 3, 5, 7, 9" and "erase-half" sets of contacts 271 of the translator and that this "odd" conductor 311 through the mid-contacts of sets 110$^P$ and 110$^Q$ (Fig. 32) is connected to "even" conductor 312 which is common to the "2, 4, 6, and 8" sets of contacts 271 of the translator. It may further be seen in Fig. 35 that positive current is applied from conductor 305, through the winding of "column erase" relay 313, over conductors 400 and 401 through contacts 110$^S$, to "A to L" conductor 310 which is commonly connected to the "A" to "L" sets of contacts 271 and also to the "11" and "12" sets (Fig. 35). Since, as may be seen in the above statements, one of each pair of digital contacts 271 is connected to a common conductor, the initiation and completion of the circuit of any one pair will be sufficient for a thorough understanding of all 45-column digital operations.

When, for instance, a tape punching initiates a closing of the "1" set of contacts 271, a circuit will be completed from conductor 305, through the winding of "column-erase" relay 313, conductors 400 and 402, through contacts 110$^R$ of the punch transfer switch, over conductor 311, the "1" set of contacts of the translator, conductor 314, mid-contacts of set 110$^G$, conductor 315, through the winding of the punch solenoid I, over bus conductor 316, breaker contacts 317, to negative conductor 303, thus operating the punch solenoid I.

Since this circuit is completed through the windings of the column erase relay 313 and the solenoid I, they will be operated simultaneously. The actuation of the column erase relay 313 (Fig. 32) will also cause positive current to be carried from conductor 305, through the upper and lower contacts of relay 313, over conductors 318 and 319, through the windings of the lower and upper erase solenoids (L. ER. and U. ER.) respectively, over bus conductor 316, through breaker contacts 317, to negative conductor 303, thus operating the upper and lower erase mechanisms to insure the erasure of any previous punch set-up.

If it is desirable to set up any of the letters from A to L, inclusive, which, like the twelve digital characters, are represented by single hole punchings in a card, the circuit is very similar to that for initiating any of the twelve digital characters. For instance, if the "A" contacts of the translator are closed, a circuit will be completed to operate the upper erase, lower erase, and the XI solenoids, from conductor 305, through the winding of column erase relay 313, conductors 400 and 401, through contacts 110$^S$, over conductor 310, the "A" set of contacts, conductor 321, through the winding of punch solenoid XI, conductor 316, breaker contacts 317, to negative conductor 303.

The automatic erase circuit from the column erase relay 313 is exactly similar to the one just described for the set-up of a "1" and, therefore, need not be described again.

Set-ups of any of the letters "M to Z" are initiated through circuits very similar to the two just described. For example, let us suppose that it is desired to set up the letter "S" in the punch. When the "S" contacts of the translator are closed, a circuit is completed to operate the upper erase, lower erase, solenoid IV, and solenoid XII from positive generator, over conductor 305, through the winding of "column erase" relay 313, conductor 400 through the winding of the XII relay 320, conductor 403 through contacts 110$^T$, over "M to Z", common conductor 322 which is connected to one of each pair of "M to Z" contact sets 271, through the "S" contacts of the translator over conductor 323, through the winding of solenoid IV, conductor 316, breaker contacts 317, to negative conductor 303. When relay XII 320 is actuated, positive current is carried over conductor 400 through its contacts, conductor 324, through the winding of the XII solenoid, over conductor 316, breaker contacts 317, to negative conductor 303. The completion of this circuit through column-erase relay 313 will also cause the simultaneous operation of both erase mechanisms in a manner exactly similar to that of the two preceding set-ups and need not be discussed here.

While it was set forth hereinabove that only single hole set-ups required an automatic erase operation, the fact must be kept in mind that the 45-column alphabetic code utilizes both the upper and lower zones of a card and consequently, in some instances, one hole may be required in the upper zone and the other in the lower zone. With this condition it may readily be seen that there are really two single hole set-ups. Therefore, automatic erase is required in both zones.

*Margin.*—When a margin operation is sensed in the translator, the two preselected bars 203 will travel simultaneously, thereby closing contacts 273 and applying positive current from conductor 301, through the winding of magnet 205, over conductor 303 to negative, consequently operating magnet 205, thereby causing contacts 277 and blocking pin 275 to be shifted. When contacts 277 are shifted, contacts 308 are made and clutch contacts 302 are broken, but, as explained above, the clutch remains effective. "Common" contacts 304 and "supply" contacts 307 are also opened. Subsequent to the travel of preselected bars 203, a pair of the contacts 271 will close and be mechanically latched closed by lever 278. For this particular set-up there is no need of a pause of operations, and, therefore, no circuit is provided through the locking winding of magnet 205 and, consequently, shaft 217 of the translator is not stopped. When the selected actuator 263 closes the contacts MAR., positive current is fed from conductor 301, through contacts MAR., over conductor 325, through the upper contacts of "trip to intermediate" relay 326, over conductor 327, through the winding of "express" solenoid EX., over conductor 328, through "carriage breaker" contacts 329, to negative conductor 303.

*Break.*—When a break operation is sensed, the action of the translator is mechanical, that is, the preselected bars 203 will travel in their usual manner for "operations" and subsequently an actuator 263 will trip off latch lever 278, thereby removing current from express solenoid EX. and releasing block member 137 (Fig. 1).

*Space.*—When a space operation is sensed the pre-selected pair of bars 203 and their dependent mechanism operate in a manner similar to the one just described and, when the contacts SP. of the translator are closed by a relative actuator 263, a circuit is completed to operate the "space" solenoid, from conductor 301, through contacts SP., over conductor 331, through the winding of solenoid SP. (Fig. 32), over conductor 316, through contacts 317, to negative conductor 303.

*Skip.*—When a "skip" operation is sensed by the translator, the preselected pair of bars 203 and their dependent mechanism operate in their usual manner, but to provide time for the punch carriage to skip, a pause of operation is necessary. Therefore, a circuit is provided through the locking winding of magnet 205. This locking circuit will cause blocking pin 275 to remain in the path of lugs 276, one of which will engage said pin, thereby stopping the rotation of translator shaft 217 until the locking circuit is broken.

When the contacts SK. of the translator are closed, a circuit is completed to operate the "upper skip" solenoid from conductor 301, through the locking winding of magnet 205, through contacts 308, over conductor 309, through contacts SK., over conductor 333, through mid-contacts 110$^C$ over conductor 334, the winding of "upper skip" relay 335, through the winding of the upper skip solenoid UP., SK., over conductor 336, through "skip breaker" contacts 159, over conductor 316, through contacts 317, to negative conductor 303.

Also, when translator contacts SK. are made, positive current is fed over conductor 306 (Fig. 32) through the contacts of relay 335, thus establishing a locking circuit which will hold this relay in its operated position until this "skip" circuit is broken by the engagement of nose 157 of lever 148 (Fig. 7) with a stop-tab 151 in bar 153 which engagement will cause the momentary opening of contacts 159. When this circuit is broken at contacts 159, the locking circuit of magnet 205 will be opened and contact set 277 will resume its normal position, thereby energizing the translator clutch 214 and restarting the translator.

*Backspace.*—When a backspace operation is sensed by the translator, the preselected pair of bars 203 and their dependent mechanism operate in a manner similar to that just described in *Skip* because of the fact that this operation also requires a pause of the translator operation.

When the translator contacts B.S. are closed, a circuit is completed to operate the backspace clutch 6; from conductor 301, through the left-pair of translator contacts B.S., over conductor 338, through the winding of the backspace magnet 166 (Fig. 33) over conductor 316, through contacts 317, to negative conductor 303. The operation of the backspace magnet 166, as set forth hereinabove, will cause latching member 167 to release spring-urged bell-crank lever 339 which will then cause contact 168 to close.

Also, when the translator contacts B.S. are closed; positive current is fed over conductor 301, through the locking winding of magnet 205, through contacts 308, over conductors 309, through the right-hand contacts B.S. of the translator, over conductor 306, one of the backspace clutch brushes 89, through the winding of clutch 6, another brush 89, conductor 341, through contacts 168 which were closed in the preceding circuit, to negative conductor 303.

As in the case of Skip rotation of translator shaft 217 will be checked by engagement of the pin 275 with one of the lugs 276 and will remain checked until the locking circuit of magnet 205 is broken. In this particular instance, this locking circuit is broken by plate 162 which, when drawn downwardly through pull link 92 by clutch 6, to a predetermined point, will cause contacts 168 to be opened.

*Carriage return.*—When a carriage-return operation is sensed by the translator, the preselected pair of bars 203 and their dependent mechanism operate in a manner similar to that hereinabove described for Skip because of the fact that this operation also requires a pause of translator operation.

When the "carriage return" contacts C. R. of the translator are closed, a circuit is completed over conductor 301, through the locking winding of magnet 205, through contacts 308, over conductor 309, through contacts C. R., over conductor 342, through contact spring 131 of commutator 127 (Fig. 33), commutator brush 343, conductors 344 and 404, through the winding of carriage-return magnet 182, conductor 328, through contacts 329, to negative conductor 303. The operation of carriage-return magnet 182, as set forth hereinabove, will cause a latching member to release spring-urged bell-crank lever 181 which, in turn, will cause control bar 178 to be shifted to the right as viewed in Fig. 1. In shifting, lever 181 will cause contacts 345 to be closed and will also cause contacts 317 to be opened, thereby eliminating, during the travel of the punch carriage, the possibility of an accidental operation of any solenoid, the circuit of which is completed through this pair of contacts 317.

Also, when translator contacts C. R. are closed, a circuit is completed, to operate the carriage-return clutch 7, from positive conductor 301, through the locking winding of magnet 205, through contacts 308, over conductor 309, through translator contacts C. R. over conductor 306, one of the carriage return clutch brushes 88, through the winding of clutch 7, another brush 89, conductor 346, through contacts 345 which were just closed by lever 181, to negative conductor 303.

In this instance, the locking circuit of magnet 205 will remain effective until block member 137 (Fig. 1), during the retrograde travel of the setting carriage, engages one of the stop members 132 or 133, thereby shifting control bar 178 to the left and consequently causing lever 181 to be relatched and contacts 345 to be opened, thus breaking said locking circuit.

*Column-erase.*—When a column erase operation is sensed by the translator, the preselected pair of bars 203 and their dependent mechanism operate in a manner similar to that hereinabove described for Margin, because of the fact that this operation does not require a pause of translator operation.

When the "column-erase" contacts ER. COL. of the translator are closed, a circuit is completed from positive conductor 301, through left-contacts ER. COL. of the translator, over conductor 305, through the winding of "column erase" relay 313, conductors 400 and 401, through contacts 110S, over conductors 310 and 405, through right-contacts ER. COL. of the translator, over conductor 331, through the winding of "space" solenoid SP., over conductor 316, through contacts 317, to negative conductor 303.

Also, when "column-erase" relay 313 is actuated, circuits are completed from positive, over conductor 305, through the upper and lower contacts of relay 313, over conductors 318 and 319, through the winding of lower and upper erase solenoids L. ER. and U. ER., respectively, over conductor 316, through contacts 317, to negative conductor 303, thus operating the upper and lower erase mechanism.

*Cancel.*—When a cancel operation is sensed by the translator, the preselected pair of bars 203 and their dependent mechanism operate in a manner similar to that hereinabove described for Skip, because this operation also requires a suspension of translator operation.

When the "cancel" contacts CAN. of the translator are closed, a circuit is completed from positive conductor 301, through the locking winding of magnet 205, through contacts 308, over conductor 309, through left contacts CAN. of the translator, over conductors 306 and 406, through the winding of "retract" relay 347, over conductor 348, through the upper contacts of "card" relay 349, over conductor 351, through the upper contacts of "card-carriage return" relay 352, through the upper contacts of "trip-two" relay 201, over conductor 353, through the right contacts CAN. of the translator, over conductor 342, contact spring 131 (Fig. 33), commutator brush 343, conductors 344 and 404, through the winding of carriage return magnet 182, conductor 328, through contacts 329, to negative conductor 303, thus operating the carriage return mechanism as set forth hereinabove under Carriage return. When "retract" relay 347 was energized a circuit was completed from conductor 348, through the contacts of this relay, through the winding of the "retract" solenoid RET., conductor 346, through contacts 345, which were caused to close by the carriage-return magnet 182, to negative conductor 303, thus operating the cancel mechanism of the punch, simultaneously with the carriage-return mechanism.

*Card.*—When a card operation is sensed by the translator, the preselected pair of bars 203 and their dependent mechanism operate in a manner similar to that hereinabove described for Skip because this operation also requires a suspension of translator operation.

When the "card" contacts CD. of the translator are closed, a circuit is completed from positive conductor 301, through the locking winding of magnet 205, through contacts 308, over conductor 309, through the left contacts CD. of the translator, over conductor 306 (Fig. 33) commutator brush 354, main commutator segment 128, commutator brush 355, conductor 356, through mid-contacts CD. of the translator (Fig. 35), conductor 357, through the winding of the trip magnet 195, to negative conductor 303, thus operating the punch to perforate and eject one card.

Since the locking circuit through magnet 205 would be broken at the commutator, shortly after punch shaft 10 commenced to rotate, another circuit is provided through the locking winding of magnet 205 to insure the necessary delay of translator action for a complete punch operation. This auxiliary circuit is provided from positive on segment 128, commutator brush 202 (Fig. 33), conductor 358, through the right contacts CD. of the translator, over conductor 359, through the winding of "card" relay 349, to negative conductor 303, thus operating relay 349 and thereby completing a relay locking circuit from positive on conductors 358 and 407 through the lower contact and the winding of relay 349, to negative conductor 303.

As may be seen from the above description, the locking circuit of magnet 205 will be broken only when commutator 128 has rotated to the point where the electrical connection between brush 354 and brush 202 is broken.

*Card-carriage return.*—When a card-carriage return operation is sensed by the translator the preselected pair of bars 203 and their dependent mechanism operate in a manner similar to that hereinabove described for Skip because this operation also requires a suspension of translator operation.

When the "card-carriage-return" contacts CD. C. R. of the translator are closed, a circuit is completed from positive conductor 301, through the locking winding of magnet 205, through contacts 308, over conductor 309, through the left contacts CD. C. R. of the translator, over conductor 306, commutator brush 354 (Fig. 33), segment 128, brush 355, conductor 356, through mid-contacts CD. C. R. of the translator, over conductor 357, through the winding of "trip" magnet 195, to negative conductor 303, thus operating the trip mechanism of the punch to produce one card.

Also, when the contacts CD. C. R. of the translator are closed, a circuit is completed from conductor 309, through the right contacts CD. C. R. of the translator, over conductor 361, through the winding of the "card-carriage return" relay 352, over conductor 328, through contacts 329, to negative conductor 303, thus operating relay 352 which is held operated by the closing of its mid-contacts to complete an auxiliary relay-locking circuit from conductor 306 through the winding of relay 352, conductor 328, contacts 329, to negative conductor 303.

When relay 352 is operated another circuit is completed from positive over conductor 361 through the lower-contacts of said relay, conductors 344 and 404, through the winding of "carriage-return" relay 182, conductor 328, through contacts 329, to negative conductor 303, thus operating the carriage-return mechanism.

In this instance, the locking circuit of blocking magnet 205 is broken at contacts 329, which are caused to open momentarily at the termination of the retrograde travel of the punch setting carriage.

*Trip.*—When a trip operation is sensed by the translator, the preselected bars 203 and their dependent mechanism operate in a manner similar to that hereinabove described for Skip because this operation also requires a suspension of translator operation.

When the "trip" contacts TRIP of the translator are closed, a circuit is completed from positive conductor 301, through the locking winding of magnet 205, through contacts 308, over conductor 309, through the left contacts TRIP, over conductor 306, commutator brush 354, segment 128, brush 355, conductor 356, through mid-contacts of the translator TRIP, over conductor 357, through the winding of trip magnet 195, to negative conductor 303, thus operating the trip mechanism of the punch to produce one card.

Also, when the translator contacts TRIP are closed, a circuit is completed from positive on conductor 309, through the right contacts TRIP of the translator, over conductor 362, through the winding of the "trip" relay 363, conductor 325, through the upper contacts of "trip-intermediate" relay 326, conductor 327, through the winding of "express" solenoid EX., over conductor 328, through contacts 329, to negative conductor 303, thus operating relay 363 which is held operated by a locking circuit from conductor 306, through the contacts and winding of relay 363, conductor 325, the upper contacts of relay 326, conductor 327, "express" solenoid EX., conductor 328, contacts 329, to negative conductor 303.

Also, when contacts TRIP of the translator are closed, positive current is fed from conductors 306 and 406 through the winding of "retract" relay 347, conductor 348, through the upper contacts of relay 349, conductor 351, through the upper contacts of relay 352, through the upper contacts of relay 201, conductor 353, to brush 364 of commutator 127. When, due to the trip action above described, the commutator 127 has made approximately three-quarters of a revolution, segment 129 will engage both of the brushes 364 and 343, thereby continuing the circuit to completion from brush 364, over segment 129, brush 343, conductors 344 and 404, through the winding of magnet 182, over conductor 328, through contacts 329, to negative conductor 303, thus operating the "carriage-return" magnet 182 which will cause lever 181 to be shifted, contacts 317 to be opened, and contacts 345 to be closed.

When the contacts 345 are closed through the action of "carriage return" magnet 182, still another circuit is completed. This additional circuit is from conductor 306, one of the brushes 89 of the "carriage-return" clutch 7, through the winding of this clutch, over another brush 89, conductor 346, contacts 345, to negative conductor 303, thus operating the carriage-return clutch 7.

In this particular instance the locking circuit of blocking magnet 205 will be broken at contacts 329 which are caused to open momentarily at the termination of the retrograde travel of the punch carriage.

*Trip-to-intermediate.*—When a trip-to-intermediate operation is sensed by the translator, the preselected bars 203 and their dependent mechanism operate in a manner similar to that hereinabove described for Skip because this operation also requires a suspension of translator operation.

When the "trip-intermediate" contacts TR. INT. of the translator are closed, a circuit is completed from positive conductor 301, through the locking winding of magnet 205, through contacts 308, over conductor 309, through the left-contacts TR. INT. of the translator, over conductor 306, brush 354 of commutator 127, segment 128, brush 355, conductor 356, through mid-contacts TR. INT. of the translator, over conductor 357, through the winding of trip magnet 195, to negative conductor 303, thus operating the trip mechanism of the punch to produce one card.

Also, when the translator contacts TR. INT. are closed a circuit is completed from conductor 309, through the right contacts TR. INT. of the translator, over conductor 365, through the winding of "trip-to-intermediate" relay 326, over conductor 328, through contacts 329, to negative conductor 303, thus operating said relay 326 and locking it in its operated position through its lower contact over conductor 306 to positive.

Also, when translator contacts TR. INT. are closed, positive current is fed from conductors 306 and 406, through the winding of "retract" relay 347, over conductor 348, through the upper contacts of relay 349, over conductor 351, through the upper contacts of relay 352, through the upper contacts of relay 201, over conductor 353, to commutator brush 364. When, due to the trip action above described, the commutator 127 has made approximately three-quarters of a revolution, segment 129 will engage both of the brushes 364 and 343, thereby continuing the circuit to completion from brush 364, over segment 129, brush 343, conductors 344 and 404, through the winding of magnet 182, conductor 328, through contacts 329, to negative conductor 303, thus operating the "carriage-return" magnet 182 which will cause lever 181 to be shifted, contacts 317 to be opened, and contacts 345 to be closed.

When contacts 345 are closed through the action of "carriage return" magnet 182, still another circuit is completed. This additional circuit is from conductor 306, through one of the brushes 89 and winding of carriage return clutch 7, another brush 89, conductor 346, contacts 345, to negative conductor 303, thus operating said carriage return clutch 7.

In this particular instance, the locking circuit of blocking magnet 205 will be broken at contacts 329 which are momentarily caused to open at the termination of retrograde travel of the punch carriage.

*Trip two.*—When a trip two operation is sensed by the translator, the pre-selected bars 203 and their dependent mechanism operate in a manner similar to that hereinabove described for Skip, because this operation also requires a suspension of the translator operation.

When the trip two contacts TRIP 2, of the translator, are closed, a circuit will be completed from positive conductor 301, through the locking winding of magnet 205, through contacts 308, over conductor 309, through the left contacts TRIP of the translator, over conductor 306, through the right contacts TRIP 2 of the translator, over conductor 366, through the winding of slow operating Trip 2 control relay 367, over conductor 328, through contacts 329, to negative conductor 303, thus operating and maintaining operated this relay 367 until contacts 329 are caused to open in a similar manner to that set forth hereinabove under Trip-to-intermediate. However, since relay 367 is of a slow operating type, another circuit will be momentarily completed from conductor 366, through the contacts of this relay, over conductor 368, through the mid-contacts TRIP 2 of the translator, over conductor 369, through the winding of Trip 2, relay 201, over conductors 408 and 357, through the winding of trip magnet 195, to negative conductor 303, thus operating relay 201 and the trip mechanism of the punch. Since this circuit, because of slow operating relay 367, is only momentarily complete, a locking circuit is provided for relay 201 over conductor 306, commutator brush 354, segment 128, brush 202, conductors 358 and 407, through the mid-contacts, armature, and winding of relay 201, over conductors 408 and 357, through the winding of magnet 195, to negative conductor 303.

Also, when magnet 201 is operated, its upper contacts are opened, thereby preventing the functioning of the retract and carriage-return mechanism.

Still further, when relay 201 is operated, a circuit is completed from positive over conductor 407, mid-contact of relay 201, conductor 369, lower contact of relay 201, conductor 409, through the winding of "receiver shift" magnet 60, to negative conductor 303, thus causing gate 39 (Figs. 2, 4, and 6) to be shifted to guide the first card punched into pocket 44.

When commutator 127 has almost completed a full revolution due to the trip action just described, a slot in segment 128 will cause the locking circuit of relay 201 to be broken, thereby allowing the contacts of this relay to resume their normal position opening the circuit of relay 60, thereby causing the second card punched to be delivered into pocket 42. Also, the cancel and carriage-return circuits may be completed through the upper contacts of relay 201 and segment 129 as described above, and, still further, the circuit for the trip magnet 195 will be opened at the mid-contacts of relay 201, thereby allowing trigger member 196 (Figs. 1 and 33) to resume its normal effective blocking position. However, this circuit break occurs so late in the operation cycle of the punch that lug 190 of drive clutch 8 will have passed trigger member 196 before said trigger member reaches its effective position and consequently a second card will be punched.

When, during the second cycle of punch operation, the armature 127 has completed about three-quarters of a revolution, segment 129 will engage both of the brushes 343 and 364, thereby completing a circuit from conductor 306, through the winding of "retract" relay 347, over conductor 348, through the upper contacts of relay 349, over conductor 351, through the upper contacts of relay 352, upper contacts of relay 201, over conductor 353, commutator brush 364, segment 129, brush 343, conductors 344 and 404, through the winding of magnet 182, over conductor 328, through contacts 329, to negative conductor 303, thus operating relay 347 and magnet 182, the relative elements of which will operate as described hereinabove under Carriage-return, said operation including the opening of contacts 317 and the closing of contacts 345.

Also, when relay 347 is operated, a circuit is completed from conductors 306 and 406, through the winding and contacts of this relay 347, through the winding of "retract" solenoid RET., over conductor 346, through contacts 345, to negative conductor 303, thus operating the cancel mechanism.

Still further, when magnet 182 is operated, a circuit is completed over conductor 306, one of the brushes 89, through the winding of clutch 7, over another brush 89, conductor 346, through contacts 345, to negative conductor 303, thus operating the "carriage return" clutch simultaneously with the cancel mechanism.

In this particular instance the locking circuit through magnet 205 will be broken only at contacts 329 which are momentarily opened at the termination of a retrograde carriage movement.

UPPER 90-COLUMN SET-UP

With the punch transfer switch set for 45-column work, when the contacts UP. of the translator are closed, a circuit is completed from positive conductor 301, through contacts UP., over conductor 371, through the left contacts 110A, over conductor 372, through the winding of magnet 373 (Fig. 32), to negative conductor 303, thus operating magnet 373 and causing armature members 121 to be rocked to a position whereat their locking steps 119 (Figs. 8 and 9) are out of the path of projections 118 thereby permitting free movement of arm 117.

Also, when contacts UP. of the translator are closed a circuit is completed from positive over conductor 371, through the winding of relay 374, over conductor 375, through the windings of magnet 116, to negative conductor 303, thus operating relay 374 and the "upper" transfer switch shifting magnet 116, simultaneously with magnet 373.

Still further, when relay 374 is operated, a circuit is completed over positive conductor 301, through the upper contacts of relay 376, through contact 126, over conductor 377, through the contacts and winding of relay 374, to the conductor 375 just described, thus locking relay 374 and thereby insuring that magnet 116 is energized until the transfer switch 110 has made the desired change of electrical connections, at which time cross arm 117 will be rocked to the proper extreme, thereby allowing the proper armature 121 to rock under tension of spring 125 (Fig. 9), and through one of the projections 118, mechanically lock said cross arm 117 and its relative elements. At about the time that this mechanical locking occurs, contact 126 is allowed to open, thereby breaking the locking circuit of relay 374. It is to be assumed for the remainder of this chapter that the transfer switch (Fig. 32) is shifted for upper 90-column numeric set-ups, that is, member 111 in this figure which schematically represents operating bar 111 of Figs. 8, 9 and 10, is shifted to the right.

As set forth hereinabove, when the transfer switch of the punch is set for 90-column set-ups, only those set-ups which utilize two holes simultaneously will cause latching plates 49 (Fig. 2) to release a previous set-up automatically, and single hole set-ups will require the actuation of the automatic erase mechanism described hereinabove. As may be seen in the above cited Patent No. 2,124,178, the two-hole punchings represent "0, 2, 4, 6, and 8" and the single hole punchings represent "1, 3, 5, 7, and 9". Therefore, it is necessary to describe but one of each type.

When the "2" contacts of the translator are closed, a circuit is completed from positive conductor 301, through contacts 304 of set 277, over conductors 305, 411, and 412, through the winding of relay 378, conductor 379, through right contacts 110$^Q$, over conductor 312, through the "2" contacts of the translator, over conductor 381, through right contacts 110$^E$, over conductor 321, through the winding of solenoid XI, over conductor 316, to negative conductor 303, thus operating the solenoid XI and the relay 378 which when operated will complete a circuit from conductors 305, 411 and 412, through the contacts of relay 378, over conductor 382, through the winding of the solenoid III, over conductor 316, contacts 317, to negative conductor 303, thus operating the solenoid simultaneously with the solenoid XI, to cause the set-up of the digit two, in the punch.

When the "3" contacts of the translator are closed, a circuit is completed from positive conductor 301, through contacts 304 of set 277, over conductor 305, through the winding of the upper erase relay 383, over conductor 384, through right contacts 110$^P$, over conductor 311, through the "3" contacts of the translator, over conductor 385, through right contacts 110$^F$, over conductor 386, through the winding of solenoid X, over conductor 316, to negative conductor 303, thus operating solenoid X and "upper erase" relay 383. When relay 383 is operated a circuit is completed from conductor 305, through the contacts of this relay, over conductor 319, through the winding of solenoid UP. ER., conductor 316, to negative conductor 303, thus causing the upper erase mechanism to operate simultaneously with the mechanism under control of solenoid X.

When the punch transfer switch is set for upper 90-column set-up, the margin, break, backspace, space, carriage-return, cancel, card, card carriage-return, trip, trip-to-intermediate, and trip-two operations are controlled from the translator in a similar manner to that described hereinabove for full column set-up, thus setting an erase column operation is unnecessary, but operation circuits may be closed for erase half and skip operation, which applies only to the upper zone set-ups.

*Upper skip.*—When the "skip" contacts SK. of the translator are closed in the usual manner, the circuits completed are, with the exception of one which goes through the right contacts 110$^C$ instead of the mid-contacts 110$^C$, exactly the same as described above for the full column setting of the punch transfer switch.

*Upper erase.*—When an upper erase operation is sensed by the translator, the preselected pair of bars 203 and their associated mechanism operate in a manner similar to that hereinabove described for Margin because this operation does not require a suspension of translator operation. When the "erase half" contacts ER. HALF of the translator are closed, a circuit is completed from positive conductor 301, through left contacts ER. HALF, over conductor 305, through the winding of relay 383, over conductor 384, through right contacts 110$^P$, over conductor 311, through the right contacts ER. HALF of the translator, over conductor 331, through the winding of "space" solenoid SP., over conductor 316, contacts 317, to negative conductor 303, thus operating solenoid SP. and relay 383. When relay 383 is operated, another circuit is completed over conductor 305, through the contacts of relay 383, over conductor 319, through the winding of solenoid UP. ER., over conductor 316, contacts 317, to negative conductor 303, thus operating the upper erase solenoid and its associated mechanism simultaneously with the space mechanism.

LOWER 90-COLUMN SET-UP

Let it be assumed that the punch transfer switch is set for upper 90-column set-ups as set forth in the preceding chapter, and that it is now desirable to cause set-ups to be made in the lower 90-column zone. The tape 241 will be punched with the proper indicia which, when sensed by the translator, will cause the contacts LOW. of said translator to close, thereby completing a circuit from positive conductor 301, through translator contacts LOW., over conductor 387, through right contacts 110$^A$, over conductor 372, through the winding of magnet 373, to negative conductor 303, thus causing armature members 121 to be rocked to a position whereat their locking steps 119 are out of the paths of projections 118 of cross arm 117, consequently causing the release of cross arm 117 and its associated mechanism and also causing contacts 126 to close.

Also, when translator contacts LOW. are closed, a circuit is completed over conductor 387, through the winding of relay 388, over conductor 389, through the winding of LOW. magnet 115, to negative conductor 303, thus operating relay 388 and the "lower" transfer switch shifting magnet 115.

Still further, when relay 388 is operated, a circuit is completed over positive conductor 301, through the upper contacts of relay 376, through contacts 126, over conductor 377, through the contacts and winding of relay 388, to the conductor 389 just described, thus locking relay 388 and thereby insuring that magnet 115 is energized until the transfer switch 110 has made the desired change of electrical connections at which time cross arm 117 will be rocked to the proper extreme, thereby allowing the proper armature 121 to rock and through one of the projections 118, mechanically lock said cross arm 117 and its relative elements.

Since lower 90-column numeric set-ups are made in a manner similar to that for upper 90-column set-ups, only the "2" and the "3" will be described.

When the "2" contacts of the translator are closed, a circuit is completed from positive conductor 301, through contacts 304, of set 277 over conductors 305 and 411 through the winding of relay 391, over conductor 392, through left-contacts 110P, over conductor 312, through the "2" contacts of the translator, over conductor 381, through left-contacts 110H, over conductor 393, through the winding of solenoid V, over conductor 316, contacts 317, to negative conductor 303, thus operating the solenoid V and relay 391 which, when operated, will complete a circuit from positive conductor 305, through its contacts, over conductor 394, through the winding of solenoid IX, over conductor 316, contacts 317, to negative conductor 303, thus causing the operation of the mechanism associated with solenoid IX, together with the mechanism associated with solenoid V.

When the "3" contacts of the translator are closed, a circuit is completed over positive conductor 301, through contacts 304 of set 277, over conductor 305, through the winding of the lower erase relay 410, over conductor 395, through left contacts 110Q, over conductor 311, through the "3" contacts of the translator, over conductor 385, through left contacts 110I, over conductor 396, through the winding of the solenoid VI, over conductor 316, contacts 317, to negative conductor 303, thus operating solenoid VI and relay 394 which, when operated, will complete a circuit from positive over conductor 305, through the contacts of relay 410, over conductor 318, through the winding of solenoid LOW. ER., over conductor 316, thus causing the operation of the mechanism associated with solenoid LOW. ER., together with the mechanism associated with solenoid VI.

When the punch transfer switch is set for lower 90-column set-ups the margin, break, backspace, space, carriage return, cancel, card, card carriage return, trip, trip-to-intermediate, and trip-two operations are controlled from the translator in a similar manner to that described hereinabove for full column set-ups and need not be repeated. With this setting an erase column operation is unnecessary, but an erase half and a skip operation circuits, which apply only to lower zone set-ups, are available.

*Lower skip.*—When a lower skip operation is sensed by the translator, the preselected pair of bars 203 and their dependent mechanism operate in a manner similar to that hereinabove described for Skip because this operation also requires a suspension of translator operation. When the "skip" contacts SK. of the translator are closed, a circuit is completed from positive conductor 301, through the winding of magnet 205, through contacts 308, over conductor 309, "skip" contacts SK., conductor 333, through the left contacts 110C, over conductor 397, through the winding of "lower skip" relay 398, over conductor 399, through the winding of solenoid LOW. SK., over conductor 336, contacts 159, conductor 316, contacts 317, to negative conductor 303, thus operating relay 398, and solenoid LOW. SK. and its associated mechanism. When relay 398 is operated, a circuit is completed over conductor 306, through the contacts and winding of relay 398, to conductor 399, thus forming a locking circuit for relay 398.

In this particular instance the locking circuit through magnet 205 will be broken only by the opening of contacts 159 by bar 153.

*Lower erase.*—When a lower erase operation is sensed by the translator, the preselected pair of bars 203 and their dependent mechanism operate in a manner similar to that hereinabove described for Margin, because this operation does not require a suspension of translator operation. When translator contacts ER. HALF are closed, a circuit is completed over positive conductor 301, through the left-contacts ER. HALF of the translator, over conductor 305, through the winding of "lower erase" relay 410, over conductor 395, through left contacts 110Q, over conductor 311, through right contacts ER. HALF of the translator, over conductor 331, through solenoid SP., over conductor 316, contacts 317, to negative conductor 303, thus operating relay 410 and solenoid SP.

Also, when relay 410 is operated, a circuit is completed from positive over conductor 305, through the contacts of relay 410, over conductor 318, through the winding of solenoid LOW. ER., over conductor 316, contacts 317, to negative conductor 303, thus operating solenoid LOW. ER. and its associated mechanism together with solenoid SP. and its associated mechanism.

TRANSFER SWITCH

When it is desirable to shift the transfer switch contacts from lower 90-column set-up position to full-column set-up position, the tape 241 is punched with the proper indicia which, when sensed, will cause the preselected pair of bars 203 and their dependent mechanism to operate in a manner similar to that described hereinabove under Margin, because this operation does not require a pause of translator operation. When the translator contacts FULL COL. are closed, a circuit will be completed over positive conductor 301, through the contacts FULL COL. of the translator, over conductor 337, through the winding of full-column relay 376, to negative conductor 303, thus operating this relay 376.

Also, when relay 376 is operated, a circuit is completed over conductor 301, through the lower contacts of relay 376, over conductor 372, through the winding of magnet 373, to negative conductor 303, thus rocking armature members 121 (Figs. 8, 9 and 10) to a position whereat their locking steps 119 are out of the paths of projections 118 of cross arm 117, consequently causing the release of this cross arm and its associated mechanism which, under the influence of contact springs 108, detent 124, and pawl 123, will cause full-column set-up connections to be made.

To shift the transfer switch contacts from upper 90-column set-up to full-column set-up position, the procedure is exactly the same as just described and need not be discussed further.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of

What I claim as new, and desire to secure by Letters Patent, is:

1. A perforated record having a plurality of perforation receiving fields, each field having six hole positions therein, combinations being various to a maximum of three perforations being variously disposed in said six hole positions, said combinations always omitting the simultaneous use of a preselected pair of said six hole positions to individually represent letters of the alphabet and digital characters; combinations of two to the maximum of six perforations being variously disposed in said six hole positions which combinations always include said preselected pair of hole positions, to represent machine operations.

2. A perforated record having six perforation receiving fields, combinations of one to a maximum of three perforations, variously disposed in said six fields, said combinations always omitting the simultaneous inclusion of a preselected pair of said receiving fields; combinations of two to a maximum of six perforations being variously disposed in said six fields to represent machine operations, said machine operation representations always including said pair of preselected pair of receiving fields.

3. A perforated record having a plurality of perforation receiving fields, each field having six hole spaces therein, combinations of one to a maximum of three perforations variously disposed in said six spaces to individually represent letters of the alphabet and individual digital characters, combinations of two to six perforations to represent machine operations, a selected two of said hole spaces always being perforated in a single field for representing machine operations and any combination representing a letter or digit always omitting the use of more than one perforation in said selected two hole spaces.

4. In a machine of the class described, sensing means for reading perforations in a perforated record, said perforations being arranged in columns and including control positions, circuits completed by said sensing means under control of perforations in any of said columns of perforations, and means controlled by the sensing of said control positions for disabling certain of said circuits.

5. A translator of the class described including a driving means, a main shaft, an electromagnetic clutch for connecting said driving means to said main shaft, a plurality of sensing pins under control of said main shaft and adapted to sense the presence or absence of perforations in a prepunched tape, an intermittent tape feeding means, a plurality of bars under control of said main shaft and said sensing pins, a plurality of variously disposed notches in each of said bars, a plurality of sets of contacts, a plurality of snatch bails, a plurality of cams fixed to said main shaft and adapted to support said snatch bails, a plurality of actuator members, under control of said notches and said snatch bails, said actuators being adapted to selectively cause various of said sets of contacts to close thereby effectively duplicating the act of depressing a key of a card punch, and means under control of said bars to cause a suspension of operation of said main shaft.

6. In a punched card system, a tape punched in accordance with a six-hole code, an intermittent tape feeding means, a card punch including a plurality of electromagnetic clutches, a translating mechanism adapted to sense said tape and close circuits in accordance with said code, means under control of said translating mechanism to cause a suspension of operation of said tape feeding means for operating said clutches thereby controlling the operation of said punch.

7. In a device of the class described, a tape translating mechanism in combination with a record card punching mechanism including a movable setting carriage, said carriage including an intermediate carriage return limiting member and circuit closing means actuated by said tape translating mechanism for controlling the movement of said carriage, said circuit containing an electromagnet adapted to render said limiting member ineffective.

8. In a device of the class described, a tape translating mechanism in combination with a record card punching mechanism including a movable setting carriage, said carriage including an intermediate carriage return limiting member, circuit closing means actuated by said tape translating mechanism for controlling the movement of said carriage, said circuit containing an electromagnet adapted to render said limiting member ineffective, mechanical locking means adapted to maintain said circuit effective, and record actuated means for disengaging said locking means.

9. In a device of the class described, a tape translating mechanism in combination with a record card punching mechanism including a movable setting carriage, an escapement mechanism, and circuit closing means actuated by said tape translating mechanism for controlling the movement of said carriage, said circuit containing an electromagnet adapted to operate said escapement mechanism.

10. In a device of the class described, a tape translating mechanism in combination with a record card punching mechanism including a bar adapted to support a plurality of settable stop tabs and including a movable setting carriage having mounted thereon a plurality of stop levers, and circuit closing means actuated by said tape translating mechanism for controlling the movement of said carriage, said circuit containing a plurality of electromagnets adapted to actuate said levers thereby limiting the movement of said carriage.

11. In a device of the class described, a tape translating mechanism in combination with a record card punching mechanism including a movable setting carriage and electromagnetically operated means for moving said carriage one retrograde space, and circuit closing means actuated by said tape translating mechanism for controlling said electromagnetically operated means.

12. In a device of the class described, a tape translating mechanism in combination with a record card punching mechanism including a movable setting carriage, electromagnetically controlled means for causing a retrograde movement of said carriage, electromagnetically controlled means for operating said punching mechanism to perforate and deliver a card, and circuit closing means actuated by said tape translating mechanism for controlling said punching mechanism, said circuit including a relay adapted to prevent said retrograde carriage movement.

13. In a device of the class described, a tape translating mechanism in combination with a record card punching mechanism including a movable setting carriage, electromagnetically controlled means for causing a retrograde movement of said carriage, electromagnetically controlled means for operating said punching mechanism to perforate and deliver a card, and circuit closing means actuated by said tape translating mechanism for controlling said punching mechanism to punch and deliver said card and subsequently cause said retrograde movement of said carriage.

14. In a device of the class described, a tape translating mechanism in combination with a record card punching mechanism, including two receiving pockets and circuit closing means actuated by said tape translating mechanism for controlling said punching mechanism, said circuit containing a relay for controlling the operation of an electromagnet adapted to permit said punching mechanism to punch and deliver a card to one of said pockets and punch and deliver a duplicate card to the other of said pockets.

15. In a device of the class described, a tape translating mechanism in combination with a record card punching mechanism including two receiving pockets, a magnetically operated gate for one of said pockets and circuit closing means actuated by said tape translating mechanism for controlling said punching mechanism, said circuit containing a relay for controlling the operation of an electromagnet for causing said punching mechanism to punch and deliver a card to one of said pockets, the punching of a duplicate card and a second circuit controlled by said relay for operating said gate thereby permitting the delivery of said duplicate to the second of said pockets.

16. In a punched card system, a tape translator in combination with a card punch, said tape translator comprising a plurality of sensing pins adapted to sense the presence or absence of perforations in a prepunched tape, an intermittent tape feeding means, a plurality of notched bars, a plurality of snatch bails engaging the said notched bars, a plurality of cams adapted to engage and operate said snatch bails, a plurality of sets of contacts so disposed as to be engaged by said snatch bails and circuit means including said contacts and a plurality of electromagnets in said card punch.

17. In a punched card system, a tape translator in combination with a card punch, said tape translator comprising a plurality of sensing pins adapted to sense the presence or absence of perforations in a prepunched tape, an intermittent tape feeding means, a plurality of notched bars positioned by the said sensing pins, a plurality of snatch bails intermittently engaging the said notched bars, a plurality of cams engaging and operating said snatch bails, a plurality of sets of contacts operated by said snatch bails and circuit means including said contacts in combination with card punch operating circuits.

18. In a punched card system, a tape translator in combination with a card punch, said tape translator including a driving means, a main shaft, an electromagnetic clutch for connecting said driving means to said main shaft, a plurality of sensing pins under control of said main shaft and adapted to sense the presence or absence of perforations in a prepunched tape, an intermittent tape feeding means, a plurality of notched bars positioned by the action of said sensing pins, a plurality of snatch bails intermittently engaging the said notched bars, a plurality of cams engaging and operating said snatch bails, a plurality of sets of contacts selectively operated by said snatch bails and circuits including said contacts in combination with card punch operating circuits and means under control of said notched bars to cause a suspension of operation of said main shaft.

19. In a punched card system, the combination of a card punch and a tape translator, said translator including a driving means, a main shaft, an electromagnetic clutch for connecting said driving means to said shaft, a plurality of sensing pins adapted to sense the presence or absence of perforations in a prepunched tape and circuit closing means selectively operated by the said sensing mechanism, thereby effectively duplicating the act of depressing a key of the card punch, and circuit means under control of said sensing mechanism for disengaging said electromagnetic clutch when certain hole combinations are sensed and additional circuit means under control of contacts on the card punch for engaging the said clutch.

20. In a punched card system, the combination of a card punch and a tape translator, said translator including a driving means, a main shaft, and electromagnetic clutch for connecting said driving means to said shaft, a plurality of sensing pins driven from the main shaft and adapted to sense the presence or absence of perforations in a prepunched tape and circuit closing means selectively operated by the said sensing mechanism, for initiating punch operations in said card punch, and for disengaging said electromagnetic clutch; said card punch including a movable setting carriage, means for causing a retrograde movement of said setting carriage to a predetermined position, and contact means operated at the end of said carriage movement for engaging the said electromagnetic clutch.

21. In a punched card system, the combination of a card punch and a tape translator, said translator including a driving means, a main shaft, an electromagnetic clutch for connecting said driving means to said shaft, a plurality of sensing pins driven by the main shaft and adapted to sense the presence or absence of perforations in a prepunched tape and circuit closing means selectively operated by the said sensing mechanism, for initiating punch operations in said card punch and for disengaging said electromagnetic clutch, said card punch including a movable setting carriage having mounted thereon a plurality of stop levers, means for causing a movement of said carriage to the said stop levers and contact means operated at the end of said carriage movement for engaging the said magnetic clutch.

22. In a punched card system, the combination of a card punch and a tape translator, said translator including a driving means, a main shaft, an electromagnetic clutch for connecting said driving means to said shaft, a plurality of sensing pins driven by the main shaft and adapted to sense the presence or absence of perforations in a prepunched tape and circuit closing means selectively operated by the said sensing mechanism for initiating punch operations in said card punch and for disengaging said electromagnetic clutch, said card punch including a movable setting carriage and means for moving the said carriage one retrograde space and contact means operated at the end of said carriage movement for engaging said magnetic clutch.

23. In a punched card system, the combination of a card punch and a tape translator, said translator including a driving means, a main shaft, an electromagnetic clutch for connecting said driving means to said shaft, a plurality of sensing pins driven by the main shaft and adapted to sense the presence or absence of perforations in a prepunched tape and circuit closing means selectively operated by the said sensing mechanism for initiating punch operations in said card punch and for disengaging said electromagnetic clutch, said card punch including a movable setting carriage, electromagnetically controlled means for operating said punching mechanism to perforate and deliver a card, and contact means operated at the end of said punching operation for engaging said magnetic clutch.

24. In a punched card system, the combination of a card punch and a tape translator, said translator including a driving means, a main shaft, an electromagnetic clutch for connecting said driving means to said shaft, a plurality of sensing pins driven by the main shaft and adapted to sense the presence or absence of perforations in a prepunched tape and circuit closing means selectively operated by the said sensing mechanism for initiating punch operations in said card punch and for disengaging said electromagnetic clutch, said card punch including a movable setting carriage, electromagnetically controlled means for operating said punching mechanism to perforate and deliver a card, and electromagnetically controlled means for causing a retrograde movement of said carriage subsequent to the said perforating of said card and contact means operated at the end of said carriage movement for engaging the said clutch.

25. In a punched card system, the combination of a card punch and a tape translator, said translator including a driving means, a main shaft, an electromagnetic clutch for connecting said driving means to said shaft, a plurality of sensing pins driven by the main shaft and adapted to sense the presence or absence of perforations in a prepunched tape and circuit closing means selectively operated by the said sensing mechanism for initiating punch operations in said card punch and for disengaging said electromagnetic clutch, said card punch including two receiving pockets, a circuit containing a relay for controlling the operations of an electromagnet for causing said punching mechanism to punch and deliver a card to one of said pockets, the punching of a duplicate card and a second circuit controlled by said relay for operating said gate, thereby causing the delivery of said duplicate card to the second of said pockets and contact means operated at the end of said second delivery for engaging the said clutch.

WALTER F. KELLEY.

CERTIFICATE OF CORRECTION.

Patent No. 2,160,152.   May 30, 1939.

WALTER F. KELLEY.

It is hereby certified that error appears in the printed specification of the above numbered patent requiring correction as follows: Page 2, first column, line 49, after the word "tape" and before the period insert by the punch; page 9, first column, line 26, before "is" insert key; page 11, second column, line 45, for "frame 21" read frame 210; page 17, first column, line 29, for "TRIP" read TRIP 2; and that the said Letters Patent should be read with this correction therein that the same may conform to the record of the case in the Patent Office.

Signed and sealed this 19th day of December, A. D. 1939.

(Seal)

Henry Van Arsdale,
Acting Commissioner of Patents.